US012793527B2

(12) United States Patent
Donegan et al.

(10) Patent No.: US 12,793,527 B2
(45) **Date of Patent: *Nov. 10, 2026**

(54) AI SECURITY SYSTEM

(71) Applicant: Tabor Mountain LLC, Wilmington, DE (US)

(72) Inventors: Edward Michael Donegan, Denver, CO (US); William Delmonico, Burnsville, MN (US); Joseph Schmitt, Princeton, MN (US)

(73) Assignee: Tabor Mountain LLC, Wilmington, DE (US)

(*) Notice: Subject to any disclaimer, the term of this patent is extended or adjusted under 35 U.S.C. 154(b) by 32 days.

This patent is subject to a terminal disclaimer.

(21) Appl. No.: 19/006,386

(22) Filed: Dec. 31, 2024

(65) Prior Publication Data

US 2025/0131810 A1 Apr. 24, 2025

Related U.S. Application Data

(63) Continuation of application No. 18/508,386, filed on Nov. 14, 2023, now Pat. No. 12,223,819, which is a (Continued)

(51) Int. Cl.
*G08B 21/18* (2006.01)
*G08B 7/06* (2006.01)
(Continued)

(52) U.S. Cl.
CPC ............ *G08B 21/18* (2013.01); *G08B 7/066* (2013.01); *G08B 27/005* (2013.01);
(Continued)

(58) Field of Classification Search
CPC ...... G08B 21/18; G08B 7/066; G08B 27/005; G08B 29/186; G08B 29/188; G10L 15/22
See application file for complete search history.

(56) References Cited

U.S. PATENT DOCUMENTS

| | | |
|---|---|---|
| 7,579,945 B1 | 8/2009 | Richter et al. |
| 8,063,764 B1 | 11/2011 | Mihailidis et al. |

(Continued)

FOREIGN PATENT DOCUMENTS

| | | |
|---|---|---|
| DE | 102011083023 | 3/2013 |
| WO | WO 2010/054794 | 5/2010 |

(Continued)

OTHER PUBLICATIONS esser-systems.com [online], "ES Detect—TM, TME, TD, O, OTblue, O2T," 2014, retrieved on Apr. 7, 2022, retrieved from URL<https://www.google.com/url?sa=t&rct=j&q=&esrc=s&source=web&cd=&ved=2ahUKEwiJ7NqYgIL3AhUBm2oFHZ7tDpcQFnoECAQQAQ&url=https%3A%2F%2Fwww.esser-systems.com%2Fde%2Fservice%2Fdownloads%2Fesser%2Fwerbliche-publikationen%2Fproduktinfomation-es-detect%2F%3Ffeature%3DDownloadDocs_MediaFile%26type%.

(Continued)

*Primary Examiner* — John A Tweel, Jr.
(74) *Attorney, Agent, or Firm* — Barnes & Thornburg LLP

(57) ABSTRACT

Disclosed herein are techniques for event detection and response. A method can include: receiving sensor data associated with an environment, processing the sensor data using artificial intelligence (AI) to detect an event in the environment, the AI being trained to correlate the received sensor data with different types of events, generating, based on the detected event, egress guidance for a user in the environment, returning instructions for presenting the egress guidance by a sensor device, and iteratively updating the egress guidance for the user based on (i) the sensor data and (ii) user feedback that is received from the sensor device.

20 Claims, 17 Drawing Sheets

Related U.S. Application Data continuation of application No. 18/075,905, filed on Dec. 6, 2022, now Pat. No. 11,875,661, which is a continuation of application No. 17/377,213, filed on Jul. 15, 2021, now Pat. No. 11,626,002.

(51) Int. Cl.
*G08B 27/00* (2006.01)
*G08B 29/18* (2006.01)
*G10L 15/22* (2006.01)

(52) U.S. Cl.
CPC ......... *G08B 29/186* (2013.01); *G08B 29/188* (2013.01); *G10L 15/22* (2013.01)

(56) References Cited

U.S. PATENT DOCUMENTS

| | | | | |
|---|---|---|---|---|
| 8,378,817 | B2 | 2/2013 | Fox | |
| 9,514,636 | B2 | 12/2016 | Modi et al. | |
| 10,524,027 | B2 | 12/2019 | Schattmaier et al. | |
| 10,872,510 | B2 | 12/2020 | Derickson | |
| 11,043,095 | B1 | 6/2021 | Derickson | |
| 11,626,002 | B2 | 4/2023 | Donegan et al. | |
| 11,875,661 | B2 * | 1/2024 | Donegan | G08B 27/005 |
| 12,223,819 | B2 * | 2/2025 | Donegan | G08B 7/066 |
| 12,412,466 | B2 * | 9/2025 | Poder | G08B 25/14 |
| 12,435,990 | B2 * | 10/2025 | Kruse | G10L 15/22 |
| 2012/0047083 | A1 | 2/2012 | Qiao et al. | |
| 2012/0276517 | A1 | 11/2012 | Banaszuk et al. | |
| 2013/0342361 | A1 | 12/2013 | Greene | |
| 2014/0266669 | A1 | 9/2014 | Fadell et al. | |
| 2014/0320282 | A1 | 10/2014 | Zhang et al. | |
| 2014/0340223 | A1 | 11/2014 | Ilyin | |
| 2015/0070192 | A1 | 3/2015 | Kates | |
| 2015/0137967 | A1 | 5/2015 | Wedig et al. | |
| 2015/0256355 | A1 | 9/2015 | Pera et al. | |
| 2015/0371518 | A1 | 12/2015 | Mittal | |
| 2016/0180663 | A1 | 6/2016 | McMahan et al. | |
| 2016/0247369 | A1 | 8/2016 | Simmons | |
| 2019/0066464 | A1 | 2/2019 | Wedig et al. | |
| 2019/0171780 | A1 | 6/2019 | Santarone et al. | |
| 2019/0237083 | A1 | 8/2019 | Allen et al. | |
| 2020/0242901 | A1 | 7/2020 | Jia et al. | |
| 2020/0242902 | A1 | 7/2020 | Derickson | |
| 2020/0311852 | A1 | 10/2020 | Torshizi et al. | |
| 2020/0357268 | A1 | 11/2020 | Tyson | |
| 2020/0372768 | A1 | 11/2020 | Armpriester et al. | |
| 2021/0043050 | A1 | 2/2021 | Williams | |
| 2021/0183219 | A1 | 6/2021 | Rao et al. | |
| 2021/0201635 | A1 | 7/2021 | Fernandez-Orellana et al. | |
| 2021/0390838 | A1 | 12/2021 | Derickson | |
| 2022/0272792 | A1 | 8/2022 | Werner et al. | |
| 2022/0415159 | A1 | 12/2022 | Padala et al. | |
| 2023/0290235 | A1 | 9/2023 | Nagale et al. | |
| 2024/0161599 | A1 | 5/2024 | Wedig et al. | |

FOREIGN PATENT DOCUMENTS

| | | |
|---|---|---|
| WO | WO 2011/130723 | 10/2011 |
| WO | WO 2014/051456 | 4/2014 |

OTHER PUBLICATIONS

International Preliminary Report on Patentability in International Appln. No. PCT/US2020/014971, dated Aug. 6, 2021, 10 pages.

International Search Report and Written Opinion in International Application No. PCT/US2020/014971 dated May 12, 2020, 12 pages.

International Search Report and Written Opinion in International Appln. No. PCT/US2021/037426, dated Sep. 27, 2021, 18 pages.

International Search Report and Written Opinion in International Appln. No. PCT/US2021/053103, dated Jan. 25, 2022, 14 pages.

Liu, "Building tomography: Automatic floor plan generation for indoor localization," Thesis for the Degree of Doctor of Philosophy in Computer Science and Engineering, The Hong Kong University of Science and Technology, Jul. 2013, 104 pages.

Office Action in Canadian Appln. No. 3127796, dated Oct. 19, 2021, 8 pages.

PCT Invitation to Pay Additional Fees and, Where Applicable, Protest Fee in International Application No. PCT/US2022/035247, mailed on Oct. 10, 2022, 22 pages.

* cited by examiner

AI SECURITY SYSTEM

CROSS-REFERENCE TO RELATED APPLICATIONS

This application is a continuation of U.S. application Ser. No. 18/508,386, filed Nov. 14, 2023, which is a continuation of U.S. application Ser. No. 18/075,905, filed Dec. 6, 2022 and issued on Jan. 16, 2024 as U.S. Pat. No. 11,875,661, which is a continuation of U.S. application Ser. No. 17/377,213, filed Jul. 15, 2021 and issued on Apr. 11, 2023 as U.S. Pat. No. 11,626,002. The entirety of the disclosures of the prior applications are considered part of (and are incorporated by reference in) the disclosure of this application.

TECHNICAL FIELD

This document generally describes technology for detecting security events in a building from a variety of anomalous signals and automatically determining a floor map of a building to use for advising building occupants how to exit the building during an emergency or detected security event.

BACKGROUND

Buildings and homes can be equipped with security systems that identify security events, such as theft and/or burglary. The security systems can continuously monitor the buildings and homes, and notify occupants when a security event is detected. Some security systems can send alerts to mobile devices of the occupants. Some security systems can also contact police or other law enforcement. Some security systems can also output audio signals, such as alarms, in the building that make the occupants aware that a security event has been detected and also as a means to provoke a burglar or other criminal to leave the premises without causing more damage or harm.

For some types of emergencies and security events, such as fires, occupants can be urged to create emergency escape plans. The emergency escape plans can be in written document form and can include maps of a building layout, immediate exterior grounds, and details on windows, doors, and other exits from the building. The occupants can also be urged to develop recommendations for escaping the building during emergencies, which can take into account characteristics of each occupant as well as potential pathways that can be taken to exit from each room in the building. Fire and other emergency districts recommend that occupants become familiar with their escape plans and to rehearse them frequently. However, many occupants fail to create escape plans or update existing escape plans, let alone practice the plans regularly. Occupants may not be prepared in the event that a security event or other emergency is detected in the building.

SUMMARY

This document generally describes technology for detecting and identifying security events using signals from a distributed group of sensor devices within a premises (e.g., building, home, apartment, etc.). For example, a premises can be equipped with a group of sensor devices that are designed to unobtrusively monitor for conditions in their proximate area (e.g., within a room where the sensor devices are located), such as through being embedded within a light switch, outlet cover, light fixture, and/or other preexisting devices, structures, and/or features within a premises. Such sensor devices can include a collection of sensors that are configured to detect various conditions, such as microphones to detect sound, cameras to detect visual changes, light sensors to detect changes in lighting conditions, motion sensors to detect nearby motion, temperature sensors to detect changes in temperature, accelerometers to detect movement of the devices themselves, and/or other sensors. Such sensor devices can additionally include signaling components that are capable of outputting information to people that are nearby, such as speakers, projectors, and/or lights. These signaling components can output information, such as information identifying safe pathways for emergency egress of a building.

Sensor devices can be positioned throughout a premises and can provide sensed information about the environment within the premises to a central computing device and/or system. The central computing device and/or system can combine and use the sensed information to collectively detect security related events (e.g., emergencies) within the premises (and to distinguish between security related events and non-security events). Such a central computing device and/or system can include, for example, a device that is located within the premises and that communicates with the sensor devices (e.g., wireless communication, wired communication). The device located within the premises can process the signals locally and/or in combination with a remote computer system (e.g., cloud-based computing system). The central computing device and/or system can generate specific outputs that are appropriate for detected events and conditions within the premises, such as transmitting alerts and/or messages regarding related events to user devices associated with the premises (e.g., home automation devices, mobile devices, smart devices, etc.), causing one or more of the sensor devices to collectively output egress and/or other guidance to people within the premises, communicating with appropriate emergency personnel (e.g., fire department, police, emergency medical services), and/or other communication.

For example, in a house that includes sensor devices that are positioned in light switches and/or outlets throughout the house, when a window breaks in the house, each of the sensors devices may detect one or more signals associated with the window breaking, such as audio from the sound of the window breaking, an increase or decrease in light within a room from glass and/or other debris being scattered when the window breaks, and/or vibrations from the window breaking. This detected information (e.g., conditions, intensity, duration) can be transmitted to the centralized computing device and/or system along with timing information (e.g., timestamp for when conditions are detected). The centralized computing device and/or system can use this information along with the relative timing of the detected conditions in combination with a physical relationship of the sensor devices to each other within the premises (e.g., a map of the positioning of the sensor devices within the premises) to determine a type of event, a severity of the event, a location of the event within the premises, and/or other event-related information.

For instance, the sensor devices that are located within a room where the window broke may detect the event with a greatest decibel level, with a greatest vibration level, and as occurring the earliest in time relative to conditions detected by other sensor devices located in other rooms (e.g., since sound travels slower than light and may dissipate as it is absorbed by walls, furniture, and other items in a house, sensor devices located in other rooms may detect the window breaking later in time and with a smaller decibel level).

The centralized computing device and/or system can compare the received information and, using that information, may accurately classify the location where the event occurred (e.g., triangulate the location based on relative intensity and timing of signals detected by devices), the type and/or severity of event (e.g., categorize the type and/or severity based on patterns of detected conditions across different sensor devices), and other security-related information. Having classified the event, its location, the potential danger posed (e.g., based on event type and severity), and/or other event information, an appropriate output can be generated, such as transmitting alerts to user devices associated with the premises (e.g., transmitting push notifications to user smartphones), outputting appropriate guidance to people within the premises (e.g., directing them on safe pathway out of the premises), and/or alerting authorities.

To protect user privacy, the sensor devices may be limited to and/or restricted from detecting and transmitting particular subsets of information available for sensor-based detection. For example, a microphone that is included as part of a sensor device may be restricted to detecting decibel levels at one or more frequencies (and/or groups of frequencies) instead of detecting and transmitting entire audio waveforms. Similarly, cameras and/or light sensors may be restricted to detecting intensities of and/or changes in light across one or more frequencies and/or ranges of frequencies in the electromagnetic spectrum, such as the visible spectrum, the infrared spectrum, and/or others. Such sensor devices may be configured with such restrictions so as to permit for the devices to detect and/or transmit relevant information while at the same time avoiding potential issues related to cybersecurity that, if exploited, could provide an unauthorized third party with access to private information regarding the premises. By restricting the functionality of sensors within the sensor devices (e.g., hardware-based restrictions, firmware-based restrictions), regardless of cybersecurity threats, the sensors are not able to detect and/or transmit higher-fidelity information from within the premises, while at the same time still being able to detect information with sufficient granularity to provide useful and actionable signals for making security event determinations. However, in some instances, the sensors within the sensor devices may be unrestricted.

The sensor devices may further be configured to perform some local processing of signals to detect events before transmitting event information to the centralized computer device/system. For example, instead of transmitting a stream of decibel information to a centralized computer device/system for analysis to detect security related events, the sensor devices may perform local processing of the detected audio and, once one or more conditions and/or patterns have been detected, transmit audio information to the centralized computer device/system detailing that detected security related event. Such information can include, for example, the detected audio information and/or conditions that were satisfied to warrant the transmission to the centralized computer device/system, as well as a timestamp indicating when the audio was detected. The centralized computer device/system can synchronize clocks for the sensor devices so that when events are detected by the sensor devices, timestamps can be attached to that information across a normalized timescale. Therefore, the centralized computer device/system can identify relative timing of detected events across the different sensor devices.

The disclosed technology can determine a floor map of the premises to use for advising people within the premises about how to exit during detected security events or other emergencies. The centralized computing device/system can also create escape plans, based on pre-emergency and in-emergency motion detection of people within the premises and the floor map. The centralized computing device/system can identify and guide people to essential egress routes, which can be critical if the people have not created or rehearsed escape plans in advance. For example, it can be challenging or even impossible for people to rehearse escaping a premises when a burglar breaks in. The centralized computing device/system can therefore generate escape plans in such scenarios and provide instructions to the people that help them to safely and calmly escape the premises at the time of the detected burglary.

As another example, during a fire or other emergency, strategically placed voice and/or visual guidance prompts outputted by the sensor devices, user devices, or other devices positioned throughout the premises can instruct people in each room of the premises regarding effective egress paths, based on previously automatically identified floor maps and current emergency location information. The techniques described herein can be used to detect and advise for a variety of types of emergencies and security events, including but not limited to fires, gas leakage, water leaks, thieves entering the premises, burglary, carbon dioxide detection, and other types of security related events.

The disclosed techniques can also include an augmented reality (AR) interface to provide people with information about states of the premises (e.g., real-time information) and potential security events and non-security events. The sensor devices positioned throughout the premises can, for example, recognize voices of people within the premises. The sensor devices can learn which voices are associated with which people and can learn different tones and/or inflections in the voices. At any time, the people can speak out loud in locations that are proximate to the sensor devices and ask for a current state of the premises. The people can also ask for any other types of updates in the premises (e.g., where a child is, what the child is doing, whether there's a break-in or other emergency, what a loud sound in the kitchen was, etc.). The sensor devices can then perform the techniques described herein to detect the current state of the premises. As described throughout this disclosure, the sensor devices may also continuously and passively monitor the premises to detect and determine the current state of the premises. If the sensor devices do not detect a security related event, one or more of the sensor devices can output audio (or some other form of output) to the people that tells them everything is normal within the premises. The sensor devices can also provide output (e.g., audio) that answers whatever question the people or an occupant/user may pose (such as asking a sensor device what the loud sound in the kitchen was). If the sensor devices detect a security related event, the sensor devices can output a notification of the detected event and, based on the tone or inflection in the peoples' voices, instructions or guidance to help the people safely and calmly address the detected security event (e.g., egressing the premises along one or more predetermined escape plans).

One or more embodiments described herein can include a system for providing distributed security event monitoring in a premises. The system can include a central monitoring system for detecting a security event in a premises and a plurality of sensor devices positioned throughout the premises. The plurality of sensor devices can be configured to (i) passively detect conditions on the premises and (ii) emit signals that indicate guidance for people in the premises when the security event is detected by the central monitoring system. Each of the plurality of sensor devices can include a suite of sensors. Each of the plurality of sensor devices can be configured to passively detect, using the suite of sensors, the conditions on the premises, and transmit the detected conditions to the central monitoring system. The central monitoring system can be configured to receive the detected conditions from one or more of the plurality of sensor devices, combine the detected conditions to generate a collective of detected conditions, determine whether the collective of detected conditions exceeds expected threshold conditions for the premises beyond a threshold amount, and identify, based on determining that the collective of detected conditions exceeds the expected threshold conditions beyond the threshold amount, a security event on the premises. The central monitoring system can also classify the security event using one or more machine learning models that were trained to identify a type of the security event using training data that correlates information about conditions detected on premises with different types of security events, and generate, based on the classified security event, instructions to produce audio or visual output at the plurality of sensor devices. The output can notify the people on the premises about the security event. The central monitoring system can also transmit the instructions to one or more of the plurality of sensor devices for the one or more of the plurality of sensor devices to emit signals indicating information about the security event.

The one or more embodiments can optionally include one or more of the following features. For example, the type of the security event can include at least one of a burglary, a theft, a break-in, a fire, a gas leak, and a flood. Classifying the security event using one or more machine learning models can include determining, based on (i) the type of the security event and (ii) a magnitude in deviation of the collective of detected conditions from the expected threshold conditions, a severity level of the security event, and determining a location of the security event based on (i) a map of the premises that was generated by the central monitoring system, (ii) timestamps indicating when the conditions were detected by the plurality of sensor devices, and (iii) positioning information of each of the plurality of sensor devices on the premises. Moreover, the central monitoring system can further be configured to transmit, based on determining that the severity level of the security event exceeds a threshold reporting level, a notification about the security event to emergency response personnel.

As another example, the expected threshold conditions can be normal conditions on the premises that have been identified by the central monitoring system based on a historic spread of conditions detected by the plurality of sensor devices over a predetermined period of time.

Sometimes, the central monitoring system can also be configured to generate instructions to produce (i) audio output when the collective of detected conditions satisfy a first output threshold condition and (ii) visual output when the collective of detected conditions satisfy a second output threshold condition. The first output threshold condition can include detection of at least one of a fire, smoke, and an obstruction of visual output devices of the plurality of sensor devices. The second output threshold condition can include detection of at least one of a fire, a break-in, a burglary, and an obstruction of audio output devices of the plurality of sensor devices.

The central monitoring system can also be further configured to determine, before detection of a security event, a map of the premises, the map indicating routes within the premises, including exits out of the premises and determine, based on the map and the collective of detected conditions, one or more exit routes that can be used by people to exit the premises. The collective of detected conditions can include location information indicating one or more locations on the premises where the security event may be located, and the exit routes can avoid the one or more locations where the security event may be located. The central monitoring system can also transmit signaling instructions to one or more of the plurality of sensor devices for the one or more of the plurality of sensor devices to emit signals that indicate to the people an exit route to exit the premises.

Sometimes, the emitted signals can comprise voice commands. The voice commands can comprise at least one of instructions to guide the people to exit the premises and information about the security event. The information about the security event can include the type of the security event, a location of the security event, and a severity level of the security event. Sometimes, the emitted signals can comprise light signals. The light signals can include directional signals that direct the people to an exit route that avoids a location of the security event.

As another example, the suite of sensors can include at least one of a light sensor, an audio sensor, a temperature sensor, a motion sensor, a user presence sensor, an image sensor, and a smoke sensor. The audio sensor can, for example, be configured to detect changes in decibels in an area proximate to a location of the audio sensor. Sometimes, the plurality of sensor devices can be integrated into at least one of outlet covers, light switches, alert systems, thermostats, and light fixtures that are installed on the premises. One of the plurality of sensor devices can sometimes be configured to operate as the central monitoring system and the other sensor devices of the plurality of sensor devices can communicate amongst each other.

As yet another example, one or more of the plurality of sensor devices can be configured to identify the security event and transmit information about the identified security event to the central monitoring system. The central monitoring system can then receive the identified security event from one or more of the plurality of sensor devices, classify the security event, generate instructions to produce output by the plurality of sensor devices about the security event, and transmit the instructions to the plurality of sensor devices.

One or more of the plurality of sensor devices can also be configured to detect audio input from a person on the premises and transmit the audio input and a respective timestamp to the central monitoring system. The audio input can include a request for information about a current state of the premises. The central monitoring system can then be configured to receive the audio input and the respective timestamp, transmit, based on the request for information in the audio input, requests to each of the plurality of sensor devices for conditions detected at a similar time as the timestamp, receive, from one or more of the plurality of sensor devices, the conditions detected at the similar time as the timestamp, identify the current state of the premises based on comparing the detected conditions to historic threshold conditions for the premises at the similar time as the timestamp, generate instructions for the one or more of the plurality of sensor devices to provide audio output to the person indicating the current state of the premises, and transmit, to the one or more of the plurality of sensor devices, the instructions to provide audio output to the person.

As yet another example, the central monitoring system can further be configured to transmit the instructions to provide output to one or more mobile devices of the people on the premises. The instructions can cause the one or more mobile devices to output at least one of audio signals, text messages, and push notifications about the security event. Moreover, each of the plurality of sensor devices further can include an audio signal generator and a visual signal generator. The visual signal generator can include a projector that projects a lighted sign on a surface, and the surface can be one or more of a wall, a floor, and a ceiling on the premises. The premises can be at least one of a building, a home, and an apartment.

One or more embodiments described herein can also include a method for providing distributed security event monitoring in a premises. The method can include receiving, by a computing system and from a plurality of sensor devices, detected conditions on a premises. The plurality of sensor devices can include a suite of sensors that passively detect the conditions on the premises, and the plurality of sensor devices can be positioned throughout the premises. The method can also include combining, by the computing system, the detected conditions to generate a collective of detected conditions, determining, by the computing system, whether the collective of detected conditions exceeds expected threshold conditions for the premises beyond a threshold amount, identifying, by the computing system and based on determining that the collective of detected conditions exceeds the expected threshold conditions beyond the threshold amount, a security event on the premises, classifying, by the computing system, the security event using one or more machine learning models that were trained to identify a type of the security event using training data that correlates information about conditions detected on premises with different types of security events, generating, by the computing system and based on the classified security event, instructions to produce audio or visual output at the plurality of sensor devices, and transmitting, by the computing system to one or more of the plurality of sensor devices, the instructions for the one or more of the plurality of sensor devices to emit signals indicating information about the security event. The output can notify the people on the premises about the security event.

The method can optionally include one or more of the abovementioned features. As another example, the computing system can be at least one of remote from the premises, centralized at the premises, and one of the plurality of sensor devices.

The details of one or more implementations are depicted in the associated drawings and the description thereof below. Certain implementations of the disclosed techniques may provide one or more advantages. For example, emergency plans can be generated, and used in detected security events, even if people within the premises have not previously generated, reviewed, practiced, or seen emergency plans. Dynamic evacuation guidance can be provided that is based on real-time situational information about people and compromised location(s) within the premises. Real-time information about a current detected security event can be exchanged between sensor devices positioned within the premises, mobile devices or other user devices of the people on the premises, a centralized computer device/system, and devices/systems of emergency response personnel/teams. This communication can be beneficial to ensure that people within the premises are made aware of security related events as soon as they happen and respond safely and calmly. The disclosed technology can therefore provide people with appropriate guidance and notifications that help the people to reach safety, regardless of the type of security event that is detected on the premises.

Moreover, the centralized computer device/system can evaluate possible escape routes, determined from automatically generated floor maps, select recommended escape route(s), and instruct sensor devices positioned throughout the premises and/or user devices of the people within the premises to inform the people of the recommended escape route(s). As a result, when a security event is detected, the centralized computer device/system may determine how the people can reach safety and guidance to get the people quickly and calmly to safety.

As another example, the disclosed techniques provide for passively monitoring conditions in the premises to detect security related events while also preserving privacy of people on the premises. Passive monitoring can include collection of anomalous signals, such as changes in lighting, temperature, motion, and/or decibel levels and comparing those anomalous signals to normal conditions for the premises. Sudden changes in decibel levels and/or temperature levels, for example, can be indicative of a security related event. The sensor devices, therefore, may be restricted to detect particular types of signals that do not involve higher-fidelity information from within the premises but enough granularity to provide useful and actionable signals for making security event determinations. Thus, the people on the premises may not be tracked as they go about their daily lives and their privacy can be preserved.

The disclosed techniques can also provide for accurately identifying types of security events, locations of such security events, and severity of the security events. The centralized computer device/system can, for example, be trained to identify different types of security events by correlating various different signals captured during a similar timeframe and from sensor devices in different location throughout the premises. The centralized computer device/system can, for example, correlate audio signals indicating a sharp increase in sound like a glass window breaking, motion signals indicating sudden movement near a window where the audio signals were captured, and a video feed or other image data showing a body moving near the window where the audio signals were captured to determine where and when a break-in occurred on the premises. The centralized computer device/system can also be trained to determine a severity of this identified security event based on the linked signals. Using the determined information, the centralized computer device/system can also identify appropriate action(s) to take, such as notifying people on the premises, notifying emergency response personnel, and/or providing the people with guidance to safely, quickly, and calmly egress using one or more predetermined escape plans.

The disclosed techniques also provide for seamless and unobtrusive integration of sensor devices and existing features on the premises. Sensor devices described herein can be integrated into wall outlets, lightbulbs, fans, light switches, and other features that may already exist on the premises. Existing sensor devices, such as fire alarms, smoke detectors, temperature sensors, motion sensors, and/or existing security systems can also be retrofitted in the building to communicate detected signals with installed sensor devices, user devices, mobile devices of people on the premises, and the centralized computer device/system described herein. Such seamless and unobtrusive integration can provide for performing the techniques described throughout this disclosure without interfering with normal activities of people on the premises and an aesthetic design/appeal of the premises.

Additionally, the disclosed techniques provide for robust security systems that incorporate artificial intelligence (AI) and/or augmented reality (AR). Seamless integration of sensor devices on the premises can provide more intuitive and unobtrusive detection of security related events on the premises. Such seamless integration can also make it easier for people on the premises to learn about and get updates about current activity on the premises. For example, if an occupant hears an abnormal sound, such as a crashing sound, the occupant can speak out loud by asking a sensor device located in a same room as the occupant whether everything is okay. The sensor device can ping other sensor devices on the premises for sensed conditions and can determine, based on those sensed conditions, whether a security related event has been detected. Based on this determination, the sensor device can respond to the occupant and output information (e.g., audio output) that informs the occupant about the current state of the premises. This provides a more intuitive and easier-to-use user interface for the people on the premises, especially if the people are concerned, nervous, or otherwise in a state of frenzy. The people can therefore receive updates about conditions on the premises and/or request updates on conditions on the premises without having to use additional devices such as mobile devices or mobile applications.

As yet another example, the disclosed techniques provide for local processing at sensor devices to avoid clogging network bandwidth. Since some processing, such as determining whether detected signals are indicative of a security related event, can be performed locally at a sensor device, computing resources can be better allocated and efficiently used at the centralized computer device/system. As a result, the centralized computer device/system can more quickly and efficiently utilize available computer resources and network bandwidth to perform other processing, including but not limited to detecting security related events, assessing type and/or severity of such events, generating output and guidance for people on the premises, and determining appropriate egress plans on the premises.

Other features, objects, and advantages of the technology described in this document will be apparent from the description and the drawings, and from the claims.

BRIEF DESCRIPTION OF THE DRAWINGS

Like reference symbols in the various drawings indicate like elements.

DETAILED DESCRIPTION

This document generally describes systems and methods for detecting security events from anomalous signals and generating floor maps and guidance based on the floor maps to assist people on a premises, such as occupants in a building, how to respond to the detected security event(s). For example, the building can be equipped with a group/plurality of sensor devices that are designed to passively and unobtrusively monitor conditions in the devices' proximate areas, such as a room where a sensor device is located. The sensor devices can be embedded in existing features or fixtures in the building, such as a light switch, outlet cover, light fixture, and/or other preexisting devices, structures, and/or features. The detected conditions can be received by a centralized hub (e.g., centralized computer device/system), which can determine whether the detected conditions exceed expected threshold levels at a particular time when the conditions are detected and/or whether the detected conditions exceed normal conditions for the building that are learned over time. The centralized hub can use the detected conditions along with relative timing of the detected conditions and a physical relationship of the sensor devices to each other in the building to determine and classify a type of security event, a severity of the event, a location of the event, and/or other event related information. Other event related information can include instructions for guiding occupants of the building to safety along one or more predetermined exit routes out of the building.

Figure 1:
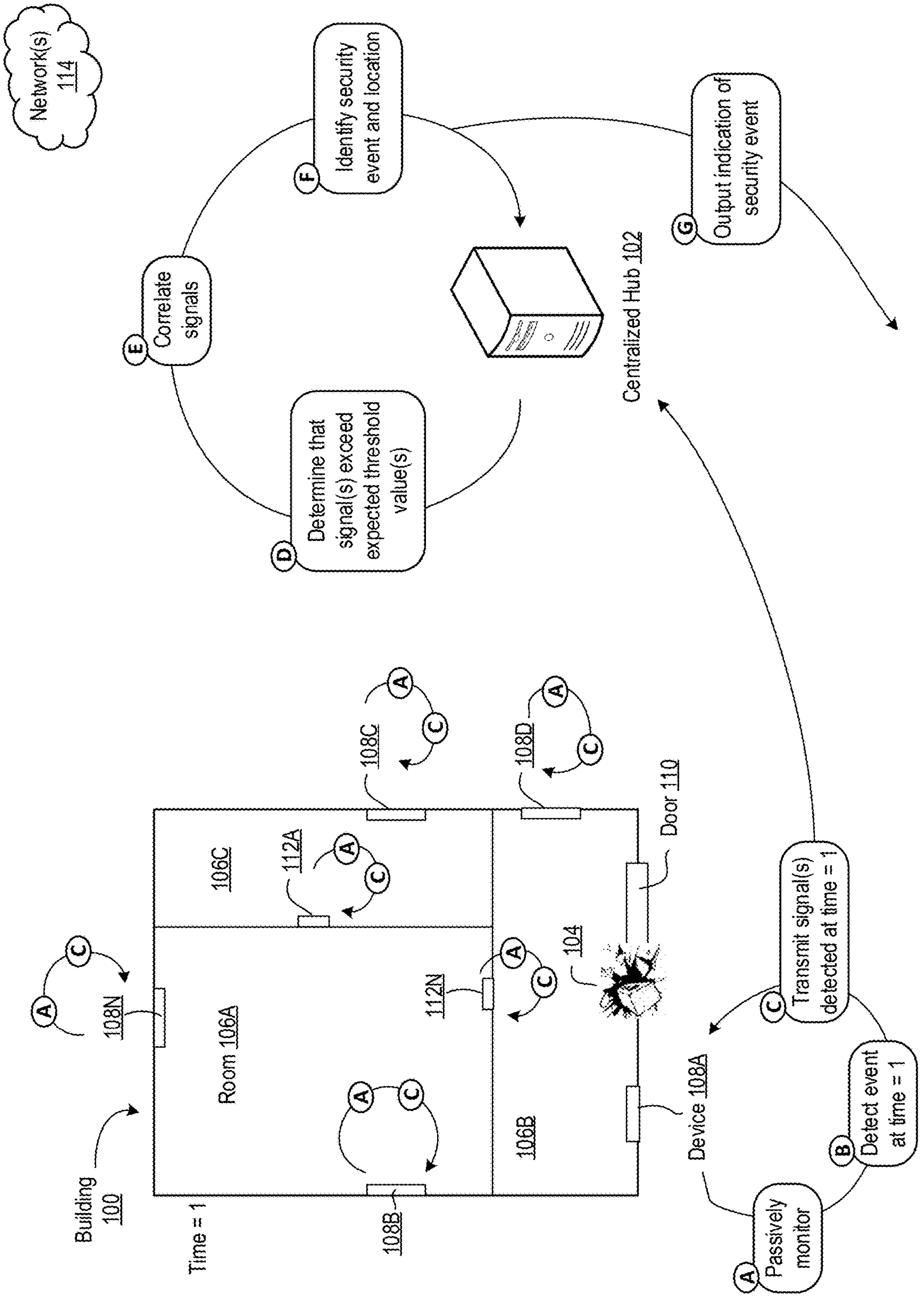
FIG. 1 is a conceptual diagram of an example centralized hub for detecting and identifying a security event in a building using a variety of anomalous signals.

Referring to the figures, FIG. 1 is a conceptual diagram of an example centralized hub 102 for detecting and identifying a security event in a building 100 using a variety of anomalous signals. A variety of different types of security events can be detected using the disclosed techniques. The security events can include, but are not limited to, break-ins, burglary, theft, natural disasters, fire, carbon monoxide, flood, gas leaks, and other types of emergencies. The centralized hub 102 can be in communication via network(s) 114 with sensor devices 108A-N and sensors 112A-N. The centralized hub 102, sensor devices 108A-N, and/or sensors 112A-N can also be in communication via network(s) 114 with a security system for the building 100. Communication can be wired and/or wireless (e.g., BLUETOOTH, WIFI, ETHERNET, etc.). Communication can also be through a home network.

The centralized hub 102 can be a computer system or network of computers. The centralized hub 102 can be located at the building 100. For example, the centralized hub 102 can be one of the sensor devices 108A-N. The centralized hub 102 can also be any other type of computing device and/or computer system that can be integrated into the building 100. For example, the centralized hub 102 can be a computing device or other type of device with a display screen. The centralized hub 102 can be located in a central location in the building 100, such as near a front door 110, and can provide building occupants with information about conditions in the building 100 as well as predetermined escape plans. The building occupants can provide updated information about the occupants and/or the building 100 to the centralized hub 102 via the display screen. This input can then be used by the centralized hub 102 to improve or otherwise modify security event detections and escape plan determinations. The centralized hub 102 can also be remote from the building 100. For example, the centralized hub 102 can be a cloud based computing system that is configured to identify security events based on anomalous signals that are detected and received from sensor devices and sensors in different buildings.

The sensor devices 108A-N can be configured to continuously and passively monitor conditions throughout the building 100. The sensor devices 108A-N can be networked with each other (e.g., via a home network) such that they can communicate with each other. For example, in a scenario where the centralized hub 102 goes down or a connection between the sensor devices 108A-N and the centralized hub 102 goes down, the sensor devices 108A-N can communicate with each other to determine a state of activity in the building 100 and whether a security event is detected. Each of the sensor devices 108A-N can also operate as a centralized hub. Sometimes, each of the sensor devices 108A-N can take turns operating as the centralized hub. Sometimes, one of the sensor devices 108A-N can be assigned as the centralized hub. When a sensor device operates as the centralized hub, the senor device can ping or otherwise communicate with the other sensor devices to determine when abnormal signals are detected in the building, whether a security event has or is occurring, and what guidance or instructions can be generated and provided to building occupants.

As described further below, the sensor devices 108A-N can include a suite of sensors that passively monitor different conditions or signals in the building 100. For example, the sensor devices 108A-N can include audio, light, visual, temperature, smoke, and/or motion sensors. The sensors can pick up on or otherwise detect anomalous and random signals, such as changes in decibels, flashes of light, increases in temperature, strange odors, and/or sudden movements. Therefore, the sensor devices 108A-N may not be actively monitoring building occupants as they go about with their daily activities. In other words, to protect occupant privacy, the sensor devices 108A-N can be limited to and/or restricted to detecting intensities of and/or changes in different types of conditions in the building 100. The sensor devices 108A-N may transmit particular subsets of detected information so as to protect against third party exploitation of private information regarding the occupants and the building 100. The sensor devices 108A-N can detect and/or transmit information such as changes or deltas in decibel levels, light, motion, movement, temperature, etc.

Some sensor devices 108A-N can include a first subset of sensors while other sensor devices 108A-N can include a second, third, etc. subset of sensors. As an example, a first sensor device located in a room can include audio and light sensors and a second sensor device located in the same room can include image and temperature sensors. One or more other suites of sensors in the sensor devices 108A-N positioned throughout the building 100 are possible. The sensor devices 108A-N can also include output devices, such as audio and visual outputs (e.g., microphones, lights, speakers, projectors, etc.) so that the sensor devices 108A-N can provide guidance and/or instructions to building occupants when a security event is detected. As described further herein, the sensor devices 108A-N can also provide output to the building occupants that indicates a current state of the building 100.

For example, a building occupant can speak to one of the sensor devices 108A-N and ask for an update on the state of the building 100. Using the techniques described herein, the sensor device and/or the centralized hub can determine the current state of the building 100. The sensor device can generate audio output that tells the occupant what is happening in the building 100. The sensor device can also generate output that visually represents the current state of the building 100. For example, using augmented reality (AR), the sensor device can project visual representations of the building 100 on a surface proximate to the occupant (e.g., on a wall and/or a floor) that indicate the current state of the building 100. Visual representations can include an image or video clip of a particular area in the building 100 where activity was detected, text describing or explaining what activity (or inactivity) was detected in the building 100, and the like.

The sensor devices 108A-N can be unobtrusively integrated into the building 100. Sometimes, the sensor devices 108A-N can be integrated or retrofitted into existing features in the building 100, such as in light fixtures, light bulbs, light switches, power outlets, and/or outlet covers. The sensor devices 108A-N can also be standalone devices that can be installed in various locations throughout the building 100 so as to not interfere with the daily activities of the building occupants and to be relatively hidden from sight to preserve aesthetic appeal in the building 100. For example, the sensor devices 108A-N can be installed in corners, along ceilings, against walls, etc.

In the example building 100, the sensor devices 108A-N are positioned in each room 106A-C. Sensor devices 108B and 108N have been positioned in room 106A. Sensor devices 108A and 108D have been positioned in room 106B. Sensor device 108C has been positioned in room 106C. Multiple sensor devices can be positioned in one room. Sometimes, only one sensor device can be positioned in a room. Moreover, sometimes a sensor device may not be positioned in a room. Instead, the room can include one or more standalone sensors 112A-N.

The sensors 112A-N can be positioned throughout the building 100. Sometimes, the sensors 112A-N can already be installed in the building 100 before the sensor devices 108A-N and the centralized hub 102 are added to the building 100. For example, the sensors 112A-N can include existing security cameras, smoke detectors, fire alarms, user motion sensors, light sensors, etc. Some of the rooms 106A-C in the building 100 can include the sensors 112A-N while other rooms may not. In some implementations, one or more of the sensors 112A-N can be integrated into or otherwise part of the sensor devices 108A-N. In the example building 100, sensor 112A is positioned in the room 106C and sensor 112N is positioned in the room 106A. One or more additional sensors 112A-N can be installed throughout the building 100.

Still referring to FIG. 1, the centralized hub 102 can synchronize clocks of the sensor devices 108A-N and optionally the sensors 112A-N. Synchronization can occur at predetermined times, such as once a day, once every couple hours, at night, and/or during inactive times in the building. To synchronize clocks, the centralized hub 102 can send a signal with a timestamp of an event to all of the sensor devices 108A-N and optionally the sensors 112A-N. All the sensor devices 108A-N can then synchronize their clocks to the timestamp such that they are on a same schedule. The centralized hub 102 can also transmit a signal to the sensor devices 108A-N and optionally the sensors 112A-N that indicates a local clock time. The sensor devices 108A-N can then set their clocks to the same local time. Synchronization makes matching up or linking of detected signals easier and more accurate to detect security events in the building 100. In other words, when security events are detected by the sensor devices 108A-N and/or the centralized hub 102, timestamps can be attached to detected conditions/information across a normalized scale. The centralized hub 102 and/or the sensor devices 108A-N can accordingly identify relative timing of detected events across the different sensor devices 108A-N, regardless of where the devices 108A-N are located in the building 100.

At time=1, each of the sensor devices 108A-N and the sensors 112A-N can passively monitor conditions in the building 100 (step A). For example, the sensor devices 108A-N can collect temperature readings in each of the rooms 106A-C during one or more times (e.g., every 2 minutes, every 5 minutes, every 10 minutes, etc.). As another example, the sensor devices 108A-N can collect decibel readings in each of the rooms 106A-C at predetermined times and/or continuously. The sensor devices 108A-N can collect one or more other signal readings as described herein (e.g., motion, light, etc.).

As mentioned throughout, the sensor devices 108A-N can passively monitor conditions in such a way that protects occupant privacy. The sensor devices 108A-N may be limited to and/or restricted from detecting and transmitting particular subsets of information available for sensor-based detection. For example, an audio sensor can be restricted to detect only decibel levels at one or more frequencies (and/or groups of frequencies) instead of detecting and transmitting entire audio waveforms. Similarly, cameras, image sensors, and/or light sensors may be restricted to detecting intensities of and/or changes in light across one or more frequencies and/or ranges of frequencies in the electromagnetic spectrum, such as the visible spectrum, the infrared spectrum, and/or others. Configuring the sensor devices 108A-N with such restrictions allows for the devices 108A-N to detect and/or transmit relevant information while at the same time avoiding potential issues related to cybersecurity that, if exploited, could provide an unauthorized third party with access to private information regarding building occupants. Although functionality of sensors within the sensor devices 108A-N may be restricted, the sensor devices 108A-N can still detect information with sufficient granularity to provide useful and actionable signals for making security event determinations and further classifications.

One or more of the sensor devices 108A-N can detect an event at time=1 (step B). In the example of FIG. 1, the sensor device 108A detects an event in the room 106B. The event can be a break-in, which is represented by a brick 104 being thrown through the door 110 and into the room 106B. The sensor device 108A can detect the event in a variety of ways. For example, at time=1, the sensor device 108A is passively monitoring signals (step A) in the room 106B, at which point a sharp increase in decibel readings can be detected. The sharp increase in decibel readings can indicate the brick 104 being thrown through the door 110 and breaking glass of the door 110. The sharp increase in decibel readings may not be a normal condition or expected signal for the building 100 or the particular room 106B. Thus, the sensor device 108A can detect that some abnormal event has occurred at time=1 (step B).

Likewise, the sensor device 108A can detect a sudden movement by the door 110, which can represent the brick 104 hitting the door 110 and landing inside of the room 106B. The sudden detected movement may not be a normal condition or expected signal for the building 100, the particular room 106B, and/or at time=1. Thus, the sensor device 108A can detect that some abnormal event has occurred at time=1 (step B).

The sensor device 108A can transmit the detected signal(s) at time=1 to the centralized hub 102 (step C). Moreover, once an event is detected (step B), each of the sensor devices 108A-N and optionally the sensors 112A-N can transmit any signals that were detected at time=1 to the centralized hub 102. This is why synchronization of clocks of the sensor devices 108A-N and optionally the sensors 112A-N is performed. The other sensor devices 108B-N and the sensors 112A-N can be notified or pinged by the sensor device 108A when the event is detected (step B) so that the other sensor devices 108B-N and the sensors 112A-N can transmit signals that they detected at the same time as the event (step C). The detected signal(s) can be transmitted to the centralized hub 102 with timing information, such as a timestamp of when the signals and/or condition were detected.

Sometimes, the sensor devices 108A-N and the sensors 112A-N can continuously transmit detected signals (step C) to the centralized hub 102. Therefore, the centralized hub 102 can receive a string of signals from one or more or all of the sensor devices 108A-N and the sensors 112A-N. The sensor devices 108A-N and the sensors 112A-N can transmit detected signals to the centralized hub 102 at predetermined times (e.g., every 1 minute, 2 minutes, 5 minutes, etc.). Sometimes, the sensor devices 108A-N and the sensors 112A-N can transmit detected signals based on receiving a request from the centralized hub 102 for the signals. For example, the centralized hub 102 can ping the sensor devices 108A-N and the sensors 112A-N at predetermined times and request the sensor devices 108A-N and the sensors 112A-N for any changes in detected signals. If changes have been detected, then the signals can be transmitted to the centralized hub 102. If changes have not been detected then the signals may not be transmitted to the centralized hub 102. Moreover, as described above, the sensor devices 108A-N and the sensors 112A-N can be triggered to transmit signals to the centralized hub only upon detection of some event by one or more of the sensor devices 108A-N and/or the sensors 112A-N (step B).

Once the centralized hub 102 receives the detected signals, the centralized hub 102 can determine whether any of the signals exceed expected threshold values (step D). The centralized hub 102 can combine the detected signals into a collective of signals and determine whether the collective of signals exceeds expected threshold values for the building 100. The centralized hub 102 can also use the relative timing information and physical relationship of the sensor devices 108A-N in the building 100 to determine, for the signals or collective of detected signals that exceed the expected threshold values, a type of security event, a severity of the event, a location of the event, and/or other event-related information.

For example, as described further below, the centralized hub 102 can compare the detected signals to historic signals that correspond to the building 100 and/or the room in which the signal was detected. For the sharp increase in decibel readings in the room 106B, the centralized hub 102 can compare this increase to expected decibel readings for the room 106B. The expected decibel readings for the room 106B can be based on previous decibel readings for the room at the same or similar time as time=1. For example, if time=1 is at 8:30 in the morning, the expected decibel readings can be a historic spread of decibel readings that were taken at 8:30 in the morning over a certain number of days. At 8:30 in the morning, historic changes in decibel readings can be very low because building occupants may still be asleep at that time. Therefore, if the detected signals at time=1 is a sudden increase in decibel readings that deviates from the expected signals at time=1, the centralized hub 102 can determine that the detected signal likely represents some type of security event.

The centralized hub 102 can also determine whether any of the other received signals from the sensor devices 108A-N and the sensors 112A-N deviate from expected threshold values (step D). For example, the sensor device 108N in the room 106A at a back of the building 100 can detect a change in decibel readings that, although may be less of a sharp increase than the change in decibel readings detected by the sensor device 108A, is abnormal for that room 106A and/or time. After all, sound can travel slower and can bounce off of objects or other features in the building 100, thereby causing the decibel readings in a different area of the building 100 to be of lesser magnitude. Since the clocks of the sensor devices 108A-N are synchronized and the sensor device 108N detected a change in decibel readings at the same or similar time that the sensor device 108A detected a change in decibel readings, the centralized hub 102 can confirm that a security event was detected by the sensor device 108A.

Accordingly, the centralized hub 102 can correlate the detected signals (step E). Correlating the signals can include linking signals that deviate from the expected threshold values to piece together and identify the security event. As described herein, the centralized hub 102 can correlate different types of signals to piece together the security event. For example, the centralized hub 102 can link together decibel signals from the sensor device 108A with motion signals from the sensor device 108D and decibel signals from one or more of the other sensor devices 108B, 108C, and 108N and/or the sensors 112A and 112N. The centralized hub 102 can also link together the above mentioned signals with video or other image data that is captured by an existing security system inside or outside the building 100. By correlating different types of detected signals, the centralized hub 102 can more accurately determine what type of security event has occurred at time=1.

The centralized hub 102 can identify the security event and location of the security event (step F). For example, the centralized hub 102 can use one or more machine learning models that are trained to identify a type of security event from different types of signals, correlated signals, changes/deviations in signals, etc. The centralized hub 102 can categorize the type of the security event based on patterns of detected signals across different sensor devices 108A-N and/or sensors 112A-N. The models can be trained using deep learning (DL) neural networks, convolutional neural networks (CNNs), and/or one or more other types of machine learning techniques, methods, and/or algorithms. The models can also be trained using training data that includes signals that have been detected by the sensor devices 108A-N and/or the sensors 112A-N in the building 100. The models can be trained to identify security events based on detected signals and expected conditions of the particular building 100. The models can also be trained to identify security events based on signals and expected conditions in a variety of different buildings.

The centralized hub 102 can determine a location of the security event (step F) based on where, for example, a deviation in detected signals is greatest. The centralized hub 102 can also determine the location based on video or other image data that can be received from one or more of the sensor devices 108A-N, the sensors 112A-N, and/or camera security systems installed at the building 100. The video or other image data can capture the detected security event at time=1. In some implementations, the centralized hub 102 can determine the location by triangulating the location based on relative intensity and timing of signals that are detected by the sensor devices 108A-N and/or the sensors 112A-N.

As described further below, the centralized hub 102 can also determine a severity of the security event (step F). This determination can be made using one or more machine learning models. This determination can also be made based on comparing and correlating patterns of detected signals across the different sensor devices 108A-N and/or the sensors 112A-N.

Based on the identification of the security event, the location of the security event, and the severity of the security event, the centralized hub 102 can output an indication of the security event (step G). In some implementations, the centralized hub 102 can generate instructions that can be used by the sensor devices 108A-N and/or one or more other devices in the building 100 to output information about the security event to building occupants.

As described further below, the centralized hub 102 can determine that building occupants should receive guidance to safely, calmly, and quickly exit the building 100. The centralized hub 102 can determine that this guidance should be outputted as text messages to the occupant's mobile devices instead of audio or visual outputs by the sensor devices 108A-N and/or the occupant's mobile devices. The centralized hub 102 can determine that audio or visual outputs may increase safety risks to the occupants since it can bring more attention to them. The centralized hub 102 can also automatically contact emergency response personnel to report the break-in. Determining whether to contact emergency response personnel can be based on the type of security event and the severity of the security event. When the centralized hub 102 provides guidance to help the occupants safely egress from the building 100, the centralized hub 102 can determine optimal egress pathways based on a floorplan of the building 100, locations of the occupants in the building, and/or the location of the security event, as described further below.

Although FIG. 1 is described in reference to an example break-in security event, the techniques described in FIG. 1 are not so limiting and apply to various types of security events and other emergencies. For example, steps A-G can be performed when fires, floods, gas leaks, and natural disasters are detected. Steps A-G can also be performed when other types of security-related events are detected in the building 100. The techniques described herein therefore provide a robust security and emergency detection and guidance system.

Moreover, in some implementations, one or more of the steps A-G can be performed by one or more of the sensor devices 108A-N instead of at the centralized hub 102. For example, instead of transmitting a stream of decibel information or other detected signals to the centralized hub 102 for analysis to detect security related events, the sensor devices 108A-N may perform local processing of the detected signals and identify patterns amongst the detected signals (such as in steps D and E). The sensor devices 108A-N can sometimes identify a security event and information about the security event (such as in step F), and then transmit such information to the centralized hub 102. The centralized hub 102 can perform additional processing, such as classifying the security event based on type, location, and/or severity (such as in step F). The centralized hub 102 can also determine what type of output should be generated and transmitted back to the sensor devices 108A-N or other devices in the building 100 (such as in step G).

Figure 2A:
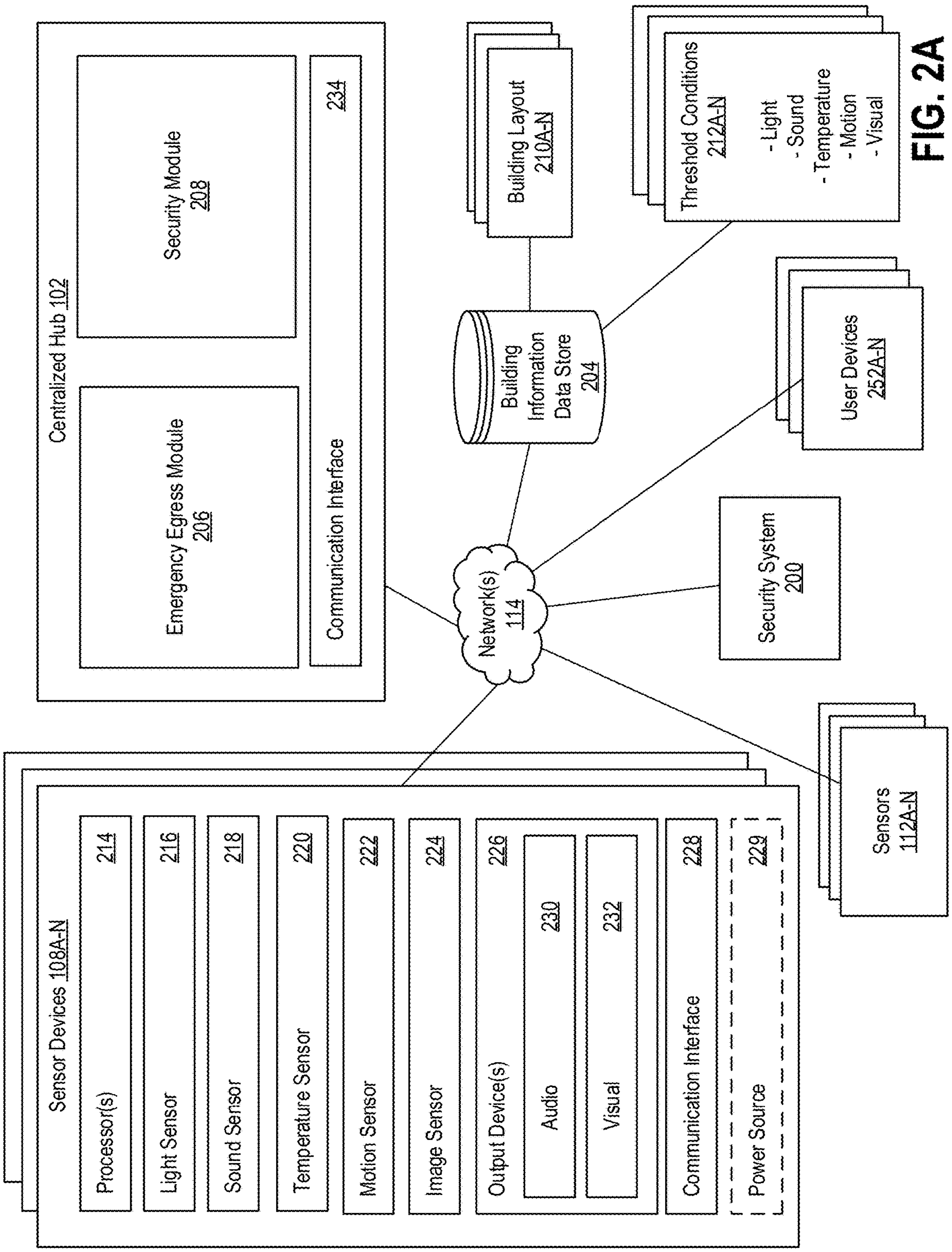
FIGS. 2A-C depict example system components that can be used to perform the techniques described herein.
Figure 2B:
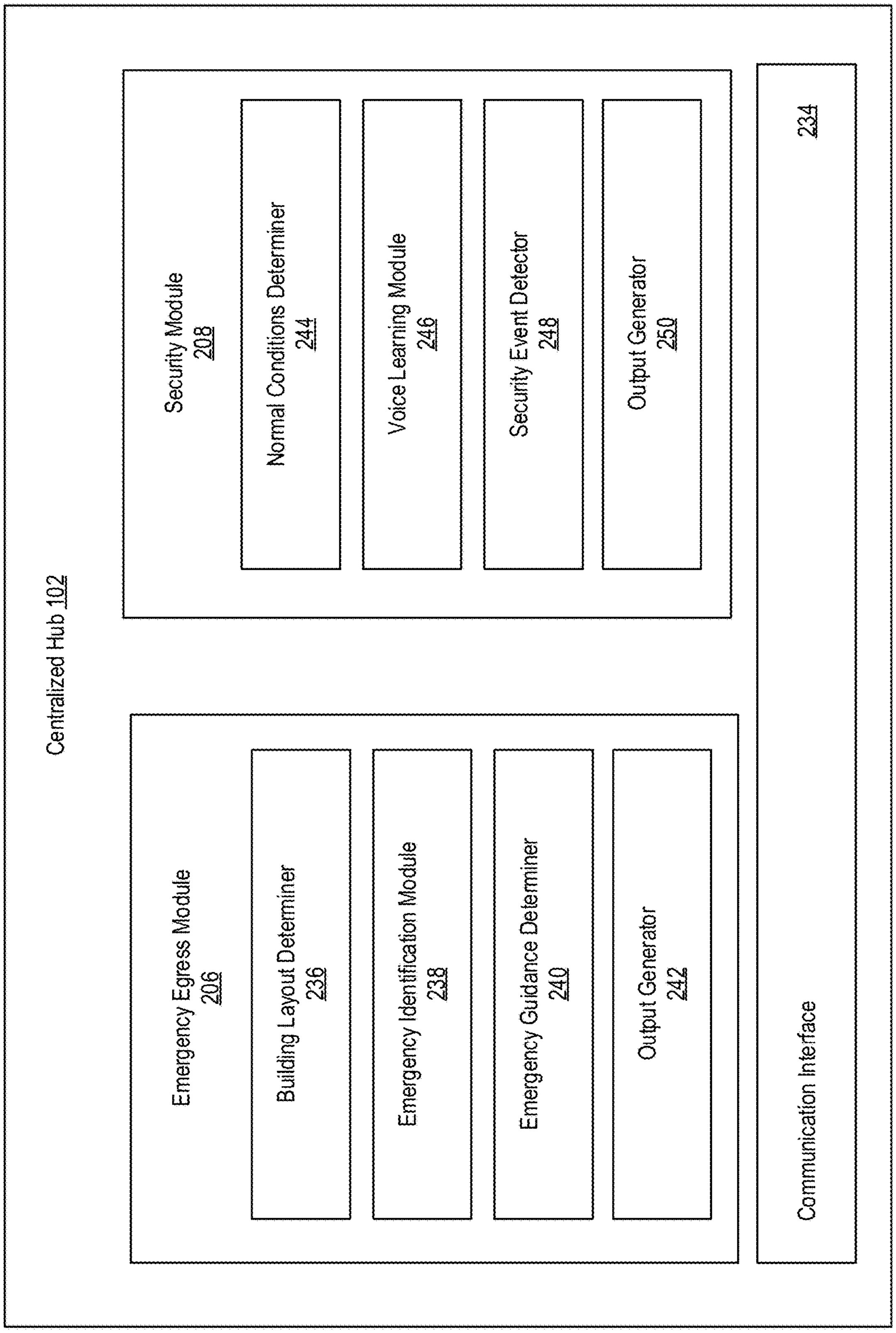
Figure 2C:
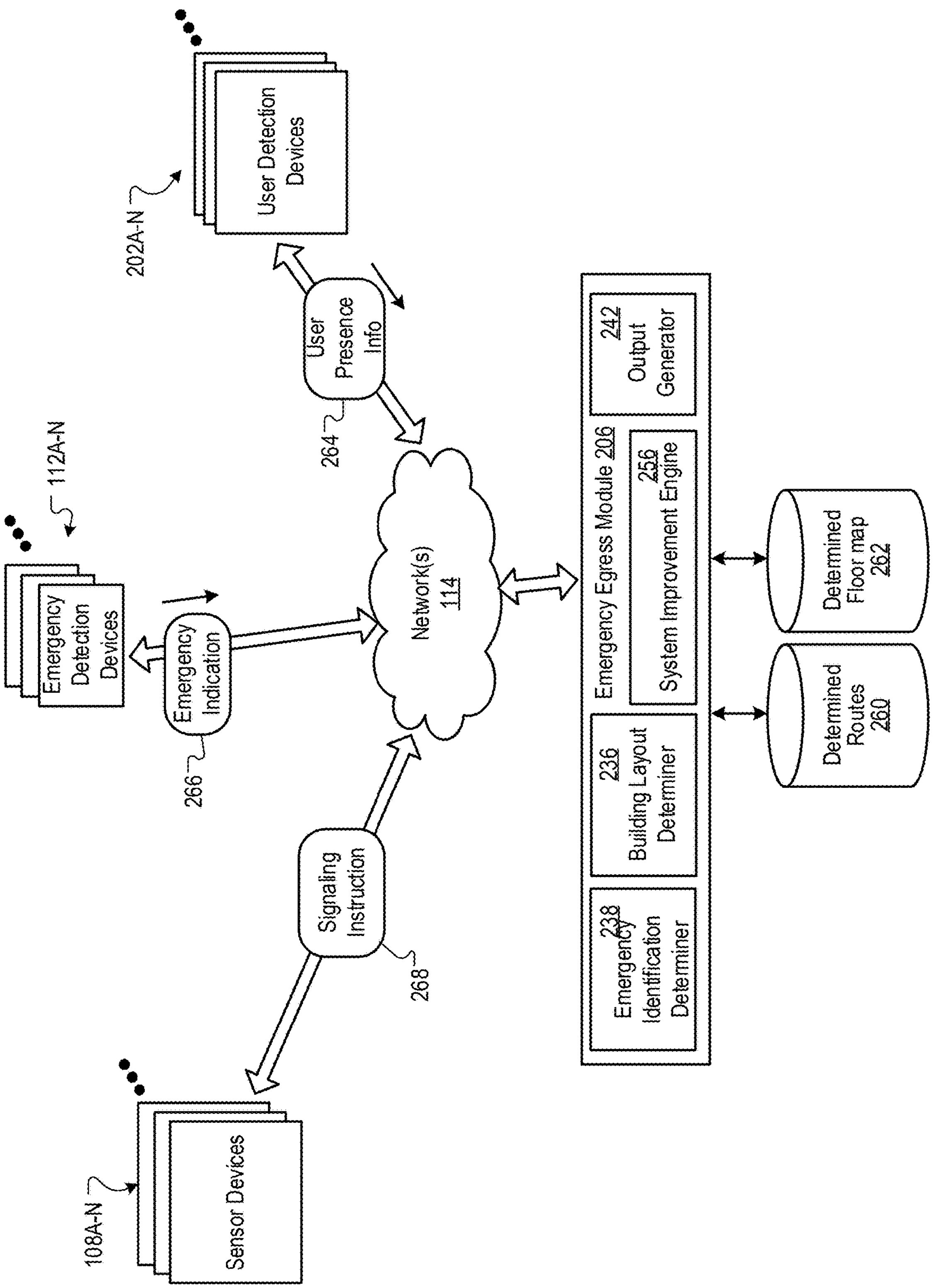

FIGS. 2A-C depict example system components that can be used to perform the techniques described herein. Referring to FIG. 2A, as described in reference to FIG. 1, the centralized hub 102, sensor devices 108A-N, and sensors 112A-N can communicate via the network(s) 114. The centralized hub 102, sensor devices 108A-N, and sensors 112A-N can also communicate with a security system 200 and building information data store 204 via the network(s) 114.

The sensor devices 108A-N can be configured to passively monitor anomalous signals and other conditions in a building, as described throughout this disclosure. To do so, the sensor devices 108A-N can include a suite of sensors and other components, including but not limited to processor(s) 214, light sensor 216, sound sensor 218, temperature sensor 220, motion sensor 222, image sensor 224, output device(s) 226, communication interface 228, and power source 229. The processor(s) 214 can be configured to perform one or more techniques and operations described herein. For example, sometimes, one or more of the sensor devices 108A-N can be configured to operate like the centralized hub 102. In other words, the one or more sensor devices 108A-N can request and/or receive detected signals from other sensor devices 108A-N can determine whether any of the detected signals exceed expected threshold values.

The one or more sensor devices 108A-N can then identify a security event in the building. The sensors 216, 218, 220, 222, and 224 of the sensor devices 108A-N are further described in reference to FIG. 8A. As mentioned throughout, some sensor devices 108A-N can include some of the sensors 216, 218, 220, 222, and 224 but not all. Moreover, some sensor devices 108A-N can include some of the sensors 216, 218, 220, 222, and 224 while other sensor devices 108A-N include different sensors 216, 218, 220, 222, and 224. For example, one of the sensor devices 108A-N positioned at a front entrance to a building can include the light sensor 216, the sound sensor 218, the motion sensor 222, and the image sensor 224. Another sensor device 108A-N positioned in a kitchen of the building can include the light sensor 216, the temperature sensor 220, and the image sensor 224, while another sensor device 108A-N positioned in a bedroom of the building may include only the light sensor 216 and the temperature sensor 220. A variety of other configurations of sensors in each of the sensor devices 108A-N can be realized and installed in a building.

The output device(s) 226 of the sensor devices 108A-N can include audio output 230 and visual output 232. As described further below (e.g., refer to FIG. 8A), the sensor devices 108A-N or the centralized hub 102 can determine a preferred form of outputting notifications, guidance, or other information to building occupants. Audio output can be preferred in emergency situations where, for example, there is a fire and occupants are unable to see visual guidance prompts through smoke and flames. Visual output can be preferred in some security event situations where, for example, there is a break-in and audio signals could attract a thief to a location of the building occupant(s), thereby putting the building occupant(s) at more risk.

Sometimes, the audio output 230 can also act as an input device. For example, a building occupant can speak to the sensor devices 108A-N and ask what is happening in the building (e.g., refer to FIGS. 5A-B). The audio output 230 can detect the occupant's voice and, based on the request from the occupant, ping the other sensor devices 108A-N to collect detected signals and determine whether any security event has occurred in the building. The audio output 230 can then output information to the occupant about the current state of the building. The visual output 232 can also output information about the current state of the building. For example, the visual output 232 can project text or other visualizations depicting the current state of the building on one or more surfaces proximate the building occupant. Images captured of a room in the building can, for example, be projected on a wall near the occupant. Video captured of a room in the building can also be projected on the wall such that the occupant can watch, in real-time, what is happening in the building. This feature therefore provides for AR interaction between the building occupants, the sensor devices 108A-N, and the centralized hub 102 such that the building occupants can easily and intuitively remain up to date about what is currently happening in the building. As a result, building occupants can feel more comfortable and safe in the building since they can always talk to the sensor devices 108A-N and receive, as feedback, guidance about what the occupants can do to feel more comfortable and/or safe in the building.

The communication interface 228 can be configured to provide communication between the sensor devices 108A-N and the components described throughout. The sensor devices 108A-N can also include the power source 229, which can provide power to the sensor devices 108A-N. The power source 229 can be any type of power supply, including but not limited to batteries, solar energy, and/or plug-in battery packs. Sometimes, the sensor devices 108A-N may not have the power source 229. Sometimes, the power source 229 can be rechargeable. Moreover, in the event that an external power source powering the sensor devices 108A-N goes down, a local power source, such as the power source 229, can be automatically activated to power the sensor devices 108A-N. As a result, the sensor devices 108A-N can continue to operate and function normally with the local power source 229. In such scenarios, the power source 229 can act as a backup power supply.

As mentioned herein, the centralized hub 102, the sensor devices 108A-N, and the sensors 112A-N can communicate with the security system 200. The security system 200 can be a separate system that is already installed in the building and/or installed at a same or later time as the centralized hub 102. The security system 200 can provide for known safety and security monitoring. Integration of the security system 200 with the disclosed techniques can provide for improved and more effective security monitoring in the building. The security system 200 can include, for example, additional sensors, cameras, or other devices that continuously monitor different areas inside and/or surrounding the building. Data collected by the security system 200 can be used by the centralized hub 102 in order to more accurately detect security events, identify types of security events, and determine severity levels of the security events. The security system 200 can also include information about known types of security events and signals or conditions in the building that can be indicative of different types of security events.

The centralized hub 102 can use this information to more accurately determine what type of security event has been detected in the building.

The centralized hub 102, as described throughout this disclosure, can detect security events, notify relevant parties about the detected security events, determine floor maps and escape plans for building occupants, and generate egress guidance or instructions for building occupants when security events or emergencies are detected. Accordingly, the centralized hub 102 can include an emergency egress module 206, a security module 208, and a communication interface 234. The communication interface 234 can provide communication between the centralized hub 102 and one or more of the components described herein.

The emergency egress module 206 of the centralized hub 102 can be configured to determine floor maps of the building, escape plans, and guidance to assist building occupants in safely and calmly egressing during an emergency or security event. In reference to FIG. 2B, the emergency egress module 206 can include a building layout determiner 236, an emergency identification module 238, an emergency guidance determiner 240, and an output generator 242.

The emergency egress module 206 is described further in reference to FIG. 2C. Briefly, the building layout determiner 236 is configured to generate floor maps of the building. These floor maps can be saved as building layouts 210A-N in the building information data store 204 (e.g., refer to FIG. 2A). The building layout determiner 236 can also predict different emergency scenarios using the generated floor maps and determine safe ways for occupants to escape the building in the predicted emergency scenarios. Prediction of emergency scenarios can be performed with artificial intelligence (AI) techniques, processes, and/or algorithms, predictive analytics, and/or one or more machine learning models. Thus, the building layout determiner 236 can generate egress or escape plans for the building based on the building floor maps and/or additional information, such as information or characteristics about building occupants (e.g., age, agility level, disabilities, etc.) that can be received from the security system 200 and/or the user devices 252A-N. Generated egress plans can also be stored in the building information data store 204.

During runtime, the emergency identification module 238 can be configured to identify when an emergency occurs in the building. The emergency identification module 238 can, for example, communicate with the sensor devices 108A-N and the sensors 112A-N to receive real-time readings of conditions in the building. Based on these readings, the emergency identification module 238 can determine when and if an emergency, such as a fire, gas leak, etc., occurs. Sometimes, the security module 208 can identify a variety of security events that can include emergencies. When the security module 208 detects an emergency, the security module 208 can transmit a notification indicating the detected emergency to the emergency identification module 238. Sometimes, when the security module 208 detects a security event, such as a break-in, the security module 208 can notify the emergency egress module 206 such that the emergency egress module 206 can provide appropriate guidance to help the building occupants escape the building.

The emergency guidance determiner 240 can generate escape plans before an emergency occurs in the building. The emergency guidance determiner 240 can also select predetermined escape plans during runtime, when an emergency is detected. The emergency guidance determiner 240 can select escape plans based on current locations of building occupants relative to a location of the emergency and information about the building occupants, such as their age, agility level, disability, etc.

The output generator 242 can be configured to select an optimal form of outputting guidance to the building occupants during an emergency. This selection can be made based on current conditions in the building. For example, if there is a fire and a building occupant is detected to be in a room with a significant amount of smoke, the output generator 242 can select audio guidance as the preferred form of output for this particular building occupant. As another example, if the building occupant is deaf, then the output generator 242 can select visual guidance, such as strobe lights, flashing lights, or other signals that help direct the building occupant to safety. The output generator 242 can also determine whether to provide the output at the sensor devices 108A-N and/or the user devices 252A-N. Such a determination can be made based on building occupant's preselected preferences and/or locations of the building occupants relative to the emergency and/or the sensor devices 108A-N.

Still referring to the emergency egress module 206, FIG. 2C is a conceptual diagram depicting the emergency egress module 206 in operation, when it automatically determines a floor map of the building and uses the floor map for advising occupants how to exit the building during a detected emergency. The emergency egress module 206 can monitor the building (e.g., a home) and can communicate with various devices within the building using one or more wired and/or wireless network(s) 114. For example, the emergency egress module 206 can communicate with a set of user detection devices 202A-N that can detect a presence and movement of occupants within the building, at particular locations within the building. The user detection devices 202A-N can provide user presence information 264 to the emergency egress module 206. The user detection devices 202A-N can be of various configurations, such as motion sensors, cameras, door sensors, window sensors, door locks and window locks, other security devices, or sensors 112A-N, etc.

The building layout determiner 236 included in the emergency egress module 206 can use the user presence information 264 to determine and store a floor map 262 of the building (e.g., the building layout 210A-N in the building information data store 204 depicted in FIG. 2A). The floor map 262 indicates routes within the building, including exits out of the building.

One or more emergency detection devices 112A-N (e.g., the sensors 112A-N) can also be located within the building to detect different types of emergencies, such as fires and/or gas leaks. The emergency detection devices 112A-N can be of various configurations, such as a smoke detector and a heat sensor (e.g., a temperature sensor, an infrared sensor, etc.).

The emergency egress module 206 can receive emergency indication information 266 from the emergency detection devices 112A-N that may indicate one or more locations within the building that may have an emergency. The emergency identification determiner 238 in the emergency egress module 206 can determine whether the emergency indication information 266 indicates the presence of an emergency in the building. The emergency indication information 266 can be temperature readings for example.

The building layout determiner 236 can determine, in response to the emergency identification module 238 determining presence of the emergency, one or more exit routes 260 that can be used by occupants to exit the building, based on the floor map 262 and the emergency indication information 266. Sometimes, as described in reference to FIG. 2B, the emergency guidance determiner 240 can determine the one or more exit routes 260. The determined exit routes 260 can be selected so as to avoid the locations within the building that may have the emergency (e.g., the emergency indication information 266 can indicate location(s) of single or multiple emergencies within the building).

The output generator 242 can generate and send signaling instructions 268 to the sensor devices 108A-N located in the building, for the sensor devices 108A-N to emit signal(s) to indicate to occupants the determined routes 260 out of the building. The emitted signals can be voice commands, lighted signals, or other signals, as described in more detail below.

The emergency egress module 206 can further include a system improvement engine 256. The improvement engine 256 can employ machine learning to improve various functions of the emergency egress module 206, such as functions performed by the building layout determiner 236, the emergency identification determiner 238, and the output generator 242. In some embodiments, the improvement engine 256 is configured to include one or more engines that are separate from the other modules or engines (e.g., the building layout determiner 236, the emergency identification determiner 238, and the output generator 242) in the emergency egress module 206. Alternatively, the modules or engines of the emergency egress module 206 can be configured to operate or otherwise perform functions of the improvement engine 256.

In some examples, the improvement engine 256 is configured to process an input, such as the user presence information 264, and generate a floor map 262 based on the input. In addition or alternatively, the improvement engine 256 is configured to process an input, such as the floor map 262 and the emergency indication information 266, and generate, based on the input, one or more exit routes 260 which are used to evacuate occupants in the building.

In some examples, the improvement engine 256 can be trained to generate and update the floor map 262 adapted to changing aspects of occupancy by residents as well as visitors of a building. Further, the improvement engine 256 can be trained to predict presence and whereabouts of occupants in a building in response to determination of presence of an emergency and generate at least one exit route 260.

The improvement engine 256 operates to bolster functioning and effectiveness of the emergency egress module 206 by adjusting the module 206 for changing circumstances in occupant status or occasions with guests. As such, an egress plan for a building can be modified rapidly with changing occupant circumstances including guest visitation. Such a plan can be stored locally in the module 206 and in a cloud for redundancy. In certain examples, biometric sensing devices are also employed in implementing the improvement engine 256 and/or other operations of the module 206.

In addition to real-time exit route guidance, a general building escape plan can be automatically created, based on automatically-determined floor maps, and made available for occupants, to view and rehearse, before emergencies occur. Generated plans can be stored both locally in the emergency egress module 206, as well as in the cloud for failsafe redundancy. Generated plans can be viewed and maintained by occupants. For example, occupants can update a plan, such as when changes in occupancy occur over time, or when changes in family membership occur (e.g., newborns, grown children leaving the household, deaths, and so forth), and occasions with babysitters or house guests in the home.

Although the emergency egress module 206 is described in reference to emergencies such as fires and/or gas leaks, the emergency egress module 206 can perform similar or same functions when the security module 208 detects a security event, such as a break-in, theft, and/or burglary. Accordingly, the emergency egress module 206 can determine appropriate and safe escape plans for building occupants during the detected security event.

Referring back to FIG. 2B, the security module 208 can be configured to detect security events in the building during runtime and to generate output that can notify building occupants or other relevant stakeholders of the detected security events. The security module 208 can include a normal conditions determiner 244, a voice learning module 246, a security event detector 248, and an output generator 250.

The normal conditions determiner 244 can be configured to learn different states or conditions of the building. The normal conditions determiner 244 can use one or more machine learning trained models to identify and determine normal values for signals that are detected throughout the building. The normal conditions determiner 244 can receive detected signals from the sensor devices 108A-N over certain periods of time. For example, the determiner 244 can collect signals over several 24 hour windows of time in order to identify what sounds, lights, motion, and/or visuals are typical during a normal day in the building. The determiner 244 can also collect signals during particular time periods, such as from 8 am to 10 am every morning for 5 consecutive days.

The received signals can be fed into one or more machine learning models as input. Output from the models can be indications and/or ranges of expected values for different signals that may be detected in the building. Sometimes, the output from the models can also indicate or otherwise classify the signals that may normally be detected in the building. For example, if audio signals are barely detected between the hours of 11 am and 8 am on most days, the normal conditions determiner 244 can determine that the building occupants likely start waking up and getting ready for the day after 8 am. As another example, if visual signals from a camera near a front door of the building shows children leaving the house at 8:30 am on most days and returning around 4:30 pm, then the normal conditions determiner 244 can determine that the building occupants are likely gone from the building during that 8 hour window of time. Therefore, any anomalous signals detected during that 8 hour window of time on most days may be indicative of a security event. As yet another example, if temperature signals positioned in a kitchen of the building indicate increased temperature readings around 7 pm at night on most days, then the normal conditions determiner 244 can determine that the building occupants likely cook their dinners during that time most evenings. Therefore, abnormal increases in temperature during other periods of time during the day can be indicative of some security event and/or emergency.

The normal conditions determiner 244 can also use one or more machine learning models to continuously learn and modify the normal conditions of the building. The normal conditions of the building can be updated to reflect temporary changes and also long term changes. For example, there can be days where guests are invited in the building and detected signals are abnormally high relative to a historic spread of detected signals during similar or same periods of time. The normal conditions determiner 244 can receive detected signals from a variety of sensor devices 108A-N and correlate those signals in order to determine that the abnormally high signals are due to a dinner party rather than a security event. The machine learning models can be trained to classify and/or correlate different types of signals with different categories of activities that constitute normal conditions for a building. For example, during a dinner party, audio signals can be much higher than typical audio signals. The audio signals during the dinner party can also continue over a long period of time, such as several hours. A security event, such as a break-in, can have higher audio signals than the typical audio signals, however such audio signals would occur briefly over a short period of time, such as several seconds and/or minutes. The machine learning models can be trained to identify magnitude and duration of changes in detected signals, such as the audio signals described above, and classify the detected signals based on the identified magnitude and duration of change. In the example of the dinner party, since the detected audio signals are consistently high for several hours, the machine learning models can identify that the detected audio signals are associated with activity that does not constitute a security threat.

Sometimes, the normal conditions determiner 244 can also receive input from building occupants about changes to the building. This input can be fed into the machine learning models in order to improve or otherwise update the normal conditions for the building. The input can indicate temporary changes to a current state of the building. Examples include overnight guests, the building occupants going on vacation for a certain amount of time, a babysitter spending a couple hours there, the building occupants leaving for a day-long excursion/activity, a party, etc. The input can also indicate more long term changes to the current state of the building. Examples include a dog or other pet becoming part of the building household, a newborn child, an occupant dying, a child beginning to play and practice an instrument, a weekly meetup in the building with guests from outside the building household, a particular window of time every week when all the building occupants are away from the building, etc.

The input can be received from mobile devices of the building occupants, such as the user devices 252A-N. For example, the building occupants can provide updates to the normal conditions of the building via a user interface in a mobile application. The mobile application can communicate with the centralized hub 102 and/or the sensor devices 108A-N to provide the building occupants with information about current conditions in the building. The input can also be provided by the occupants directly to the centralized hub 102 and/or the sensor devices 108A-N. For example, a building occupant can speak to the sensor device 108A. The occupant can tell the sensor device 108A that changes have been made to the building. The sensor device 108A can relay (e.g., transmit) the occupant's verbal message to the security module 208 of the centralized hub 102, where the verbal message can be dissected (e.g., by the voice learning module 246) and used to update normal conditions for the building (e.g., by the normal conditions determiner 244). The centralized hub 102 and/or the sensor devices 108A-N can also include a user interface presented via input and output devices such as a touchscreen display where the occupants can not only view information about the current conditions in the building but also provide information to update the normal conditions in the building.

In determining the normal conditions of the building, the normal conditions determiner 244 can average the signals in order to determine a baseline or threshold value for the signals. The baseline or threshold value for the signals can indicate normal conditions for the building during the designated time period. The normal conditions determiner 244 can also find a median and/or mean value for the signals from a designated time period in order to identify the normal conditions for the building. Therefore, the normal conditions determiner 244 can take a historic spread of detected signals in order to determine what is normal for the building.

Learning the normal conditions for the building can be advantageous to use as a baseline in determining whether detected anomalous signals are out of the ordinary and indicative of a security event. For example, if a loud crashing sound is detected at 8 am in the morning and the historic spread of sound signals indicates that minimal noise is detected between 5 am and 9 am, then the security module 208 can determine that the loud crashing sound is likely a security event. Correlating various signals that are detected at a same time as the loud crashing sound can be performed by the security module 208 in order to confirm that a security event in fact occurred and that the loud crashing sound wasn't some random activity, such as a book falling off a shelf.

Still referring to the security module 208 in FIG. 2B, the voice learning module 246 can be configured to learn voices of building occupants and to respond to verbal requests made by the building occupants. The voice learning module 246 can use one or more machine learning models and/or artificial intelligence (AI) techniques, processes, and/or algorithms to identify and associate voices with different occupants in the building. The voice learning module 246 can also use the machine learning models to identify different tones or inflections in the voices that can indicate how the occupants are feeling. For example, if the voice learning module 246 detects an occupant speaking fast, in a high pitched tone, and/or quietly to one or more of the sensor devices 108A-N, then the voice learning module 246 can determine, by applying one or more machine learning models, that the particular occupant is feeling uncomfortable, concerned, and/or unsafe. Determining how the occupant is feeling can be beneficial to provide more accurate guidance, information, or other types of prompts to the occupant.

As an illustrative example, if the occupant asks one of the sensor devices 108A-N whether everything is okay in the building, the voice learning module 246 determines that the occupant is speaking in a panicked, rushed tone, and the security module 208 determines that a security event has occurred at the building, then the security module 208 can determine that the occupant should be provided more comprehensive, step-by-step guidance to help ease the occupant's panic and discomfort. As another example, the occupant can speak to one of the sensor devices 108A-N by asking for help (e.g., asking for a safest way to exit the building during an emergency and/or saying that they do not know what to do during an emergency) and based on the detected tone and/or inflection in the occupant's voice, the security module 208 can determine an appropriate amount of guidance or other information to provide to the occupant.

The machine learning models can be trained to identify how the occupant is feeling based on speed at which the occupant speaks, magnitude of spikes in pitch of the occupant's voice, loudness of the occupant's voice, whether the occupant speaks in fluid sentences or whether the occupant's words are choppy or less fluid, etc. Therefore, the machine learning models may identify how the occupant is feeling based on characteristics of the way the occupant speaks rather than actual content or things that the occupant is saying. In other words, the voice learning module 246 may not be actively monitoring what is said by the occupant but rather can passively monitor changes in the way that the occupant speaks in order to determine whether the occupant is comfortable or concerned about current conditions in the building.

Moreover, the voice learning module 246 can use the machine learning models to learn normal tones or ways of speaking for the building occupants. Therefore, when the occupant speaks to one of the sensor devices 108A-N and asks for updates on the conditions in the building or asks for guidance, the voice learning module 246 can determine whether the occupant's voice deviates from a known, normal way that the occupant typically speaks. A greater deviation can indicate that the occupant is feeling uncomfortable, insecure, panicked, etc. A greater deviation can therefore indicate that the occupant should be provided with more information or guidance to help calm the occupant.

Still referring to the security module 208 in FIG. 2B, the security event detector 248 can be configured to identify a security event from analyzing anomalous signals that are detected by the sensor devices 108A-N and/or the sensors 112A-N. As described in reference to FIGS. 1, 3, and 4A-B, the security event detector 248 can receive detected signals from the sensor devices 108A-N and/or the sensors 112A-N. The security event detector 248 can retrieve threshold conditions 212A-N from the building information data store 204 (e.g., refer to FIG. 2A). The threshold conditions 212A-N can be determined by the normal conditions determiner 244 and can be based on room or location in the building where the sensor devices 108A-N are located. The threshold conditions 212A-N can also be based on general areas or portions of the building (a first floor, a second floor, a kitchen and dining room, a living room, etc.) and/or the building as a whole. The threshold conditions 212A-N can include light, sound, temperature, motion, and/or visual for each of the designated areas, rooms, locations, and/or sensor devices 108A-N.

As described above, the threshold conditions 212A-N can indicate expected or otherwise normal signal levels for the building (e.g., expected amounts of light in a particular room, expected temperature value and/or temperature range in a kitchen, expected motion or movement near one or more entrances to the building, expected amount of noise in a hallway or other room, etc.). The security event detector 248 can determine whether any of the received signals deviate from the threshold conditions 212A-N as well as a magnitude and/or duration of the deviation. Based on this analysis, the security event detector 248 can identify whether a security event has occurred. Sometimes, the security event detector 248 can also identify that an emergency, such as a fire, has occurred based on a comparison of the received signals to the threshold conditions 212A-N.

The security event detector 248 can also correlate different anomalous signals received at a same or similar time in order to positively identify that the security event occurred. Therefore, the security event detector 248 can improve its accuracy in detection of security events, thereby becoming more reliable to building occupants. Using one or more machine learning models, the security event detector 248 can classify the detected security event. For example, the models can be trained to identify that combinations of certain types of signals and/or deviations in such signals are representative of different types of emergencies. As an illustrative example, the models can be trained to identify a break-in based on a combination of the following signals: a sudden, sharp increase in decibel signals, a sudden increase in movement/motion near a window, door, or other entrance into the building, and video or image feed data depicted shattered glass, debris, or a foreign object entering the building. As another example, the models can be trained to identify a fire based on a combination of the following signals: a sudden and large increase in temperature, detection of smoke, and sporadic shifts in lighting.

The security event detector 248 can also determine a severity level of the detected security event. One or more machine learning models can be applied to the received and correlated signals in order to assess how severe of a threat the security event poses to building occupants. The security event detector 248 can also determine the severity level based on presence of the occupants in the building. For example, the models can be trained to determine that the security event is of lower severity when none of the occupants are detected as being present in the building. Occupant presence can be determined based on user presence and/or motion sensors positioned throughout the building. Occupant presence can also be determined based on one or more of the sensor devices 108A-N outputting audio in the building that asks or otherwise prompts present occupants to say something. Occupant presence can also be determined from video and/or image feed data captured by the sensor devices 108A-N, the sensors 112A-N, and/or the security system 200. Moreover, occupant presence can be determined based on pinging, by the centralized hub 102, the user devices 252A-N of the occupants to determine whether the devices 252A-N are located within the building and/or connected to a local home network.

Once the severity level is determined, the security event detector 248 and/or the output generator 250 can determine appropriate guidance or other information to provide to the building occupants. The higher the severity level, the more thorough and/or step-by-step guidance can be provided to the building occupants. The lower the severity level, the less information can be provided to the building occupants.

Accordingly, the output generator 250 can determine how much information to provide to building occupants, what form of output should be used for that information, and what information should be outputted. For example, if the voice learning module 246 detects that the occupant is panicking, the output generator 250 can determine that more thorough information should be provided to the occupant in order to calm them down. As another example, if the security event detector 248 determines that a burglary has occurred, the output generator 250 can determine that the occupant should receive a notification that there is a burglary and instructions to safely, calmly, and quietly exit the building (e.g., based on and/or using one or more of the escape plans generated by the emergency egress module 206).

The output generator 250 can determine an appropriate form of output based on the detected security event. If the security event involves a break-in, for example, the output generator 250 can determine that audio and/or visual output may draw attention to the occupant and therefore put the occupant's safety at increased risk. Thus, the output generator 250 can determine that text messages and/or push notifications transmitted to the user device 252A-N of the occupant can be a preferred form of output. As another example, if the security event involves a fire, the output generator 250 can determine that audio that is outputted by the sensor devices 108A-N can be preferred, especially since visual signals may not be seen in smoke and/or through flames. As yet another example, if the centralized hub 102 is unable to connect to any of the user devices 252A-N of the occupants, then the output generator 250 can select a form of output that can be provided by the sensor devices 108A-N positioned throughout the building. Similarly, if the centralized hub 102 is unable to connect to one or more of the sensor devices 108A-N, then the output generator 250 can select a form of output that can be provided by the user devices 252A-N of the occupants.

Sometimes, the output generator 250 can also select a preferred form of output based on information about the occupants. For example, if an occupant is deaf, then the output generator 250 can generate visual signals as output to be displayed by the sensor devices 108A-N (e.g., flashing lights, strobe lights, directional signs projected onto walls, floors, windows, and/or doors, etc.). The output generator 250 can also generate output, such as text messages and/or push notifications, that can be received and viewed by the deaf occupant at their user device 252A-N.

The output generator 250 can select a different form of output for each occupant in the building. Output for some occupants can be visual while output for other occupants can be audio. Moreover, output for some occupants can be displayed by the sensor devices 108A-N while output for other occupants can be displayed by the user devices 252A-N.

As mentioned above, the output generator 250 can determine what information should be provided to each occupant. What information to provide can be based on tone of the occupant's voice when they speak to the sensor devices 108A-N, as described above. What information to provide can also be based on the type of security event, the severity level of the security event, and other information about the occupant. Sometimes, the output generator 250 can generate output that merely mentions that a security event was detected. Sometimes, the output generator 250 can generate output that asks the occupant what type of information they want/need. Based on the occupant's response, the output generator 250 can generate additional or less guidance for the particular occupant. Moreover, sometimes the output generator 250 can generate output that includes guidance to safely and calmly escape the building. How much guidance to provide can be based on a variety of factors, as mentioned above, such as user preference, how the occupant is feeling, what type of security event was detected, and the severity level of the detected security event. Any information generated by the output generator 250 can then be transmitted to the sensor devices 108A-N and/or the user devices 252A-N to be outputted to the occupant(s).

Referring back to FIG. 2A, the user devices 252A-N can include mobile devices such as smartphones, cellphones, laptops, computers, tablets, and/or wearable devices. Building occupants can have user devices 252A-N that can be in communication with components described herein, such as the sensor devices 108A-N, the centralized hub 102, and/or the security system 200. The user devices 252A-N can receive notifications (e.g., push notifications at a mobile application), text messages, audio messages, and/or other types of indications about a current state of the building. Sometimes, for example, when a security event is detected, the centralized hub 102 can send a push notification to the user devices 252A-N of one or more building occupants to make them aware of the security event. As another example, the centralized hub 102 can send egress instructions to the user devices 252A-N of one or more building occupants to safely guide such occupants to safety. The building occupants can also use the user devices 252A-N in order to monitor the current state of the building, whether the building occupants are located at the building or remote, and to ask the centralized hub 102 to check on the current state of the building.

Figure 3:
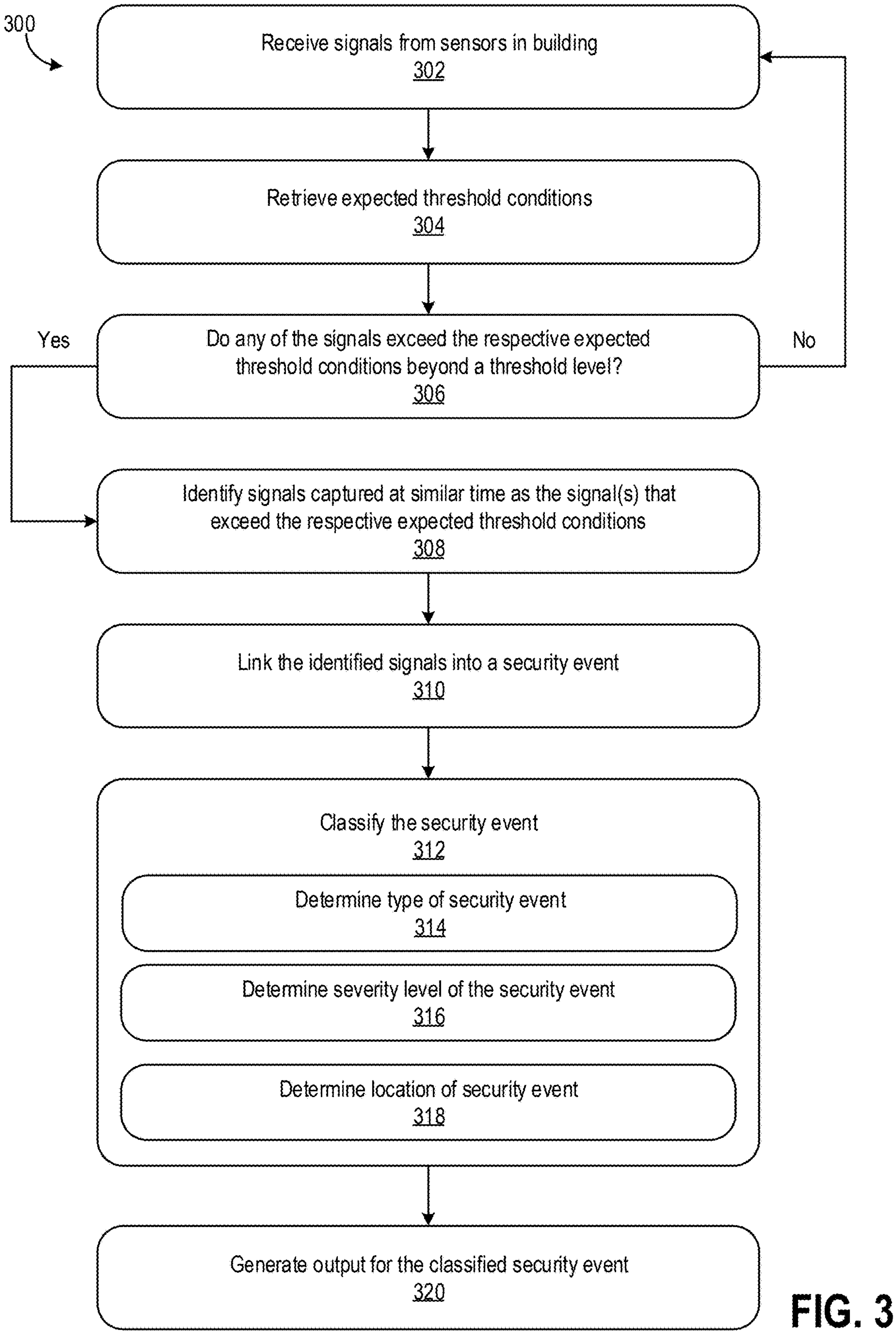
FIG. 3 is a flowchart of a process for detecting a security event in a building.

FIG. 3 is a flowchart of a process 300 for detecting a security event in a building. The process 300 can be performed by the centralized hub 102 described herein. More specifically, the process 300 can be performed by one or more components of the security module 208 of the centralized hub 102 (e.g., refer to FIGS. 2A-B). One or more blocks of the process 300 can also be performed by any of the sensor devices 108A-N, for example, where one of the sensor devices 108A-N acts or otherwise operates as the centralized hub 102, when the centralized hub 102 goes down, and/or when one of the sensor devices 108A-N identifies a large deviation in an anomalous signal that it detected. The process 300 can also be performed by a variety of other computer systems, networks of computers, servers, and/or devices. For illustrative purposes, the process 300 is described from a perspective of a computer system.

Referring to the process 300, the computer system can receive signals from sensors in a building in 302. As described in reference to FIG. 1, the computer system can receive the signals at predetermined times, such as every 1 minute, 2 minutes, 3 minutes, 4 minutes, 5 minutes, etc. The computer system can also automatically receive the signals whenever a sensor detects a change in state (e.g., a deviation in passively monitored signals) in the building. Moreover, the computer system can receive the signals upon transmitting requests for any sensed signals from the sensors. Also as described throughout this disclosure, the sensors can include the sensor devices 108A-N and/or the sensors 112A-N positioned throughout the building. The receive signals can include but are not limited to audio (e.g., decibels), visual (e.g., video feed data, image data), light, motion, temperature, and/or smoke signals.

The computer system can also retrieve expected threshold conditions in 304. The computer system can retrieve from a data store expected threshold conditions for each of the received signals. For example, if a light signal is received from a sensor positioned in a kitchen of the building, then the computer system can retrieve the expected threshold condition for light signals in the kitchen of the building. Moreover, the computer system can retrieve the expected threshold conditions for a same or similar timeframe as when the received signals were captured. In the example above, if the light signal is received at 9 pm, then the computer system can retrieve the expected threshold conditions for light in the kitchen at or around 9 pm. Sometimes, the computer system can retrieve overall expected threshold conditions for the building. The overall expected threshold conditions can indicate an average of a particular type of signal or combination of signals that represents a normal state or conditions of the building.

As described in reference to FIGS. 2A-C, the computer system can learn normal conditions for the building. These normal conditions can establish expected threshold conditions or ranges for different types of signals that can be sensed in the building. The expected threshold conditions can be learned in a variety of ways. For example, the expected threshold conditions can be learned using statistical analysis over time. The computer system can analyze signal values detected during one or more periods of time (e.g., 8 am to 9 am every morning for a certain number of consecutive days). The computer system can average, for example, decibel levels during the one or more periods of time, identify spikes or dips in the decibel levels, and categorize those spikes or dips as normal conditions or abnormal conditions. The computer system can also use standard deviations from the historic spread of decibel levels in order to determine expected threshold conditions. In so doing, the computer system can identify typical deviations from the expected threshold conditions that may occur. Any deviation that exceeds the identified typical deviations can be indicative of a security event.

The expected threshold conditions can also be determined and identified as static values rather than averages, standard deviations, and/or ranges of values. Therefore, if the received signals ever exceed a really high static value in a short amount of time, the received signals can be indicative of a security event. Thus, the computer system can analyze a rate of rise in the received signals to determine whether these signals exceed expected threshold conditions for the building.

The expected threshold conditions can also be determined and identified based on relativity. In other words, every few minutes, for example, the computer system can receive decibel signals. The computer system can determine an average in decibel level. Over time, the computer system can determine whether the decibel level is increasing and a rate of rise in decibel level relative to the average decibel level. Therefore, a sudden and sharp increase in decibel level relative to the average decibel level during a short timeframe can be indicative of a security event.

In 306, the computer system can determine whether any of the received signals exceed the respective expected threshold conditions beyond a threshold level. Sometimes, the computer system can combine the received signals into a collective of signals. The computer system can then determine whether the collective of signals exceeds expected threshold conditions beyond the threshold level. The threshold level can be predetermined by the computer system and based on the type of signal, a location where the signal was detected, a time of day at which the signal was detected, and one or more factors about the building and/or the building occupants. The threshold level can indicate a range of values that, although deviate from the expected threshold conditions, do not deviate so much as to amount to a security event. The threshold level can be greater in locations in the building where typically, or on average, there is more commotion or activity by the building occupants. The threshold level can be lower in locations in the building where typically, or on average, there is less commotion or activity by the building occupants.

As an illustrative example, temperature signals can have a greater threshold level (e.g., a greater range of expected temperature values) in a bathroom where the temperature can drastically increase when an occupant runs hot water in comparison to a bedroom, where an occupant may only blast A.C. during summer months but otherwise maintain the bedroom at a constant temperature. Therefore, the temperature would have to increase higher and faster in the bathroom than the bedroom in order to trigger identification of a security event.

As another example, audio signals in a nursery can have a lower threshold level (e.g., a smaller range of expected sound) where typically a young child sleeps in comparison to a family room, which can have a greater threshold level (e.g., a larger range of expected sound) since the occupants typically spend time there, talk, watch TV, and otherwise make a significant amount of noise there. Thus, a lesser deviation in audio signals detected in the nursery can trigger identification of a security event in comparison to the same deviation in audio signals being detected in the family room.

As yet another example, the expected threshold conditions for anywhere in the building can change depending on the time of day. During nighttime hours when the occupants are typically asleep, any type of signal can have a lower threshold level than during daytime hours when the occupants are going about their daily activities in the building. In other words, during the nighttime, signals that deviate slightly from the expected threshold conditions can be indicative of a security event whereas the same slight deviation may not be indicative of a security event during daytime hours.

If none of the signals exceed the respective expected threshold conditions beyond the threshold level, then the signals likely indicate normal or otherwise expected conditions in the building. There likely is not a security event. The computer system can return to block 302.

If any of the signals exceed the respective expected threshold conditions beyond the threshold level, then the computer system can identify any other signals that were captured at a similar or same time as the signals that exceed the respective expected threshold conditions in 308. The computer system can then link the identified signals into a security event in 310. Thus, in 308 and 310, the computer system can verify that a security event in fact occurred based on analysis of other signals detected throughout the building.

For example, if an audio signal detected at a front of the building exceeds the respective expected threshold condition beyond the threshold level, then the computer system can also identify an audio signal detected at a back of the building at the same or similar time as the audio signal detected at the front of the building. If the audio signal detected at the back of the building represents a deviation from the expected threshold conditions, albeit a lesser deviation than that of the audio signal detected at the front of the building (e.g., since sound can be more muted farther away from a location of an incident), then the computer system can confirm that the audio signal detected at the front of the building likely constitutes a security event.

The computer system can also identify different types of signals in 308 that can be linked into a security event in 310. For example, audio, light, and visual signals can be linked together to paint a story of a security event. One or more other signals can also be correlated or otherwise linked together to verify that the security event occurred and to depict what happened in the security event. Sometimes, the more signals that can be linked to create a robust story of the security event can improve confidence and/or ability of the computer system to detect future security events. For example, the computer system can use one or more machine learning models to learn or otherwise improve the computer system's ability to detect security events from anomalous signals. The security events identified in 310 can be provided as input to the machine learning models in order to improve the computer system.

Next, the computer system can classify the security event in 312. As described in reference to FIGS. 2A-C, the computer system can apply one or more machine learning models to the linked signals in order to classify the security event. Classifying the security event can include determining a type of security event (314). The computer system can be trained to identify a variety of security event types from different combinations of signals and deviations in signals. The computer system can also be trained to identify the type of security event based on a variety of factors, such as how much the signals deviate from the expected threshold conditions, what type of signals have been detected, where the detected signals were located in the building, whether occupants were present or near the signals when detected, etc.

Classifying the security event can also include determining a severity level of the security event (316). The severity level can be determined based on a variety of factors, including but not limited to the type of security event and how much the signals deviate from the expected threshold conditions. For example, a temperature signal of such magnitude and rapid rise from the expected threshold temperature condition for the building can indicate that a serious issue, such as a fire, has begun in the building. This security event can be assigned a high severity level value. On the other hand, a temperature signal that increases enough to exceed the expected threshold temperature condition over a longer period of time can be identified, by the computer system, as having a lower severity level. The severity level can be a numeric value on a scale, such as between 1 and 100, where 1 is a lowest severity level and 100 is a highest severity level. One or more other scales can be realized and used in the process 300. The severity level can also be a boolean value and/or a string value.

The severity level can indicate how much the identified security event poses a threat to the building occupants and/or the building. For example, a higher severity level can be assigned to the identified security event when the event threatens safety of the building occupants, protection of the occupant's personal property, and/or structure of the building. As another example, a lower severity level can be assigned to the event when the event threatens a structure of the building but the occupants are not currently present in the building. Therefore, threats that the security event poses can be weighed against each other in determining the severity level of the security event. As described in reference to FIGS. 2A-C, the severity level can be determined by the computer system by using one or more machine learning models.

Moreover, classifying the security event can include determining a location of the security event (318). As described above, the computer system can use one or more machine learning models to determine the location of the security event. The location can be determined based on identifying strength of the received signals and proximity of the received signals from each other. For example, an audio signal received from a front of the building can greatly exceed threshold conditions for the building while an audio signal received from a back of the building can exceed threshold conditions by a smaller magnitude. The computer system can be trained to identify that the security event likely occurred closer to the front of the building rather than the back of the building. The computer system can then compare audio signals and other signals received from locations proximate to the audio signal received from the front of the building in order to narrow down and pinpoint a location of the security event. Using one or more building layouts (e.g., floor plans) and location information for the sensor devices positioned throughout the building that detected the audio signals, the computer system can identify a room or other particular location in the building where the security event occurred. Classifying the security event based on type, severity, and location can be beneficial to determine appropriate guidance, instructions, or other information to provide to building occupants and relevant stakeholders, such as emergency response personnel.

Once the security event is classified, the computer system can generate appropriate output in 320. Generating the output can include selecting an optimal form of output and determining what information to provide to building occupants or other relevant stakeholders, such as emergency response personnel. Selecting the optimal form of output can be based on the type of security event. For example, if the security event is identified as a burglary, the computer system can determine that audio output, whether provided by the sensor devices or the occupants' mobile devices, can expose the occupants to the burglar and increase an associated security risk. Therefore, the computer system can select forms of output that include visual displays, text messages, and/or push notifications. As another example, if the security event is identified as a fire, the computer system can determine that visual output, as provided by the sensor devices or other sensors in the building, may not be preferred since smoke and flames can make it challenging for the building occupants to view lighted signals. The computer system can select forms of output that may include audio instructions or guidance.

As described throughout this disclosure, the output can include guidance, instructions, prompts, or information that can be presented via audio, text messages, push notifications, and/or visuals that are displayed in the building. Sometimes the output can alert the building occupant of a security event, such as the type of security event and where it occurred in the building. The output can also include guidance or instructions to assist the building occupant to safely, calmly, and quickly escape the building and avoid the security event. Sometimes, depending on the type and severity level of the security event, the output can include a notification that is automatically transmitted to emergency response personnel, such as police, firefighters, EMTs, etc. Therefore, the building occupants can focus on their own safety and escape from the security event rather than figuring out who to contact.

Sometimes, the output can include questions that prompt the building occupants to provide some sort of response. Depending on the occupants' response, the computer system can determine what additional information can be provided to the occupants. The computer system can use AR in order to have conversations with the building occupants and act upon those conversations. For example, the computer system can generate output that, when presented by a sensor device, asks the occupant how they are feeling. The occupant can reply that they are concerned, feeling safe, scared, or any other variety of emotions they may be experiencing. The sensor device can transmit the occupant's response to the computer system for further analysis. As described in reference to FIGS. 2A-C, the computer system can learn the occupant's voice and determine a tone and/or inflection of the occupant's voice that can indicate how the occupant is feeling. The computer system can also use one or more semantic analysis techniques in order to detect how the occupant is feeling.

If the computer system determines that the occupant is in fact feeling concerned or scared, the computer system can generate additional output intended to calm or otherwise assist the occupant is finding safety. For example, the computer system can contact emergency response personnel upon determining that the occupant is scared for their life. The computer system can also generate step-by-step instructions to help guide the occupant safely out of the building while avoiding a location of the security event.

If the computer system determines that the occupant is not as concerned or is otherwise feeling relatively safe, the computer system can determine that additional guidance may not be needed for the occupant.

Regardless of whether a security event is detected, the occupants in the building can converse with the sensor devices. As described throughout, the occupants can ask the sensor devices for updates on current states (e.g., conditions) in the building. The occupants can also tell the sensor devices about updates to the building and/or occupants in the building (e.g., a change in disability or athleticism, moving in of an occupant, moving out of an occupant, birth of a child, death of an occupant, hosting of a dinner party or other social event, going away on a vacation, etc.). Information that the occupant shares with the sensor devices can be transmitted to the computer system, analyzed, and used to update, modify, or improve stored information, emergency escape plans, building layouts, detection of security events, and generation of instructions or guidance.

Finally, generating the output in 320 can also include transmitting the output to the appropriate devices. The computer system can connect to a home network and poll devices to determine which devices are present in the home network. The computer system can poll devices such as the sensor devices and/or mobile devices of the building occupants. If the devices are determined to be present in the home network, then the computer system can transmit the output locally. If the devices are not present in the home network (e.g., the home network goes down, the occupants and their respective mobile devices are not currently located at the building, a sensor device is offline, etc.), then the computer system can transmit the output over a different network, such as a cellular network or WIFI.

Figure 4A:
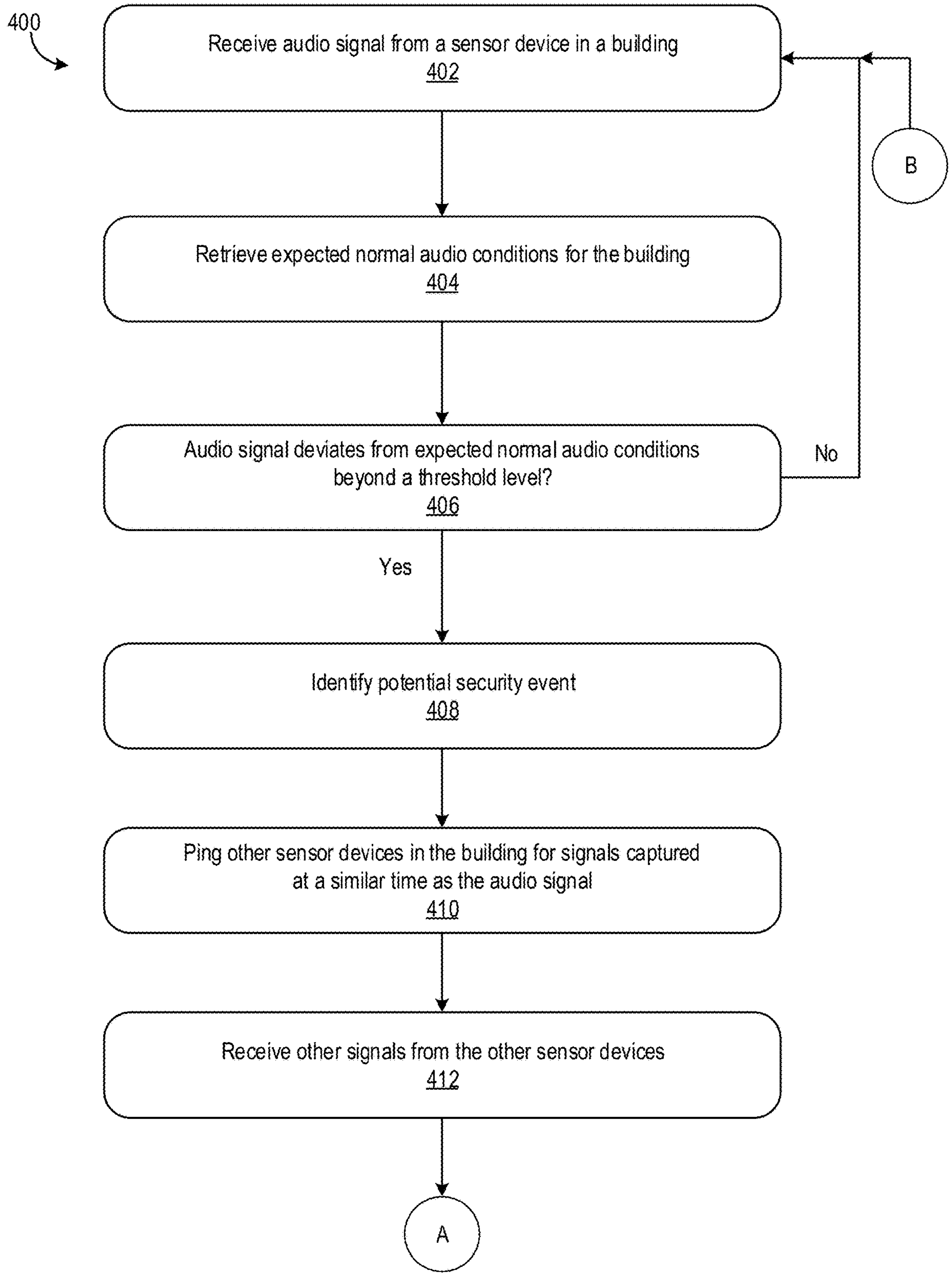
FIGS. 4A-B is a flowchart of an example process for detecting a security event from irregular audio signals.
Figure 4B:
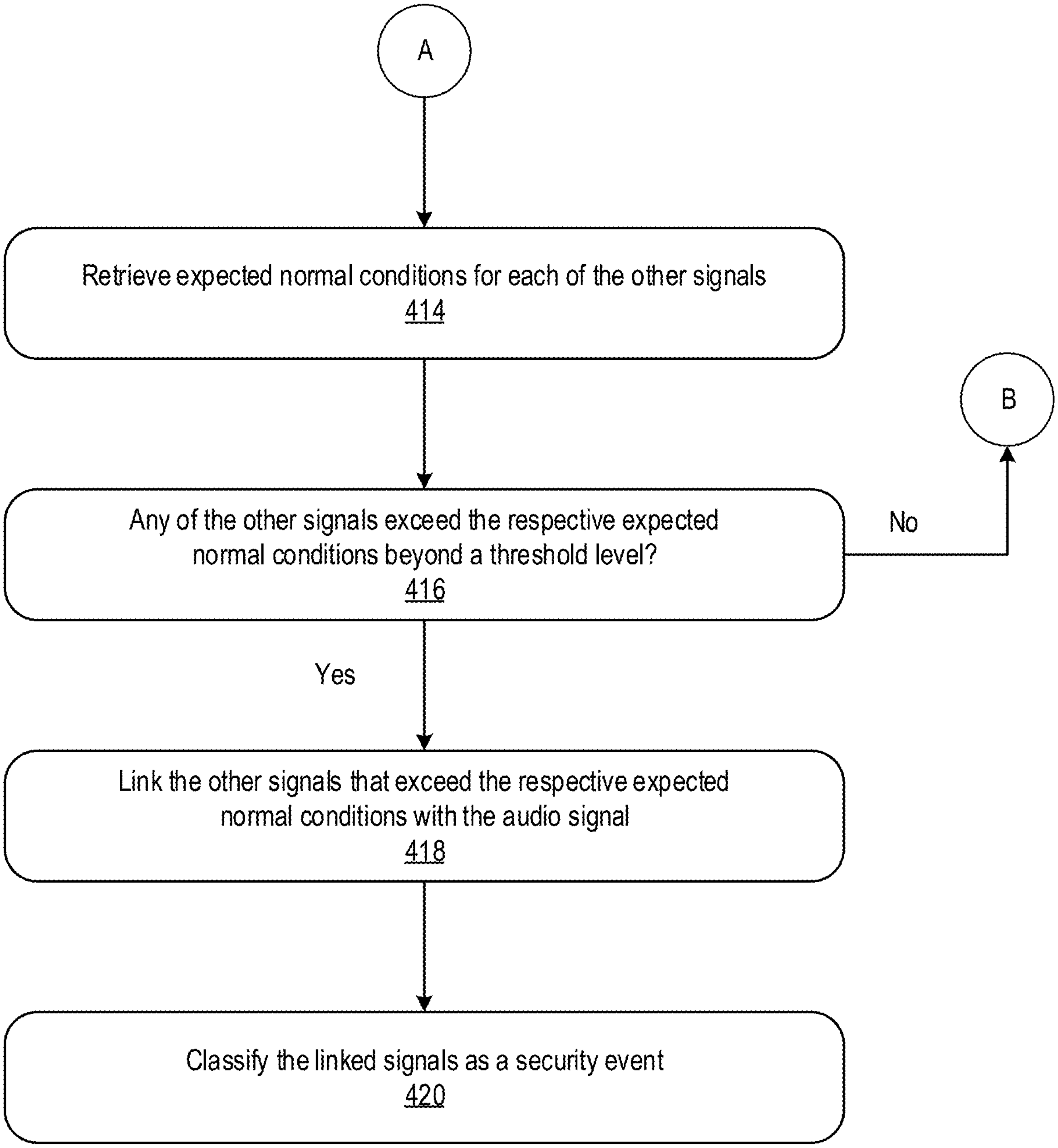

FIGS. 4A-B is a flowchart of an example process 400 for detecting a security event from irregular audio signals. Although the process 400 is described in reference to analysis of audio signals, the process 400 can be performed to analyze a variety of other types of signals described throughout this disclosure, including but not limited to light, visual, temperature, and/or motion signals.

The process 400 can be performed by the centralized hub 102 described herein. More specifically, the process 400 can be performed by one or more components of the security module 208 of the centralized hub 102 (e.g., refer to FIGS. 2A-B). One or more blocks of the process 400 can also be performed by any of the sensor devices 108A-N, for example, where one of the sensor devices 108A-N acts or otherwise operates as the centralized hub 102, when the centralized hub 102 goes down, and/or when one of the sensor devices 108A-N identifies a large deviation in an anomalous signal that it detected. The process 400 can also be performed by a variety of other computer systems, networks of computers, servers, and/or devices. For illustrative purposes, the process 300 is described from a perspective of a computer system.

Referring to the process 400 in both FIGS. 4A-B, the computer system can receive audio signals from a sensor device in a building in 402. Refer to FIGS. 1 and 3 for further discussion on receiving signals. The computer system can retrieve expected normal audio conditions for the building in 404. Refer to block 304 in FIG. 3 for further discussion on retrieving the expected normal audio conditions for the building.

In 406, the computer system can determine whether the received audio signal exceeds the expected normal audio conditions beyond a threshold level. Refer to block 306 in FIG. 3 for further discussion. If the audio signal does not deviate from the expected conditions beyond the threshold level, then the computer system can return to block 402 and continue to receive audio signals from one or more sensors in the building, such as the sensor devices. After all, the audio signal can deviate from the expected conditions within a threshold range and still be considered normal. If, on the other hand, the audio signal deviates from the expected conditions beyond the threshold level, then the computer system can identify a potential security event in the building (408). Thus, the received audio signal is abnormal for the building.

The computer system can accordingly ping other sensor devices and/or sensors in the building for signals captured at a similar time as the audio signal in 410. The computer system can transmit notifications with timestamps to each of the sensor devices and/or sensors. The notifications can request signals that were captured at the same or similar timestamp as that of the audio signal received in 402. By requesting signals from other sensor devices and/or sensors, the computer system can correlate signals to determine whether a security event in fact occurred. By correlating the signals, the computer system can also more accurately classify the security event.

The computer system can receive the other signals from the other sensor devices and/or sensors in 412. The other signals can be other audio signals like the one that was received in 402, except the other signals can be detected in other locations in the building. For example, if the audio signal received in block 402 was detected at a front of the building, then the computer system can receive an audio signal from a sensor device located at a back of the building. The other signals can also be any one or more of light, visuals, temperature, smoke, motion, etc.

The computer system can then retrieve expected normal conditions for each of the other signals (414). The expected normal conditions can be retrieved as described in reference to block 404. Sometimes, the computer system can retrieve an aggregate expected normal condition for the building that represents a combination of the other signals that are received in block 412.

In 416, the computer system can determine whether any of the other signals exceed the respective expected normal conditions beyond a threshold level. Refer to block 406 for further discussion.

If none of the other signals exceed the respective expected normal conditions beyond the threshold level, then the computer system can return to block 402 and repeat the process 400. In other words, the computer system can continue to passively monitor the building via the sensor devices and/or sensors. The computer system can continue to receive anomalous signals from the sensor devices and/or sensors that represent different detected conditions in the building.

If any of the other signals exceed the respective expected normal conditions beyond the threshold level, then the computer system can link those signals with the audio signal 418. In other words, the computer system can confirm or otherwise verify that a security event was detected. By linking or correlating the signals that exceed expected normal conditions beyond the threshold level during a same or similar timeframe, the computer system can positively identify the security event.

As described herein, the computer system can classify the linked signals as a security event (420). Classifying the security event can include identifying a type of security event, severity level of the security event, and location of the security event. Refer to block 312 in FIG. 3 for further discussion.

Figure 5A:
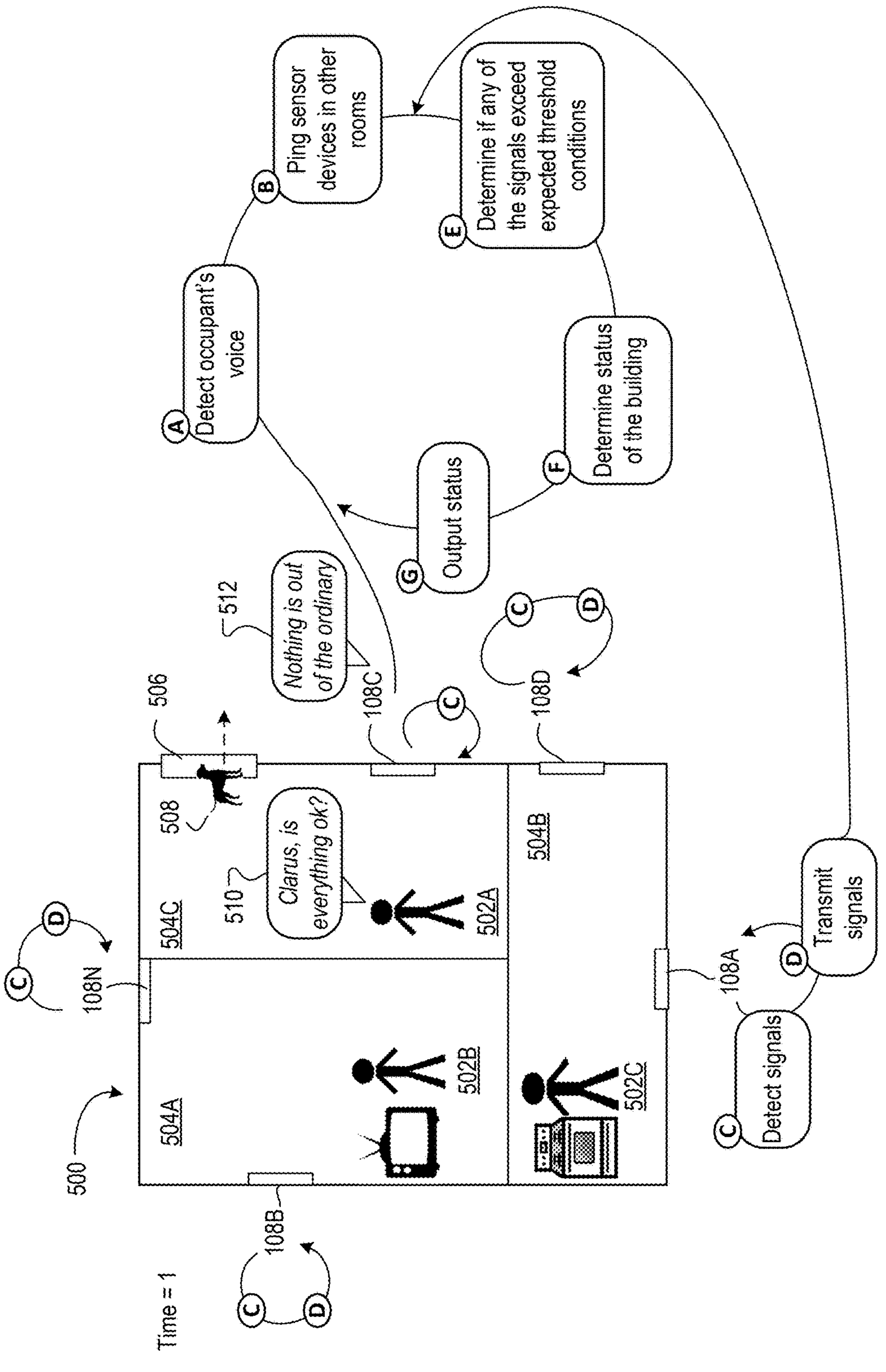
FIG. 5A is a conceptual diagram of an example scenario where an occupant verbally requests an update on conditions in a building from a sensor device.
Figure 5B:
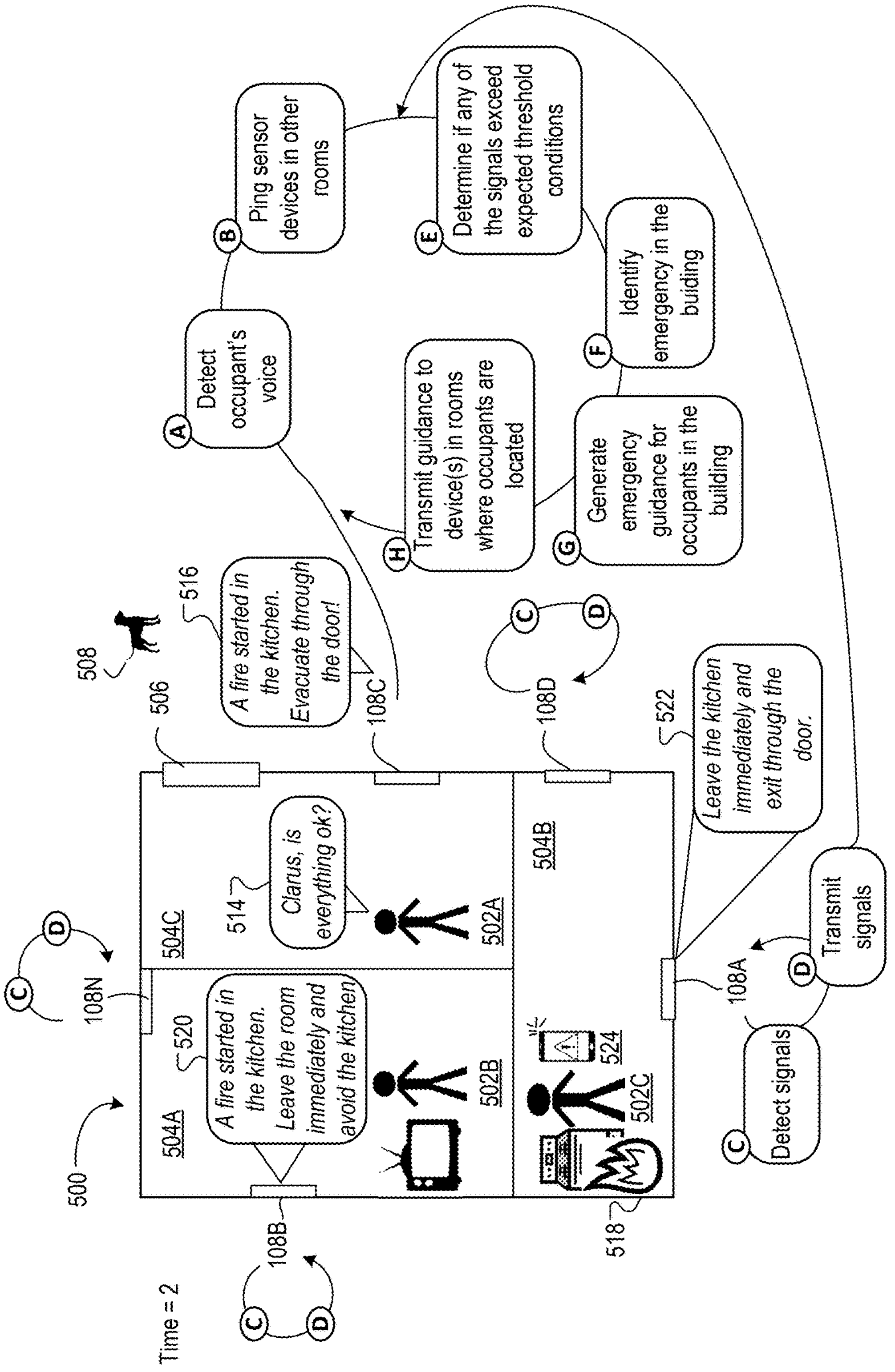
FIG. 5B is a conceptual diagram of another example scenario where the occupant verbally requests an update on conditions in the building from the sensor device.

FIG. 5A is a conceptual diagram of an example scenario where an occupant 502A verbally requests an update on conditions in building 500 from sensor device 108C. FIG. 5B is a conceptual diagram of another example scenario where the occupant 502A verbally requests an update on conditions in the building 500 from the sensor device 108C. Referring to both FIGS. 5A-B, the building 500 can be a home, such as a single family, single story home. The building 500 can also be any other type of home, building, or establishment that can implement egress advisement and safety security systems therein. For example, the building 500 can include an apartment building, a high rise building, a commercial building, and/or a multi-story home. One or more other building configurations are possible.

The building 500 depicted in both FIGS. 5A-B includes three rooms: rooms 504A, 504B, and 504C. Each of the rooms 504A, 504B, and 504C have one or more sensor devices 108A-N. For example, the room 504A includes sensor devices 108B and 108N. The room 504B includes sensor devices 108A and 108D. The room 504C includes sensor device 108C. The room 504C also includes a door 506 that allows for occupants and other users in the building 500 to enter and exit the building 500. Although not depicted, the building 500 can include one or more windows, additional sensors, additional or fewer sensor devices 108A-N, additional doors, additional rooms, and/or additional floors (e.g., levels).

In the example scenario in FIGS. 5A-B, the sensor device 108C can be operating as a centralized hub (e.g., refer to the centralized hub 102 described throughout this disclosure). Sometimes, any of the sensor devices 108A-N can operate as the centralized hub. Moreover, each of the sensor devices 108A-N can perform functions of the centralized hub at a same time or at different times without any one of the sensor devices 108A-N being designated or otherwise appointed as the centralized hub.

Referring to FIG. 5A, at time=1, the occupant 502A is located in the room 504C. The room 504C can be an entrance room to the building 500. A dog 508 can also be located in the room 504C. At time=1, the dog 508 can be exiting the building 500 through the door 506. Occupant 502B is located in the room 504A, which can be a living room. The occupant 502B can be watching TV at time=1. Occupant 502C is in the room 504B, which can be a kitchen. The occupant 502C can be cooking a meal in the kitchen at time=1.

At time=1, the occupant 502A can ask the sensor device 108C if everything is okay in the building 500. For example, the occupant 502A can speak out loud, "Clarus, is everything ok?" (510). The sensor device 108C can detect the occupant 502A's voice (step A). As described throughout this disclosure (e.g., refer to FIGS. 2A-C), the sensor device 108C can detect the occupant 502A's voice using voice recognition techniques. Using AI and/or AR, the sensor device 108C can determine what the occupant 502A is asking the sensor device 108C. For example, the sensor device 108C can be trained to understand or detect one or more predetermined commands, such as "Clarus, is everything ok?" Over time, the sensor device 108C can also learn additional and potentially more nuanced, less direct commands that are said by the occupant 502A or other occupants in the building 500. In this example, the sensor device 108C can detect that the occupant 502A has spoken a known command, which is asking for a status update on conditions in the building 500.

Accordingly, the sensor device 108C can ping the other sensor devices 108A-N in the other rooms 504A-504B for any signal updates. The sensor device 108C can transmit a notification to the other sensor devices 108A-N asking the other sensor devices 108A-N if they detected any anomalous signals over some predetermined period of time. The notification can also request the other sensor devices 108A-N to provide the sensor device 108C with any signals that were detected over some predetermined period of time. Moreover, the notification can request the other sensor devices 108A-N to detect and provide current signals in the rooms 504A-B at time=1. Therefore, the sensor device 108A can determine or otherwise identify real-time conditions in the building 500.

Each of the other sensor devices 108A-N can detect signals in their respective rooms 504A and 504B (step C). As described above, the other sensor devices 108A-N can detect real-time signals in the rooms 504A and 504B. The other sensor devices 108A-N can also identify signals in the rooms 504A and 504B that had been detected during one or more predetermined time periods that are requested by the sensor device 108C.

The other sensor devices 108A-N can then transmit any of the detected signals to the sensor device 108C (step D). Sometimes all the sensor devices 108A-N can transmit detected signals to the sensor device 108C, even if the detected signals are constant, minimal, or otherwise nonexistent. For example, sensor device 108D may sense no movement or audio in a location proximate to the sensor device 108D in the kitchen. Although no movement or audio is detected, the sensor device 108D can still transmit notification to the sensor device 108C indicating absence of movement or audio. Sometimes, if any of the sensor devices 108A-N do not detect any signals, such sensor devices 108A-N may not transmit signals or any types of notifications to the sensor device 108C in step D. Thus, the sensor device 108C may only receive signals that are positively detected by the sensor devices 108A-N or signals that are detected beyond some threshold level.

For example, detected motion near an open window that can be attributed to a curtain shifting in a breeze coming through the window may not exceed the threshold level to then be transmitted to the sensor device 108C. After all, this detected motion may not be serious enough to warrant any type of inquiry into whether the motion is related to a security event or an emergency. On the other hand, swift detected motion through the door 506 in the room 504C can be transmitted to the sensor device 108C (if detected by another sensor device or sensor other than the sensor device 108C) because this movement can exceed the threshold level. This movement can be significant enough to warrant inquiry into whether the movement is related to a security event or an emergency.

In the example of FIG. 5B, the sensor device 108C can detect movement signals in the room 504C. The sensor device 108C can detect the dog 508 exiting the building 500 through the door 506. The sensor device 108C can also detect audio (e.g., decibel) signals that represent the dog 508's footsteps as it exits the building 500 through the door 504C. If the sensor device 108C has an image sensor, then the sensor device 108C can also capture image data of the occupant 502A standing near the sensor device 108C and asking the sensor device 108C if everything is okay in the building 500. The sensor device 108C can also capture image data of the dog 508 as the dog exits the building 500 through the door 506.

In the room 504A, the sensor device 108B can detect audio signals from the TV that is located near the sensor device 108B. If the sensor device 108B also includes an image sensor, then the sensor device 108B can also capture image data of the occupant 502B sitting in front of the TV and watching TV. The sensor device 108B can also detect light signals that emanate from the TV or from the occupant 502B turning off the lights in the room 504A in order to see the TV better. The sensor device 108B can also detect no or minimal movement from the occupant 502B, especially if the occupant 502B is sitting on the couch watching TV rather than moving around.

The sensor device 108N may detect audio signals that are less in magnitude or volume than the audio signals detected by the sensor device 108B in the room 504A. The sensor device 108N can detect more muted or lower volume decibels that represent the same audio from the TV that was detected by the sensor device 108B. Moreover, like the sensor device 108B, if the sensor device 108N has an image sensor, the sensor device 108N can also capture image data of the occupant 502B watching the TV.

In the room 504B, the sensor device 108A can detect audio signals of the occupant 502C moving pots and pans around the kitchen, kitchen utensils and equipment clanging or otherwise making sounds, and/or alarms, clocks, or presets activating on certain kitchen equipment. The sensor device 108A can also capture image data of the occupant 502C cooking at the stove. The sensor device 108A can detect movement of the occupant 502C as they navigate the kitchen and cook. Moreover, the sensor device 108A can detect room temperature values near the stove. The sensor device 108A can also detect smoke near the stove. Sometimes, the sensor device 108A can also detect changes in light, such as lights turning on for certain kitchen equipment (e.g., a stove light turning on, a microwave light turning off, etc.).

The sensor device 108D can detect similar signals as the sensor device 108A in the room 504B. For example, the sensor device 108D can detect audio signals that are of lesser volume and/or magnitude than those signals detected by the sensor device 108A. This is true if the audio signals originate from a location closer to the sensor device 108A and farther away from the sensor device 108D. The sensor device 108D can also detect different levels and/or magnitudes of movement, temperature, light, and/or image data signals that are also detected by the sensor device 108A.

Sometimes, each of the sensor devices 108A and 108D can have different sets of signal sensors in order to passively monitor the room 504B. As an illustrative example, the sensor device 108A can have temperature, motion, and audio sensors and the sensor device 108D can have light and image sensors. In this configuration, the sensor device 108D can capture a full view of the kitchen to detect more accurate light and/or image data signals. Likewise, since the sensor device 108A is positioned closer to kitchen equipment such as the stove, the sensor device 108A can capture more accurate temperature, motion, and/or audio signals than the sensor device 108D. Any other configurations and/or combinations of signal sensors are possible for the sensor devices 108A and 108D in the room 504B as well as the sensor devices 108B and 108N in the room 504A.

Still referring to FIG. 5A, the detected signals described above can be transmitted to the sensor device 108C in step D. The sensor device 108C can then determine whether any of the signals exceed expected threshold conditions (step E). The sensor device 108C can determine whether any of the signals exceed the expected threshold conditions by one or more predetermined amounts (e.g., levels, ranges, values).

As described in FIGS. 3-4, the sensor device 108C can retrieve the expected threshold conditions for signals that can be detected in each of the rooms 504A-504C and/or the building 500 as a whole. The expected threshold conditions can be based on values that indicate a normal state of each of the rooms 504A-504C and/or the building 500 as a whole at a particular time that the occupant 502A asks the sensor device 108C whether everything is okay in the building 500.

As an example, the motion signal representing the dog 508 exiting through the door 506 of the building 500 may not be an expected amount of motion by the door 506 at the particular time that the occupant 502A wants to know the current state of the building 500. However, the motion signal representing the dog 508's movement may not be significant enough to exceed the expected threshold condition of movement near the door 506 by a predetermined amount. In other words, if the dog 508 sprints out the door 506, that detected motion can be significant enough to exceed the expected threshold condition by the predetermined amount. However, if the dog 508 merely walks out the door 506, this movement may not be enough to exceed the expected threshold condition by the predetermined amount, even if the dog 508 exiting through the door 506 is not a normal condition at time=1.

The sensor device 108C can determine a status of the building 500 based on determining whether any of the signals exceed the expected threshold conditions (step F). As described in reference to FIGS. 1-4, the sensor device 108C can identify a security event when one or more of the signals exceed the expected threshold conditions beyond the predetermined threshold level(s). In the example of FIG. 5A, the sensor device 108C can determine that everything is normal in the building 500. The sensor device 108C may not detect any security events or emergencies.

For example, in determining the status of the building 500, the sensor device 108C can determine and/or identify what is happening in each of the rooms 504A-504C. Based on the combination of signals detected in the room 504A, the sensor device 108C can determine that the occupant 502B is merely watching TV and that no irregular activity has been identified in the room 504A. Similarly, the sensor device 108C can determine that the occupant 502C is merely cooking a meal at time=1 in the room 504B. Although a detected temperature value for the room 504B may be higher than an average expected temperature for the room 504B at time=1, the detected temperature value may not exceed the average expected temperature by the threshold amount. If the detected temperature value did exceed the average expected temperature by the threshold amount, then the sensor device 108C can determine that there may be an emergency in the room 504B, which can be attributed to a cooking-related fire. Finally, the sensor device 108C can determine that the dog 508 has exited the room 504C and gone outside, which, although may not be an expected movement at time=1, may not be enough movement to exceed the expected movement by the threshold amount.

The sensor device 108C can output the status of the building (step G). For example, the sensor device 108C can output an audio message to the occupant 502. An example audio message can be "Nothing is out of the ordinary" (512). Using AI and/or AR, the sensor device 108C can detect concern in the occupant 502A's voice when the occupant 502A initially requests knowing the status of the building 500. If the sensor device 108C detects concern, then the sensor device 108C can provide additional output to the occupant 502A in step G in order to ease the occupant 502A. For example, the sensor device 108C can output information about what is happening in each of the rooms 504A-504C. The sensor device 108C can tell the occupant 502A what each of the other occupants 502B and 502C are doing at time=1.

Sometimes, when the sensor device 108C outputs the status of the building in step G, the occupant 502A can ask follow-up questions. The sensor device 108C can detect the occupant 502A's voice and, using AI, AR, and/or voice recognition techniques, can have a conversation with the occupant 502A. Having a conversation with the occupant 502A can include completing operations or tasks that the occupant 502A asks of the sensor device 108C. Having a conversation with the occupant 502A can include providing the occupant 502A with audio output that responds to the requests made by the occupant 502A.

As an illustrative example, after the sensor device 108C outputs, "Nothing is out of the ordinary" (512), the occupant 502A can ask, "Can you tell me what is happening in the kitchen?" The sensor device 108C can detect this question and perform actions to generate a response to the question. The sensor device 108C can access, from a data store, a floor map or other layout information for the building 500 (e.g., refer to FIGS. 2A-C). The sensor device 108C can use the floor map to determine which of the rooms 504A-504C is the kitchen and which of the sensor devices 108A-N are located within the kitchen. Thus, the sensor device 108C can determine that the room 504B is the kitchen and the sensor devices 108A and 108D are located therein. The sensor device 108C can then transmit a notification to the sensor devices 108A and 108D with a request for any signals detected at a time (e.g., timestamp) that the sensor device 108C received the question from the occupant 502A. The sensor device 108C can also identify the signals already received from the sensor devices 108A and 108D to determine what is happening in the kitchen, instead of requesting new signals from the sensor devices 108A and 108D.

The sensor device 108C can receive the signals and accordingly determine what is happening in the kitchen. The sensor device 108C can use AI and/or one or more machine learning models to convert the signals into descriptive events to then be outputted to the occupant 502A. If, for example, the received signals are image data, then the sensor device 108C can apply one or more machine learning models to the image data to identify what type of activity is depicted in the image data. The image data can depict the occupant 502C cooking at the stove, which can be identified by the sensor device 108C based on application of the one or more machine learning models. Thus, the sensor device 108C can respond to the occupant 502A by outputting audio stating, "Someone is cooking in the kitchen." One or more other responses and/or types of responses can be generated and outputted to the occupant 502A. For example, the outputted response can be in the form of image data or another visual. The image data can be presented at the sensor device 108C. The image data can also be presented at a mobile device of the occupant 502A. One or more other variations of responses and output are possible.

FIG. 5B depicts the building at time=2. Time=2 can be later than time=1 in FIG. 1. Time=2 can also be unrelated to time=1 in FIG. 1.

At time=2, the dog 508 is outside of the building 500, the occupant 502A is still in the room 504C, the occupant 502B is still watching TV in the room 504A, and the occupant 502C is still cooking in the room 504B. However, a fire 518 has started in the room 504B at the stove where the occupant 502C is cooking. As described throughout this disclosure, one or more of the sensor devices 108A-N, such as the sensor device 108A in the room 504B, can automatically detect an emergency or security event, such as the fire 518, then determine egress routes for each of the occupants 502A, 502B, and 502C that avoid the detected emergency. However, in the illustrative example of FIG. 5B, the occupant 502 asks the sensor device 108C in the room 504C, "Clarus, is everything ok?" (514).

As described in reference to FIG. 5A, the sensor device 108C can detect the occupant 502A's voice (step A). Based on detecting the occupant 502A's voice, the sensor device 108C can determine that the occupant 502A wants an update on what is happening in each of the rooms 504A-504C in the building 500. Accordingly, the sensor device 108C can ping the sensor devices 108A-N in each of the rooms 504A and 504B (step B). Each of the other sensor devices 108A-N can detect signals in their respective rooms 504A and 504B (step C) and transmit such signals to the sensor device 108C (step D).

Once the sensor device 108C receives the signals from the other sensor devices 108A-N, the sensor device 108C can determine if any of the signals exceed the expected threshold conditions (step E). If any of the signals do exceed the expected threshold conditions by a threshold level, then the sensor device 108C can identify an emergency (or other type of security event) in the building (step F). Identifying the emergency can include classifying the emergency, identifying a location of the emergency, and determining a severity level of the emergency (e.g., refer to FIGS. 1-4).

In the illustrative example of FIG. 5B, the sensor device 108C can receive a temperature signal from the sensor device 108A in the room 504B that is great in magnitude, value, and duration. In other words, the received temperature value can be significantly higher than an average expected temperature value for the room 504B and/or a previously detected temperature value for the room 504B (e.g., the temperature value at time=1). The received temperature value can therefore exceed the expected threshold condition beyond a predetermined threshold level. The received temperature value can also spike drastically from the previous temperature value for the room 504B in a short period of time (e.g., in a timeframe that is less than some predetermined threshold period of time). Moreover, the received temperature value can be consistent for more than some predetermined period of time. Because the received temperature value can exceed the expected threshold conditions beyond the threshold amount, the sensor device 108C can determine that an emergency, such as the fire 518, has been detected in the room 504B.

The sensor device 108C can receive one or more additional signals that can be used to determine that an emergency exists in the room 504B. For example, received audio signals can have spikes in decibels that resemble the occupant 502C screaming, yelling, or otherwise panicking. The sensor device 108C can be trained using one or more machine learning models and/or AI to detect the concern in the occupant 502C's voice and detect an emergency based on such audio signals. Other signals that can be used to detect the fire 518 include smoke signals, motion signals, light signals, and/or image data.

Once the sensor device 108C identifies the emergency (step F), the sensor device 108C can generate emergency guidance for the occupants 502A, 502B, and 502C that are currently located in the building 500 (step G). As described throughout this disclosure (e.g., refer to FIGS. 2A-C), the sensor device 108C can retrieve a floor map of the building 500 and predetermined egress escape plans for each of the occupants 502A, 502B, and 502C. Using one or more of AI, predictive analytics, and/or machine learning models, the sensor device 108C can determine which egress escape plans should be selected for each of the occupants 502A, 502B, and 502C. Selection of the egress escape plans can be based on information about each of the occupants 502A, 502B, and 502C (e.g., age, agility, disability, etc.), locations of the occupants relative to the identified emergency (e.g., egress escape plans can be selected that do not involve passing or going through a location of the emergency), locations of the occupants relative to each other (e.g., the closer together the occupants are, the more likely an egress escape plan can be selected that lets the occupants escape the building together), a predicted or projected spread of the emergency (e.g., egress escape plans that can become obstructed at some point by the spread of the emergency may not be selected), an amount of time remaining before certain egress escape plans can become obstructed by the emergency (e.g., egress escape plans that will become obstructed by the spread of the emergency while the occupant is passing a point along the egress escape plan may not be selected), etc.

Generating emergency guidance for the occupants 502A, 502B, and 502C can also include selecting an optimal form of output for such guidance. Based on the detected signals from the sensor devices 108A-N (step C), the sensor device 108C can determine whether audio and/or visual signals can be outputted to each of the occupants 502A, 502B, and 502C. For example, signals received from the sensor devices 108A and 108D can indicate that there is smoke in the room 504B, so visual signals and guidance may not be seen well by the occupant 502C. The sensor device 108C can determine that audio guidance should be outputted by either of the sensor devices 108A and 108D and/or text messages, audio, or push notifications should be transmitted to and outputted at a mobile device 524 of the occupant 502C. Signals received from the sensor devices 108B and 108N can indicate that the room 504A does not have any smoke or bright lights that would make visual signals challenging to see. Therefore, the sensor device 108C can determine that visual guidance can be outputted by either of the sensor devices 108B and 108N in the room 504A. The sensor device 108C can also determine that audio guidance can alternatively or additionally be outputted by either of the sensor devices 108B and 108N.

Once the sensor device 108C determines and generates appropriate emergency guidance, the sensor device 108C can transmit the guidance to one or more devices in the rooms 504A, 504B, and 504C where the occupants 502B, 502A, and 502C are located (step H). Therefore, if a room is empty (e.g., no occupants are detected by user detection or motion sensors and/or the sensor devices 108A-N), then the guidance may not be outputted at device(s) in that room.

As shown in the illustrative example of FIG. 5B, the sensor device 108C can respond to the occupant 502A by outputting a message that states, "A fire started in the kitchen. Evacuate through the door!" (516). The sensor device 108B in the room 504A can output audio guidance to the occupant 502B that states, "A fire started in the kitchen. Leave the room immediately and avoid the kitchen." Although not depicted, the sensor device 108B and/or 108N can also output visual signals such as flashing and/or colored lights that are projected on walls and/or floors in a direction that the occupant 502B can follow to exit the building 500. The sensor device 108A in the room 504B can output audio guidance to the occupant 502C that states, "Leave the kitchen immediately and exit through the door" (522). Although not depicted, the sensor device 108A and/or 108D can also output visual signals such as flashing and/or colored lights that are projected on walls and/or floors in a direction that the occupant 502C can follow to exit the building 500. Moreover, as shown in FIG. 5B, a notification can be received at the occupant 502C's mobile device 524. The notification can be a text message, audio guidance, and/or a push notification that prompts and guides the occupant 502C to safely, quickly, and calmly leave the room 504B.

Sometimes, as the occupants 502A, 502B, and 502C egress from the building 500, the sensor devices 108A-N can passively monitor the situation to see if the fire 518 gets worse and/or whether the occupants 502A, 502B, and 502C are panicking or otherwise struggling to egress. For example, the sensor devices 108A-N can use AI techniques to detect panic (e.g., screams, whimpers, crying, etc.) amongst any of the occupants 502A, 502B, and 502C from audio signals. If the sensor devices 108A-N detect panic, then the sensor devices 108A-N can generate and output additional guidance intended to ease the panic and fear from any of the occupants 502A, 502B, and 502C.

If the sensor devices 108A-N detect any changes to the fire 518 that may affect safe egress of the occupants 502A, 502B and 502C, the sensor devices 108A-N can generate and output information to that effect to notify the occupants 502A, 502B, and 502C. Any of the sensor devices 108A-N can also perform a single course correction by selecting or otherwise updating the egress escape plans that were selected for any of the occupants 502A, 502B, and 502C.

Moreover, based on passive monitoring of the fire 518, any of the sensor devices 108A-N can also determine if and when to send notification of the fire 518 to emergency response personnel, such as firefighters, police, and/or EMT. Sometimes, the sensor device 108C can transmit a notification of the fire 518 to the emergency response personnel upon identifying the emergency in the building (step F). Sometimes, the sensor device 108C may only transmit the notification to the emergency response personnel based on determining that a detected severity level of the fire 518 exceeds some threshold reporting out level. Furthermore, the sensor device 108C can transmit the notification to the emergency response personnel after guidance has been outputted to the occupants 502A, 502B, and 502C and based on passive monitoring of the fire 518 as the occupants 502A, 502B, and 502C are egressing from the building 500.

Sometimes, the sensor device 108C as shown in both FIGS. 5A-B may not be operating as the centralized hub. Therefore, when the sensor device 108C detects the occupant 502A's voice, the sensor device 108C can transmit the voice signal to a remote computing system, such as the centralized hub 102 described throughout this disclosure. The remote computing system can then perform steps B and E-G instead of the sensor device 108C performing such steps in FIG. 5A. Similarly, the remote computing system can perform any of steps B, and E-H in FIG. 5B. Sometimes, another sensor device in the building 500 can operate as the centralized hub. Accordingly, the sensor device 108C can send the voice signal to the sensor device that operates as the centralized hub. That sensor device can then perform steps B and E-G in FIG. 5A and/or steps B and E-H in FIG. 5B.

Figure 6:
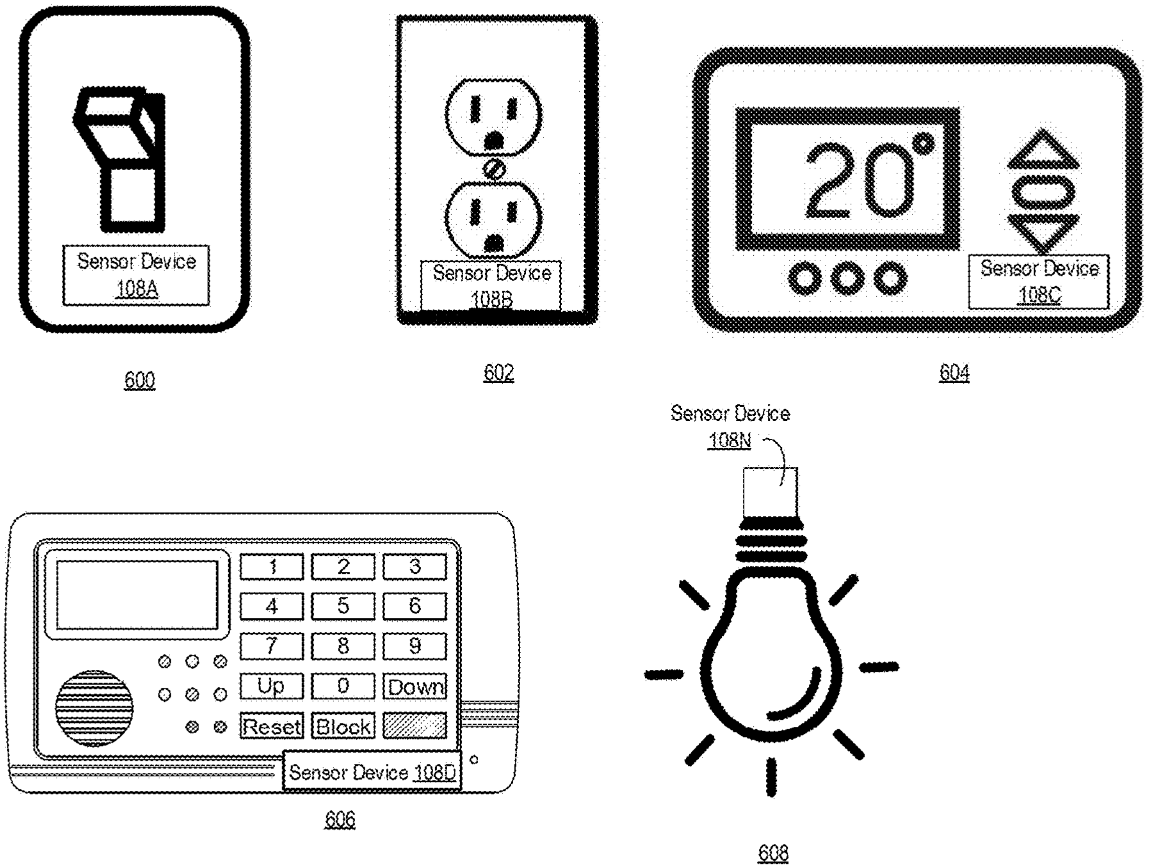
FIG. 6 depicts example features in a building that include sensor devices integrated therein.

FIG. 6 depicts example features in a building that include sensor devices 108A-N integrated therein. As described throughout this disclosure, the sensor devices 108A-N can include a suite of one or more sensors that can be used to detect conditions in the building. More specifically, the suite of sensors can detect anomalous signals through passive monitoring in locations where the sensor devices 108A-N are positioned throughout the building.

The sensor devices 108A-N can be integrated into one or more existing features in the building. As a result, the sensor devices 108A-N can be nonobtrusive. The sensor devices 108A-N also may not detract from aesthetic appearances in the building. Sometimes, the sensor devices 108A-N can also be standalone devices that can be configured in the building, such as attached to walls, ceilings, placed in corners, and/or plugged into outlets. The sensor devices 108A-N that are standalone devices can also be simple in design and size such that the sensor devices 108A-N do not appear obtrusive or diminish aesthetic appearances in the building.

As shown in FIG. 6, the sensor devices 108A-N can be integrated into a variety of existing features in the building. For example, sensor device 108A can be integrated into a light switch 600. Integration of the sensor device 108A herein may not obstruct an ability to flip the light switch 600 on or to operate the light switch 600 as it is intended to be operated. The sensor device 108A can then detect one or more types of signals in an area surrounding or otherwise proximate to the light switch 600.

Sensor device 108B can be integrated into a wall outlet 602. Integration of the sensor device 108B herein may not obstruct an ability to plug power cords into the outlets of the wall outlet 602. The sensor device 108B can then detect one or more types of signals in an area surrounding or otherwise proximate to the wall outlet 602.

Sensor device 108C can be integrated into a thermostat 604 in the building. Integration of the sensor device 108C herein may not obstruct an ability to use any of the control options or display(s) of the thermostat 604. The sensor device 108C can then detect one or more types of signals in an area surrounding or otherwise proximate to the thermostat 604.

Sensor device 108D can be integrated into an alert system 606 or other existing security system that is installed in the building. Integration of the sensor device 108D herein may not obstruct an ability to use any of the control options or display(s) of the alert system 606. The sensor device 108D can then detect one or more types of signals in an area surrounding or otherwise proximate to the alert system 606.

Sensor device 108N can be integrated into a lightbulb 608. Integration of the sensor device 108N herein may not obstruct an ability to attach the lightbulb 608 to a fixture or otherwise to use the lightbulb 608 for its intended purposes. The sensor device 108N can then detect one or more types of signals in an area surrounding or otherwise proximate to the lightbulb 608.

One or more other integrations of the sensor devices 108A-N with existing building features are possible.

Figure 7:
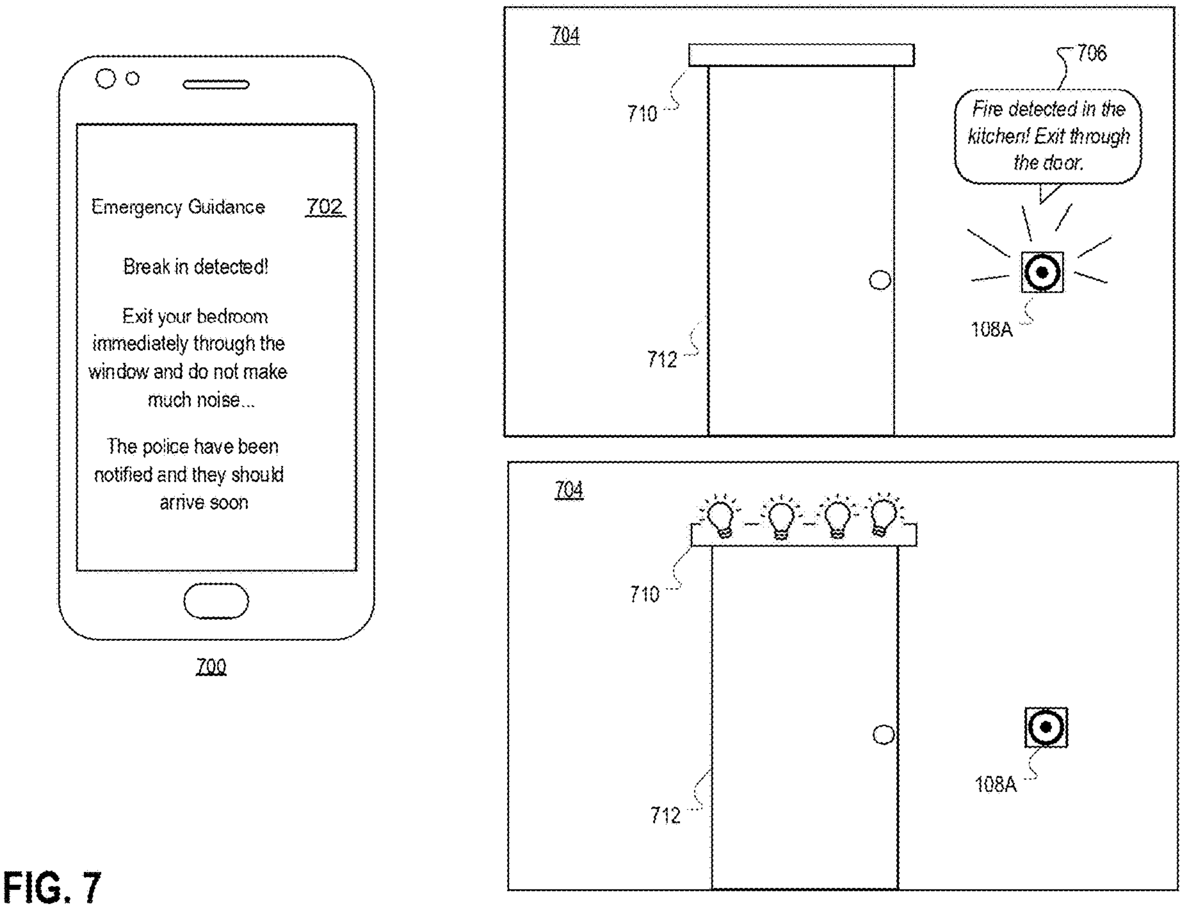
FIG. 7 depicts example forms of output that can be generated based on a detected security event.

FIG. 7 depicts example forms of output that can be generated based on a detected security event. As described throughout this disclosure, the centralized hub 102 and/or any of the sensor devices 108A-N can select an optimal form of output to provide notifications to occupants in the building. The centralized hub and/or the sensor devices 108A-N can select the optimal form of output based on a variety of factors.

For example, output form can be selected based on occupant preferences. Before runtime, the occupant can provide input to the centralized hub 102 indicating that the occupant is deaf and only wants to/can receive text or push notifications to their mobile device and/or visual signals outputted by the sensor devices 108A-N in the building.

As another example, output form can be selected based on detection of an occupant's mobile device in the building. If the mobile device is detected in the building, guidance can be outputted there instead of by the sensor devices 108A-N. This can be beneficial to protect the occupant in situations where a thief or other assailant is in the building since output by the sensor devices 108A-N can bring the thief's attention to a location where output is proved by the sensor devices 108A-N, thereby risking the safety of the occupant.

Output form can also be selected based on location of the occupant relative to the emergency or security event. If the occupant is next to a fire, the occupant may respond quicker and more calmly to loud audio signals rather than flashing lights.

Output form can also be selected based on severity level of the emergency or security event. If the emergency or security event is very severe, such as a rapidly spreading fire, then output can be generated and presented as audio and visual signals at every mobile device and sensor device 108A-N in the building. This can ensure that occupants see and follow the guidance wherever they are in the building and that no occupant is left behind. This type of output can also help the occupants to understand the gravity of the situation, which can propel them to egress from the building quicker.

As another example, output form can be selected based on type of the emergency or security event. If the security event is a burglary, guidance can be outputted as text messages or push notifications to the occupants' mobile devices in order to protect the occupants from being found or tracked down by the burglar. After all, output presented by the sensor devices 108A-N can attract the burglar's attention to locations of the sensor devices 108A-N. If the occupants are located where the output is being presented, then the burglar can cross paths with the occupants, thereby putting the occupant's safety at risk.

As yet another example, output form can be selected based on location of the occupant relative to sensor devices in the building. If the occupant is not located near any sensor device, then the guidance can be transmitted to the occupant's mobile device rather than the sensor devices 108A-N. On the other hand, if the occupant is located near any of the sensor devices 108A-N and/or the occupant does not have their mobile device on them, then the guidance can be outputted at the sensor devices 108A-N closest to the occupant.

Output form can further be selected based on ambient conditions where the occupant is currently located. If smoke is detected where the occupant is currently located, guidance can be outputted as audio signals instead of visual signals. After all, the smoke can prevent the occupant from seeing the visual signals clear enough.

FIG. 7 depicts different forms of output that can be selected based on any of the factors listed above. For example, emergency guidance 702 can be presented at a mobile device 700. The mobile device 700 can be located in the building where the emergency or security event is detected. The centralized hub 102 can, for example, detect that the mobile device 700 is connected to a local home network. The emergency guidance 702 can be presented at the mobile device 700 as a text message, audio message, and/or push notifications for a mobile application. Here, the example emergency guidance 702 states, "Break in detected! Exit your bedroom immediately through the window and do not make much noise . . . the police have been notified and they should arrive soon." The emergency guidance 702 can include additional or less information, based on factors previously described throughout this disclosure (e.g., detected panic of the occupant, type of security event, severity level of the security event, etc.).

As another example, audio guidance 706 can be outputted by a signaling device 108A in building 704. The audio guidance 706 can state, "Fire detected in the kitchen! Exit through the door." The audio guidance 706 can be referring to door 712 in the building 704. As shown, a sensor strip 710 can also be positioned above the door 712. The sensor strip

710 can include a plurality of sensors, such as lights, that can be activated by the centralized hub 102 to provide guidance to the occupants when escaping the building 704. The sensor strip 710 can be any other type of sensor and/or signaling device(s), as described further below in reference to FIGS. 8A-B.

As yet another example, instead of or in addition to the emergency guidance 702 presented at the mobile device 700 and the audio guidance 706 presented by the sensor device 108A, the sensor strip 710 can also illuminate to provide visual signals that guide the occupants to exit the building 704. As described further below, the visual signals presented by the sensor strip 710 can include flashing lights, one steady light, arrows or other indications depicting a direction that the occupants should be moving in, and/or X's or other indications depicting a direction that the occupants should be avoiding. The visual signals can also include colors, such as green signals to demonstrate where it is okay for the occupants to go and red signals to demonstrate where the occupants should not be going.

Figure 8A:
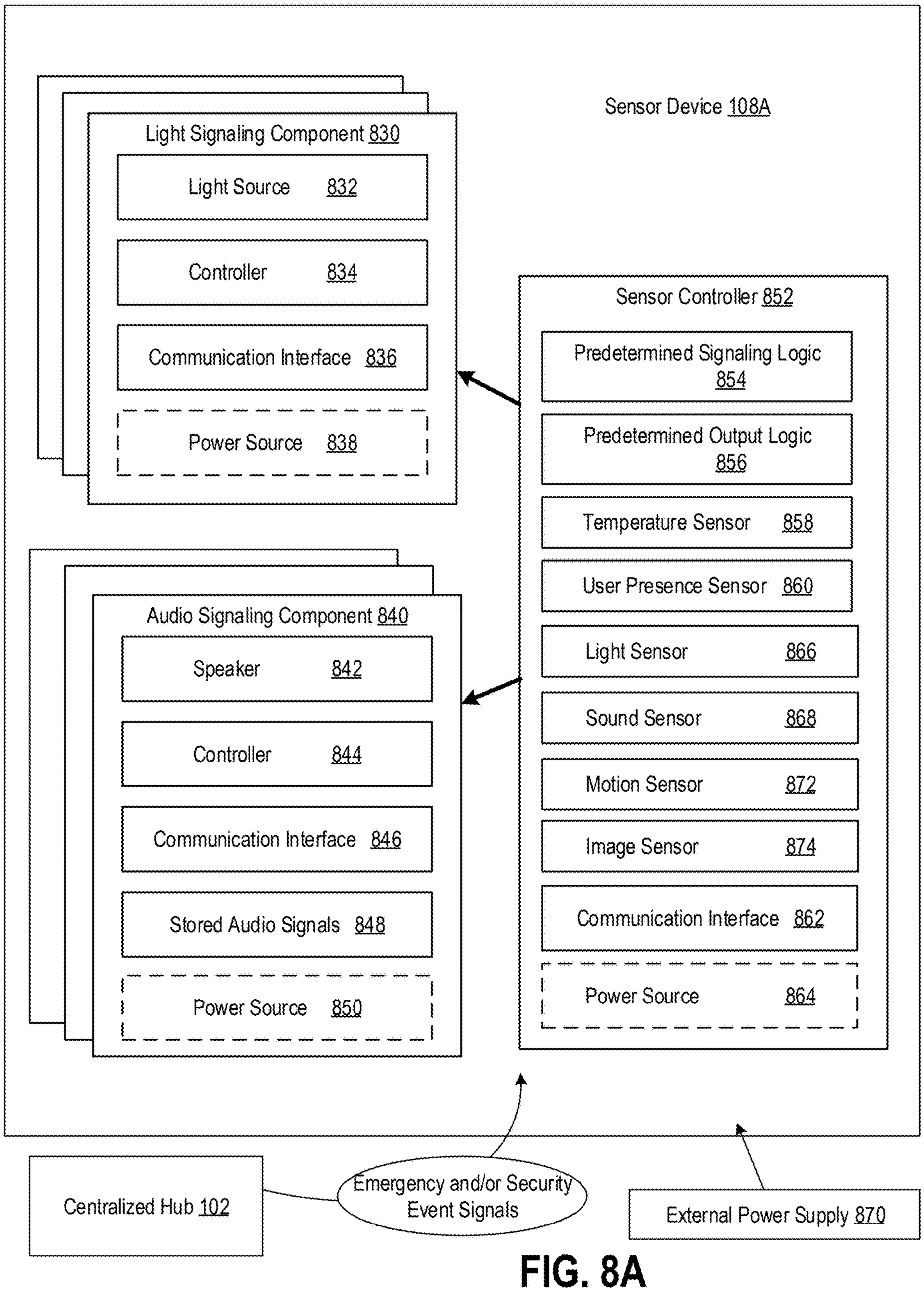
FIGS. 8A-B depict exemplary systems for providing emergency or security event detection, guidance and advisement.
Figure 8B:
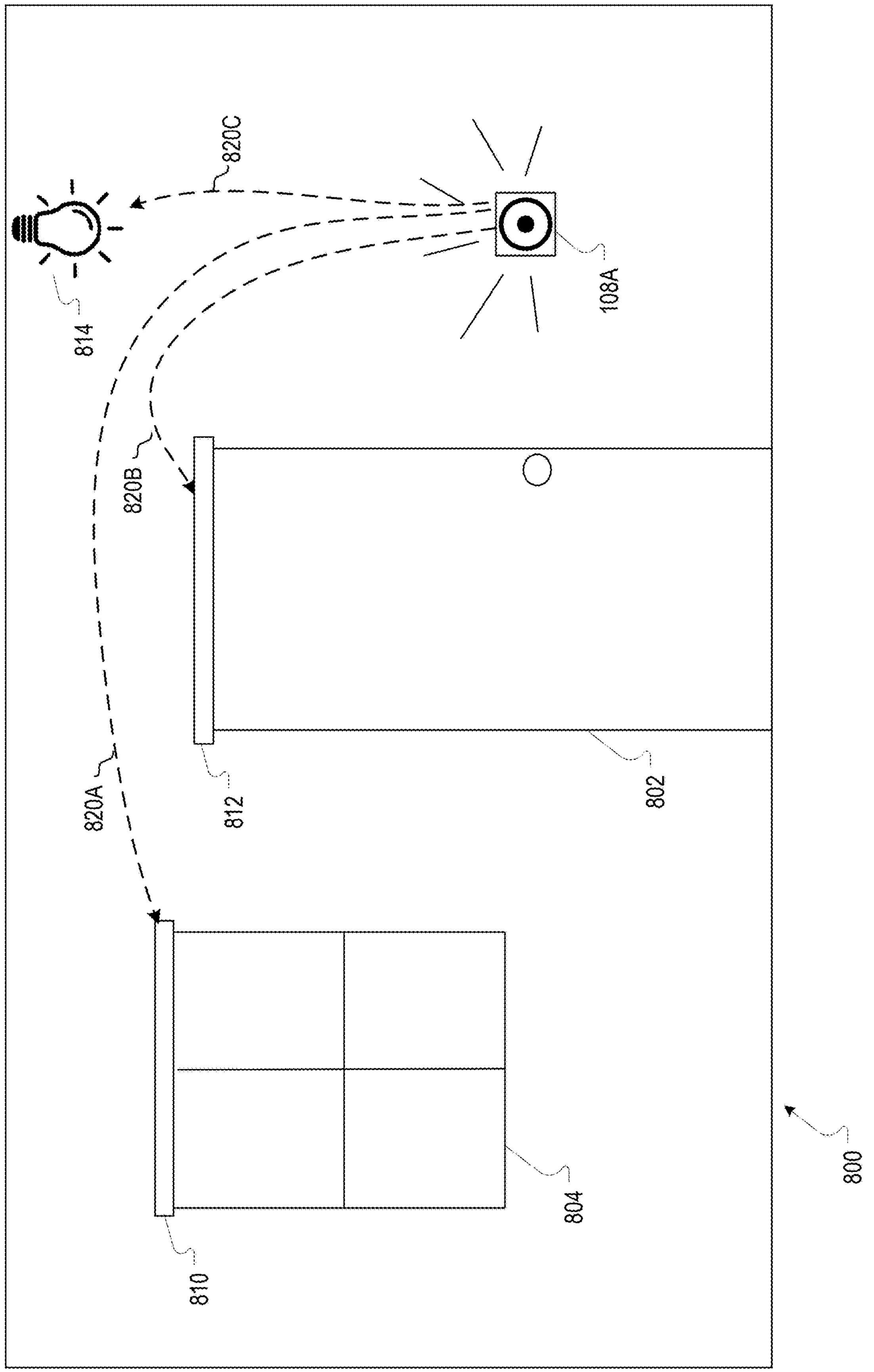

FIGS. 8A-B depict exemplary systems for providing emergency or security event detection, guidance and advisement. In FIG. 8A, sensor device 108A of FIGS. 1-2 is used as an example. The sensor device 108A can be a singular device, as depicted in FIG. 8A, or it can optionally be spread out physically with separate components that can be in wired or wireless communication with each other (e.g., refer to FIG. 8B). In the example of FIG. 8A, the sensor device 108A includes a light signaling component 830, an audio signaling component 840, and a sensor controller 852. The sensor controller 852 can have a one-to-one ratio of communication. Alternatively, the sensor controller 852 can have a one-to-multiple ratio of communication. The audio signaling component 840 and/or the light signaling component 830 can optionally be integrated into/part of a same housing unit and/or circuit board as each other, the sensor controller 852, and/or the sensor device 108A as a whole. Alternatively, each of the components in FIG. 8A, such as 830, 840, and 852, can be housed separately (e.g., separate devices, such as in reference to FIG. 8B). The sensor controller 852 can sometimes be in the same housing with the light signaling component 830 while the audio signaling component 840 can be housed separately. Sometimes, the sensor controller 852 and the audio signaling component 840 can share the same housing unit/circuit board while the light signaling component 830 is arranged separately. Moreover, sometimes the components 830 and 840 can be housed in the same unit and the sensor controller 852 can be housed separately.

In the example of FIG. 8A, the components 830 and 840 are housed in the same unit as the signaling controller 852, in the sensor device 108A. Optionally, the sensor device 108A can have an external power supply 870 (e.g., lithium battery). The sensor device 108A can also receive emergency and/or security event signals from the centralized hub 102 or any of the other sensor devices 108A-N in a building, as described throughout this disclosure. The sensor controller 852 can communicate directly with the light signaling component 830 as well as the audio signaling component 840 in order to provide guidance, instructions, or other information to building occupants about a detected emergency or security event.

The sensor controller 852 can include a predetermined signaling logic 854, a predetermined output logic 856, a temperature sensor 858, a user presence sensor 860, a light sensor 866, a sound sensor 868, a motion sensor 872, an image sensor 874, and a communication interface 862. The sensor controller 852 can optionally include a power source 864 (e.g., battery) in order to power the sensor controller 852 and/or the sensor device 108A. Sometimes, the sensor controller 852 may not have one or more of the sensors 858, 860, 866, 868, 872, and 874, and instead can collect sensor information from sensors or other sensor devices 108A-N positioned throughout the building, as described throughout this disclosure.

The predetermined signaling logic 854 can select an optimal egress escape route from a list of predetermined egress plans during a real-time emergency or security event (e.g., refer to egress escape plan generation by the emergency egress module 206 in FIGS. 2A-C). This selection can be based on information sensed in real-time by one or more of the sensors 858, 860, 866, 868, 872, and 874, and/or any other sensors or signaling devices 108A-N positioned throughout the building.

Once an egress escape route is selected, the predetermined output logic 856 can determine which form of output should be used to output the egress guidance, as described throughout this disclosure (e.g., refer to the emergency egress module 206 and the security module 208 in FIGS. 2A-C). Based on the determination of output form, the guidance can be outputted using the light signaling component 830 and/or the audio signaling component 840. Moreover, if the predetermined output logic 856 determines that guidance should be outputted by an occupant's mobile device, then the communication interface 862 can transmit guidance instructions to the occupant's mobile device.

The sensors 858, 860, 866, 868, 872, and 874 are described throughout this disclosure (e.g., refer to FIGS. 1-3 and 5A-B). Briefly, the temperature sensor 858 can be configured to detect changes in temperature in an area proximate to a location of the sensor device 108A.

The user presence sensor 860 can determine whether an occupant is located within a room. For example, the user presence sensor 860 can detect human movement (e.g., movement of a limb, walking), human body temperature, and/or human sounds (e.g., breathing, coughing). The user presence sensor 860 can also be configured to detect whether an occupant's mobile device (e.g., smartphone, cellphone, BLUETOOTH headphones, wearable device, etc.) is connected to a local home network. Moreover, the user presence sensor 860 can detect location signals of the occupant's mobile device to determine whether the occupant is located in the room and/or proximate to the location of the sensor device 108A.

The light sensor 866 can detect changes in light in an area proximate to the location of the sensor device 108A. This can include changes in light from lights being turned on and off, lightbulbs suddenly going out, doors being opened or closed, windows being covered, uncovered, and/or broken, movement of furniture or objects that can obstruct light in areas of the room, burning flames from a fire, etc. The light sensor 866 can detect different types of light rays and/or light of varying wavelengths. For example, the light sensor 866 can detect LiDAR, infrared, and/or red lights. The light sensor 866 can also detect changes in light between ambient lighting (e.g., lighting from a window) and LED lighting or other fixture lighting.

The sound sensor 868 can detect changes in decibels, vibrations, slight sounds, or other anomalous sounds in an area proximate to the location of the sensor device 108A. The sound sensor 868 may not monitor occupants' conversations. However, the sound sensor 868 can be configured to detect the occupant's voice when the occupant is speaking to the sensor device 108A (e.g., refer to FIGS. 5A-B). For example, when the occupant asks the sensor device 108A for an update on conditions in the building, the sound sensor 868 can detect the occupant's voice so that the sensor device 108A can respond accordingly.

The motion sensor 872 can detect movement in an area proximate to the location of the sensor device 108A. For example, the motion sensor 872 can detect slight movements (e.g., a curtain moving in a breeze from an open window) as well as rapid, fast, or otherwise unexpected movements (e.g., a child or pet running through a room). Sometimes, the motion sensor 872 can be the same as the user presence sensor 860. Sometimes, the sensors 872 and 860 can be separate, as shown in FIG. 8A.

The image sensor 874 can capture image data of an area proximate to the location of the sensor device 108A. The image sensor 874 may not actively monitor activity in a room. Instead, the image sensor 874 can be triggered, by the sensor controller 852, to activate and capture image data of the room. For example, as depicted in FIGS. 5A-B, when the sensor device 108C detects the occupant 502A asking for a status update on the building 500, the sensor device 108C can ping other sensor devices, such as the sensor device 108A, and request one or more types of sensor signals. The one or more types of sensor signals can include image data. Thus, upon receiving the request, the sensor device 108A can capture image data of the room 504B. Otherwise, the sensor device 108A may not continuously capture image data of the room 504B. This is beneficial to ensure and protect occupant privacy. The image data can include video feeds and/or still images.

The communication interface 862 can facilitate communication (e.g., wired or wireless) with the other components, 830 and 840, comprising the sensor device 108A. The communication interface 862 can also facilitate communication between the sensor device 108A, the centralized hub 102, other sensor devices 108A-N, sensors, and/or security system of the building.

The light signaling component 830 can include a light source 832, a controller 834, a communication interface 836, and an optional power source 838. The light source 832 can be any form of lighting, including but not limited to an LED light strip (e.g., refer to FIGS. 7 and 8B). The light source 832 can emit different colors, patterns, symbols based on guidance or other signaling instructions communicated to the light signaling component 830 by the sensor controller 852. The controller 834 can be configured to activate the light source 832 based on receiving an activation signal/instruction from the sensor controller 852. The communication interface 836 can allow the light signaling component 830 to communicate with the sensor controller 852 and/or one or more other components of the sensor device 108A. As mentioned, the power source 838 can power the light signaling component 830. Sometimes, the light signaling component 830 may not include the power source 838 and can instead rely on power from the external power supply 870 that provides power to the sensor device 108A as a whole.

The audio signaling component 840 can include a speaker 842, a controller 844, a communication interface 846, stored audio signals 848, and an optional power source 850. The speaker 842 can be any form or mechanism to output audio cues/instructions (e.g., refer to FIGS. 7 and 8B). The speaker 842 can emit audio/verbal instructions to an occupant in the building based on signaling instructions communicated to the audio signaling component 840 by the sensor controller 852. The controller 844 can be configured to activate the speaker 842 based on receiving an activation signal/instruction from the sensor controller 852. The communication interface 846 can allow the audio signaling component 840 to communicate with the sensor controller 852 and/or any other components of the sensor device 108A.

The stored audio signals 848 can include a plurality of verbal instructions that are associated with each possible egress escape plan out of a room that the sensor device 108A is located in. Therefore, when the sensor controller 852 transmits an activation signal to the audio signaling component 840, the activation signal can indicate which of the stored audio signals from the stored audio signals 848 should be played. Then, the controller 844 can activate the speaker 842 by having the speaker output the selected audio signals from the stored audio signals 848. As mentioned, the power source 850 can power the audio signaling component 840. Sometimes, the audio signaling component 840 may not include the power source 850 and can instead rely on power from the external power supply 870 that provides power to the sensor device 108A as a whole.

FIG. 8B depicts an example system for providing emergency guidance and advisement. In this example room 800, a door 802 is fitted with a first LED strip 812. The first LED strip 812 can be attached on top of a molding of the door 802 or anywhere else along a perimeter of the door 802. A window 804 is also fitted with a second LED strip 810, which can be attached on top of a molding of the window 804 or anywhere else along a perimeter of the window 804. This way, the first and second LED strips 812 and 810 are not visible to an occupant or at least are not prominently displayed in the room 800.

In this example, sensor device 108A is also configured to a wall of the room 800. The sensor device 108A can be retrofitted into an existing socket in the wall. As described throughout this disclosure (e.g., refer to FIG. 6), the sensor device 108A can be a plug-in that is inputted into an outlet in the room 800 or otherwise integrated into any other existing features in the room 800. Here, the sensor device 108A supports audio output. Thus, the sensor device 108A communicates with the first and second LED strips 812 and 810 to display additional and/or alternative signals to an occupant during an emergency or security event. The sensor device 108A can also communicate with a mobile device of the occupant (not depicted) to provide guidance or other instructions during the emergency or security event. The strips 812 and 810 and the sensor device 108A can communicate through a wired and/or wireless connection, as previously discussed throughout this disclosure, wherein a communication signal (e.g., activation signal) between the sensor device 108A and the first LED strip 812 is signal 820B and a communication signal between the sensor device 108A and the second LED strip 810 is signal 820A. During an emergency or security event and once the sensor device 108A selects an optimal egress escape plan, the sensor device 108A can communicate visual signaling instructions to the first and/or second LED strips 812 and 810 via the signals 820B and 820A, respectively.

For example, if the selected egress escape plan requires the occupant to exit through the door 802, the sensor device 108A can prompt (e.g., send an activating signal to) the first LED strip 812 to turn green, depict arrows, and/or flash. The sensor device 108A can also prompt the second LED strip 810 to turn red and/or depict "X" signals so that the occupant understands not to exit through the window 804. The sensor device 108A can optionally, additionally, or alternatively output audio messages instructing the occupant about how to exit the room 800.

Moreover, the sensor device 108A can communicate with lights 814 in the room 800 via signal 820C. Sometimes, the room 800 may not include the first and second LED strips 812 and 810. Instead, the sensor device 108A can communicate with existing features in the room 800 to provide guidance to occupants located therein. For example, the sensor device 108A can transmit light signaling instructions to the light 814 via the signal 820C. The instructions can cause the light 814 to turn on, off, flash, etc. The light 814 can therefore assist in guiding the occupant to safely exit the room 800. The sensor device 108A can also communicate with one or more other existing features in the room 800, including but not limited to TVs, display screens, thermostats, alert/security systems, and smart appliances (e.g., stove, microwave) to provide guidance, instructions, or other notifications to the occupants located therein.

Figure 9:
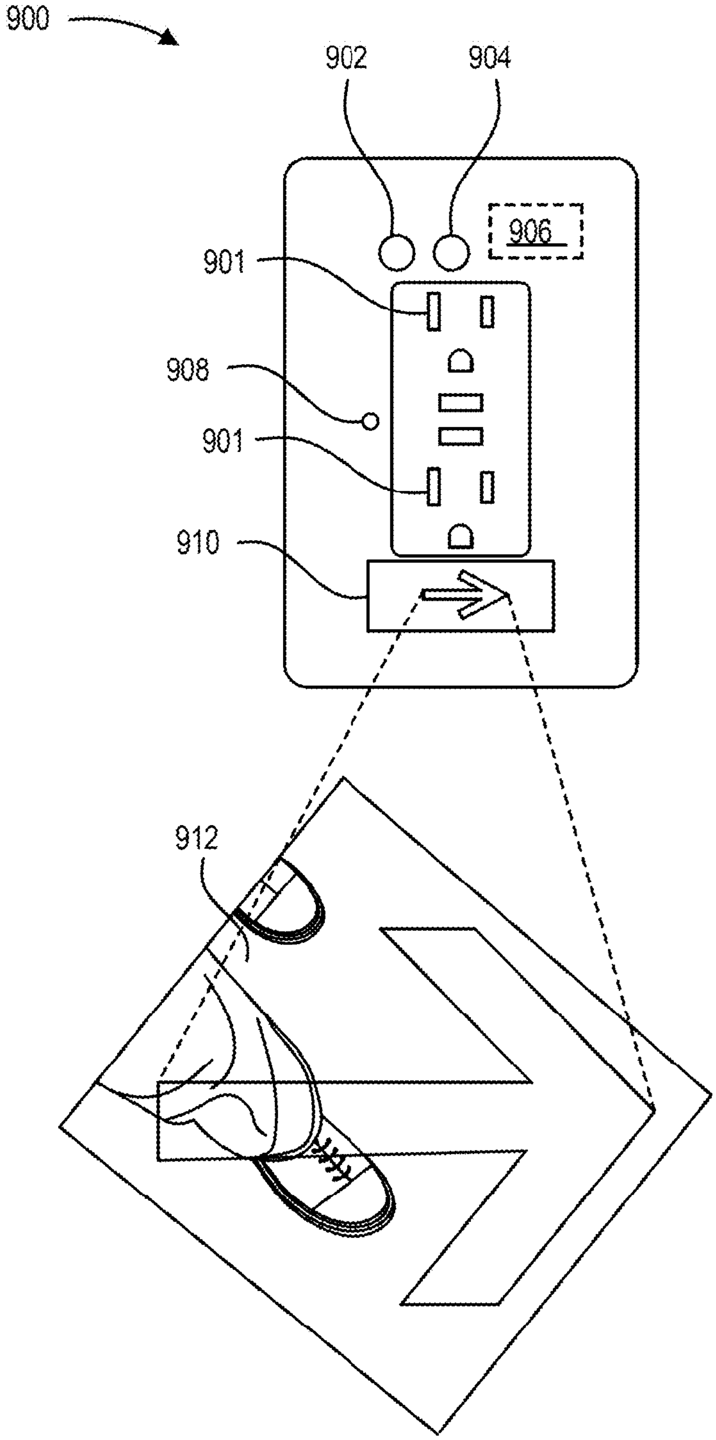
FIG. 9 is an example apparatus for providing emergency guidance and advisement.

FIG. 9 is an example apparatus 900 for providing emergency and/or security guidance and advisement in accordance with the present disclosure. In this example, the apparatus 900 is configured as an electrical power outlet that includes one or more receptacles 901. The apparatus 900 is configured to include a sensor device 902 (e.g., the sensor devices 108A-N), an emergency and security event detector 904, a communication device 906, a speaker 908, and a display device 910. In other examples, the apparatus 900 can include one or more other components described throughout this disclosure. For example, the apparatus 900 can include only the sensor device 906, which can include one or more of the components described in reference to the sensor devices 108A-N throughout this disclosure (e.g., refer to FIGS. 2A-C). The apparatus 900 can also include components such as the emergency egress module 206 and/or the security module 208 depicted and described in reference to FIG. 2B. The apparatus 900 can further include one or more of the sensors described throughout this disclosure, such as the sensors depicted and described in reference to FIG. 8A. Various configurations of the apparatus 900 are possible.

The sensor device 902 can include a suite of sensors, as described throughout this disclosure, that can be configured to detect different types of signals in an area proximate to the location of the apparatus 900. Sensed signals can be recorded locally in the apparatus 900 and/or in one or more remote computing devices, such as the centralized hub 102 (e.g., refer to FIGS. 1-2). As described herein, the user detector 602 can be of various types, such as motion sensors and cameras.

The emergency and security event detector 904 can be configured to detect information about an emergency or security event. The emergency and security event detector 904 can be part of the sensor device 902 or can be separate. For example, signals can be detected by the sensor device 902 and transmitted to the emergency and security event detector 904. The emergency and security event detector 904 can then analyze the signals and determine whether the signals indicate that an emergency or security event is occurring in the building.

The communication device 906 is included in the apparatus 900 and configured to enable data communication with the centralized hub 102 and/or other computing devices, sensor devices, and/or sensors positioned throughout the building. The communication device 906 can include a wireless and/or wired data communication interface.

The speaker 908 operates to generate sounds, such as audible cues, horns, or verbal messages for egress guidance and instructions. The speaker 908 can also provide updates to the occupants about current conditions in the building. For example, when an occupant asks the apparatus 900 for an update on what is happening in the building, status information can be outputted by the speaker 908. The speaker 908 can also be used to supplement other fixed audio devices or act as a substitute if fixed audio devices are not functioning in the building. Such sounds can complement visual signs in emergencies where smoke intensity can diminish or preclude the ability to see the visual signs.

The display device 910 operates to display visual signs that can guide an occupant along an exit route. In some examples, the display device 910 includes a display screen that is provided in the apparatus 900 and displays information with visual signs thereon. In addition or alternatively, the display device 910 operates as a projector that projects a lighted sign on another object, such as a wall, a floor, or a ceiling. In the illustrated example, the display device 910 projects a lighted arrow on the floor to guide the occupant in a direction to exit.

Figure 10:
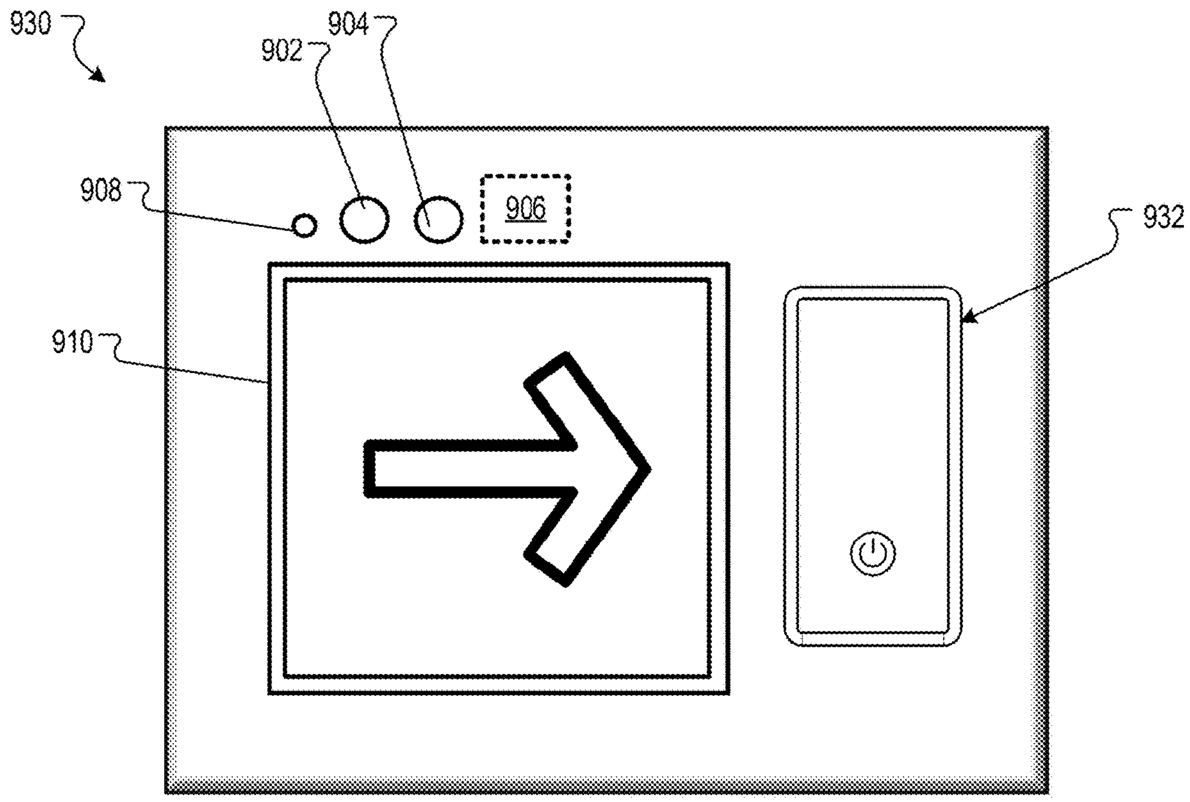
FIG. 10 is another example apparatus for providing emergency guidance and advisement.

FIG. 10 is another example apparatus 930 for providing emergency and/or security guidance and advisement in accordance with this present disclosure. The apparatus 930 is configured similar to the apparatus 900 except that the apparatus 930 is implemented as an electrical switch having a switch button 932. Similarly to the apparatus 900, the apparatus 930 can include at least one of the sensor device 902, the emergency and security event detector 904, the communication device 906, the speaker 908, and the display device 910. As the apparatus 930 is similar to the apparatus 900, the description of the apparatus 900 is incorporated by reference with respect to the apparatus 930.

Figure 11:
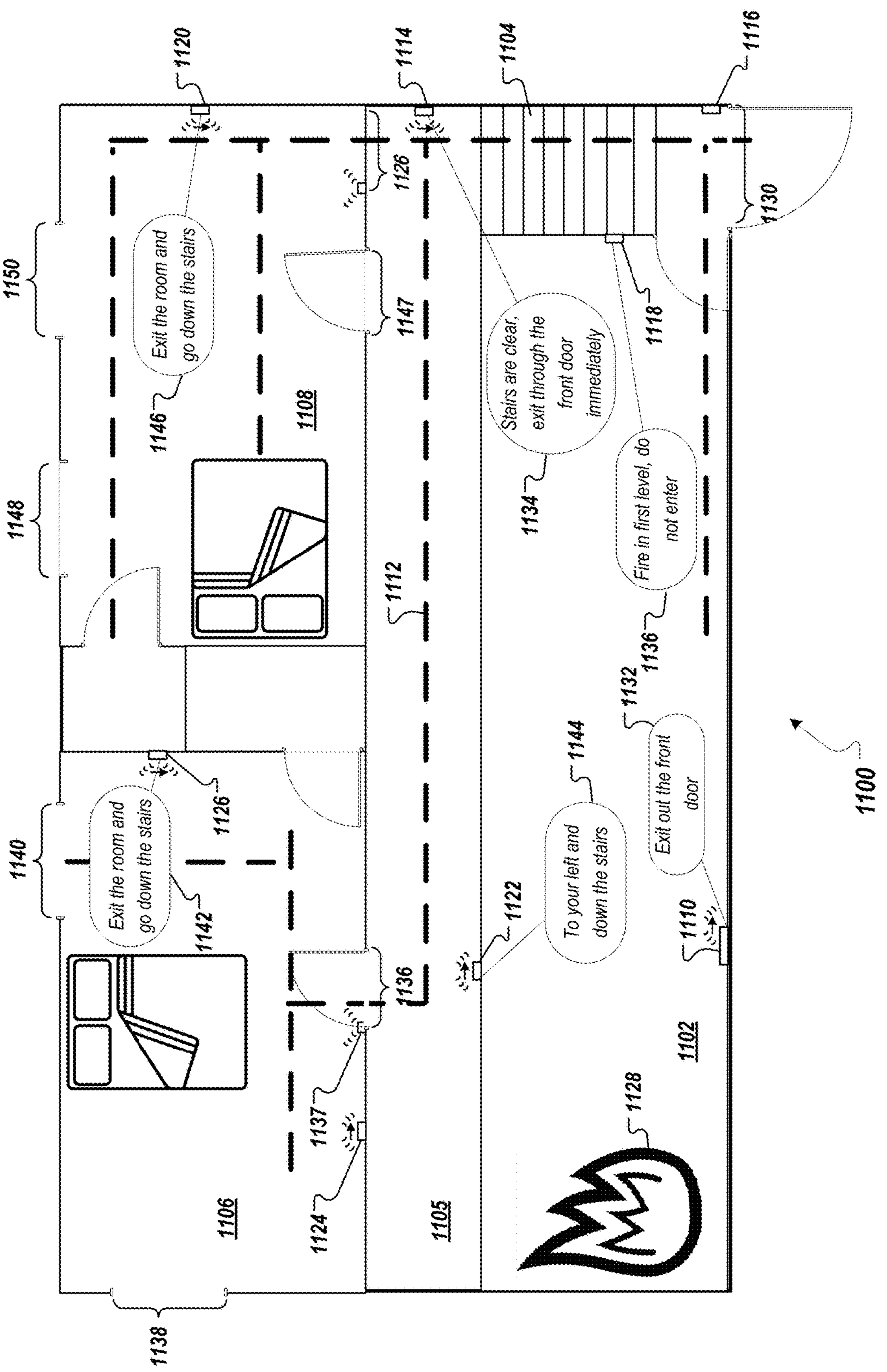
FIG. 11 is a conceptual diagram depicting a building with sensor devices positioned throughout that provide guidance and prompts to building occupants during an identified emergency.

FIG. 11 is a conceptual diagram depicting a building 1100 with sensor devices positioned throughout that provide guidance and prompts to building occupants during an identified emergency. The guidance and prompts described in reference to FIG. 11 can be determined by the centralized hub 102. More specifically, the emergency egress module 206 of the centralized hub 102 can determine appropriate guidance and/or prompts for the building occupants based on detected conditions in the building 1100. The guidance and/or prompts described in reference to FIG. 11 can also be determined by the emergency egress module 206 and applied to security events such as break-ins and burglaries, as detected and determined by the security module 208. For illustrative purposes, the guidance and prompts determined by the emergency egress module 206 are described in relation to a fire emergency in the building.

The building 1100 can be a house that includes a lower level 1102 and a stairway 1104 that goes to an upper level. The upper level includes a hallway 1105, a first bedroom 1106, and a second bedroom 1108. A centralized hub 1110 (e.g., the centralized hub 102 described in reference to FIGS. 1-2) has determined a floor map 1112 that maps pathways within the building 1100. The floor map 1112 may have been determined from motion detection information obtained by detecting motion of occupants as they moved throughout the building 1100. The floor map 1112 can also be determined as described in reference to the emergency egress module 206 in FIG. 2B. Sensor devices 1114, 1116, 1118, 1120, 1124, and 1126 can also be placed in each of the rooms or locations 1102, 1105, 1106, and 1108 in the building 1100. The sensor devices 1114, 1116, 1118, 1120, 1124, and 1126 can be connected to the centralized hub 1110, through one or more wired and/or wireless connections.

The building 200 can include various additional sensor devices, such as smart thermostat devices, that can detect different types of signals in the building 200 and communicate other information to the centralized hub 102, as described throughout this disclosure (e.g., refer to FIGS. 1-2).

In general, devices that communicate with the centralized hub 1110 can include one or more of a smart thermostat, smoke detector, smart outlet covers, sensors, and sensor devices located, e.g., on doors and windows or in other locations in the building 200. A given device may provide one function or multiple functions (e.g., a smart outlet cover may include a motion detector as well as one or more additional sensors).

Although one centralized hub 1110 is shown, multiple monitoring devices may be included in the building 1100, such as one monitoring device per room. Each of the monitoring devices can operate similarly to the centralized hub 1110. For example, each of the monitoring devices can take turns performing functions of the centralized hub 1110 (e.g., refer to the centralized hub 102 in FIG. 2B). As another example, each of the sensor devices 1114, 1116, 1118, 1120, 1124, and 1126 can take turns performing functions of the centralized hub 1110. Moreover, a smart thermostat, existing alert system, smoke detector, or other devices in the building 1100 can also be secondary monitoring systems. A secondary monitoring system (and the centralized hub 1110) can include various sensors (e.g., for audio, light, temperature, fire, smoke, motion detection, etc.) and/or can communicate with other sensors included in an area monitored by the respective monitoring device.

In some implementations, the centralized hub 1110 can be a master monitoring system and other monitoring devices, such as the sensor devices 1114, 1116, 1118, 1120, 1124, and 1126 can be secondary monitoring systems. In some implementations, each secondary monitoring system can take over control as a new master monitoring system if the centralized hub 1110 is out of commission (e.g., consumed by fire), as described above. A new master monitoring system can operate using last-received information from the centralized hub 1110 and information received from other secondary monitoring systems. In some implementations, all monitoring systems located in the building 1100 can act as peer devices (e.g., pre-emergency and/or during an emergency), with no device designated as a master monitoring device.

As mentioned, devices included in the building 1100 can connect to the centralized hub 1110 using one or more wired or wireless connections. Additionally or alternatively, devices in the building 1100 can connect to a cloud based service, to upload information and download information provided by other devices, so that a given device can send and receive data even if in a home network is compromised, e.g., by some type of emergency. For example, during a disaster, devices may not be able to communicate on a local network, but a smart thermostat in one room and the centralized hub 1110 may each be able to communicate with the cloud service (e.g., using a cellular network) and thereby exchange information with each other, using the cloud service as an intermediary.

Various devices, e.g., secondary monitoring systems or other devices that include motion detection, such as the sensor devices 1114, 1116, 1118, 1120, 1124, and 1126, can provide motion detection information to the centralized hub 1110 and/or to secondary monitoring system(s). Each motion detection device can have a known location within the building 1100, and can provide a device identifier along with provided motion detection information. The centralized hub 1110 can use the received motion detection information to determine the floor map 1112 of the building 1100. The floor map 1112 indicates paths into and out of the building 1100, and paths into and out of respective rooms or on the stairway 1104.

The motion detection information can indicate the paths that occupants frequently use while moving within the building 1100. Paths can be identified by time and location of detected motion, as well as direction of motion as indicated by successive motion detection data points. For example, first, second and third motion sensors may detect motion at first, second, and third time points that are one second apart, indicating that a user moved between locations associated with the first, second, and third motion sensors. Frequency of movement, over time, can indicate main paths throughout the building 1100. For example, motion detectors may detect occasional movement of an occupant in a corner of a room (e.g., by a dresser), but may more often detect movement of occupants in hallways, through doorways, on stairs, etc. The centralized hub 1110 may know which sensors are in proximity to doors (e.g., room doors, exit doors) and windows, and can identify paths that lead into and out of rooms and out of the building 1100.

Sensors can also be located on doors and/or windows. The centralized hub 1110 can determine an exit path by detecting movement of an occupant towards a door and then opening of that door. As a similar example, the centralized hub 1110 can detect a path that includes an exit by detecting the opening of a door when an occupant enters, and then detecting continuous movement of the occupant through the building 1100 to a location within the building. The centralized hub 1110 can identify path segments within the building 1100 that interconnect and that lead to an exit (e.g., door, window).

During runtime, the centralized hub 1110 (or a secondary monitoring system) can receive information that indicates a presence of an emergency within the building 1100. For example, the centralized hub 1110 can receive (or can generate) information that indicates the presence of a fire 1128 on the lower level 1102 of the building 1100. The presence of the fire 1128 can be determined, for example, based on one or more received temperature readings being more than a threshold temperature. As another example, the centralized hub 1110 can receive a fire indication signal from one or more smoke detection devices. Other fire detection approaches can include IR (Infra-Red) fire detection and rate of rise temperature detection. Fire indication information can indicate which location(s) in the building 1100 are on fire (or sufficiently close to a fire so as to be avoided by occupants of the building 1100).

The centralized hub 1110 can determine, based on the floor map 1112 and the received fire indication information, one or more exit routes that can be used by occupants to exit the building 1100. The exit routes can include portions of the floor map 1112 that avoid the locations within the building 1100 that have been identified as locations to be avoided. For example, based on the location of the fire 1128 being on the left side of the building 1100, the centralized hub 1110 can determine that the stairs 1104 are currently usable. Accordingly, the centralized hub 1110 can determine an exit path that routes upstairs occupants down the stairs 1104 and out a front door 1130.

After determining the exit route(s), the centralized hub 1110 can generate and send signaling instructions to various sensor devices located in the building 1100, for the sensor devices to emit signal(s) to guide the occupant to an exit route that will safely lead the occupant out of the building 1100. For example, the centralized hub 1110 can send audio and/or visual signaling instructions to one or more of the sensor devices 1114, 1116, 1118, 1120, 1124, and 1126.

Sensor devices 1114, 1116, 1118, 1120, 1124, and 1126 can emit multi-colored, strobing, LED (Light Emitting Diode) laser light, and can be mounted low, at exit points (e.g., door, window) in each room. LED guiding lights, can be mounted low in outlet-type components, in pathways leading to egresses from the building 1100. Sensor devices 1114, 1116, 1118, 1120, 1124, and 1126 can emit various audio and visual cues to the occupant, for example. For instance, sensor devices 1114, 1116, 1118, 1120, 1124, and 1126 can include flashing lights that may indicate a direction an occupant is to take to proceed to (or stay one) an exit route. A series of flashing lights (e.g., in a hallway) may indicate a presence and direction of an exit route. Sensor devices 1114, 1116, 1118, 1120, 1124, and 1126 can also be placed onto doors and/or windows, to indicate presence of respective doors and windows, and to indicate whether a given door or window is part of an exit route. Different colors can indicate inclusion or exclusion of a given door, window, or pathway on an exit route. For example, a flashing red signal (e.g., a red "X") on a doorway may indicate that the doorway is to be avoided (and the door kept shut). A flashing green light may indicate that the given door, window, or path segment is part of the exit route.

Sensor devices 1114, 1116, 1118, 1120, 1124, and 1126 can be configured to play audio instructions for an occupant, for providing directional guidance towards egresses, as described herein. Audio instructions can include a fire status description (e.g., "a fire has been detected downstairs"), directional clues (e.g., "go out of the door and to your left"), or more detailed instructions (e.g., "place a wet towel under the door and leave the door closed"). Audio instructions can be specific to the particular room where the occupant is located, based on the location of the room, the location of the detected fire, a determined exit route, and potential detected levels of concern, panic, or uncertainty of the occupant (e.g., refer to the centralized hub 102 in FIG. 2B).

For the particular example of the fire 1128 located in the left of the lower level 1102, the centralized hub 1110 can emit a lighted directional signal and an audio instruction 1132 directing occupants located in the lower level 1102 to proceed to and exit the front door 1130. Signaling instructions can be sent from the centralized hub 1110 to the sensor device 1118 located near an entry to the lower level 1102, for the sensor device 1118 to play an audio instruction 1136 directing the occupant to not enter the lower level 1102.

Signaling instructions can also be sent from the centralized hub 1110 to sensor devices 1124 and 1126 located in the room 1106, for the sensor devices 1124 and 1126 to direct occupants located in the room 1106 out of the building 1100. For example, the sensor devices 1124 and 1126 can emit lighted arrows that direct the occupant to a bedroom door 1136 and out of the room 1106. Sensor devices located on or near the bedroom door 1136 (e.g., a sensor device 1137) can emit, in response to received instructions, signals (e.g., lighted) indicating the presence of the bedroom door 1136 and that the occupant is to go through the bedroom door 1136. Sensor devices located on or near windows 1138 and 1140 can emit, in response to received instructions, signals (e.g., lighted) indicating that the windows 1138 and 1140 are not part of a recommended exit route. The sensor device 1126 (or another device) can, in response to a received instruction, emit an audio instruction 1142 that directs occupants in the room 1106 to exit the room 1106 and proceed to the stairs 1103. The device 1122, located in the hallway 1105, can emit a lighted arrow directing users down the hallway 1105 and audio instructions 1144 that directs the occupants to the stairs 1103. The device 1114, also located in the hallway 1105, can emit audio instructions 1134 that directs the occupants down the stairs 1103 and to exit through the front door 1130.

Signaling instructions similar to those sent to sensor devices 1124 and 1126 in the room 1106 can also be sent to sensor devices 1120 and 1126 in the room 1108. Signals emitted by sensor devices 1120 and 1126 in the room 1108, including an audio instruction 1146 played by the sensor device 1120, can direct occupants out of the room 1108 (e.g., through a door 1147 and down the stairs 1103), rather than out a window 1148 or a window 1150.

Other types of signaling instructions and corresponding signals can be generated in the building 1100. For example, information can be sent to mobile devices of occupants of the building 1100 that direct the occupants to and on the determined exit routes. The centralized hub 1110, secondary monitoring systems, and/or an application running on a mobile device may know where the mobile device (and associated occupant) are located within the building 1100, with respect to the fire and the determined exit routes. Such knowledge can be used to tailor instructions that are sent to and displayed (or played) on a given mobile device.

Other devices in the building may receive and present information related to the fire 1128 and recommended evacuation of the building 1100. For example, the centralized hub 1110 can communicate with various computing devices or displays located within the building 1100. For example, the centralized hub 1110 can send information or signaling instructions to one or more desktop computing devices, smart televisions, or other devices located within the building 1100. The computing devices can be configured to display information (e.g., a fire warning, exit route information), based on information received from the centralized hub 1110. In some implementations, the centralized hub 1110 can remotely control (e.g., turn on) devices that include a display, and instruct the devices to display (and/or play) information useful for evacuation of the building 1100, such as exit route information that is specific to the location of the fire 1128 and the location of the respective device (e.g., a smart television in the lower level 1102 may display different information from a smart television in the room 1108).

Figure 12:
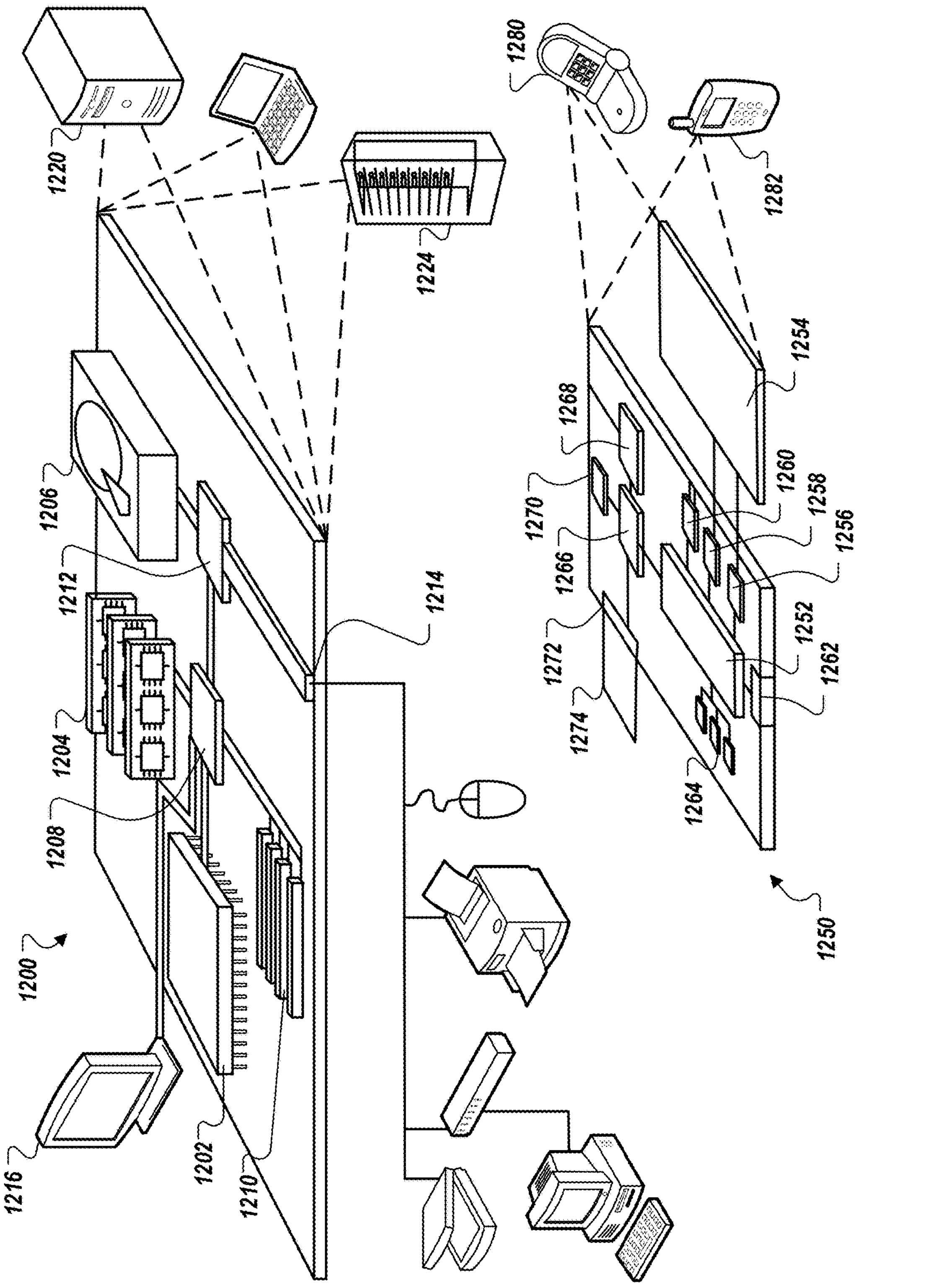
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the computing device 1200. In some implementations, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In the implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some implementations, or for wireless communication in other implementations, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250, or can also store applications or other information for the mobile computing device 1250. Specifically, the expansion memory 1274 can include instructions to carry out or supplement the processes described above, and can include secure information also. Thus, for example, the expansion memory 1274 can be provide as a security module for the mobile computing device 1250, and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1268 using a radio-frequency. In addition, short-range communication can occur, such as using a Bluetooth, WiFi, or other such transceiver (not shown). In addition, a GPS (Global Positioning System) receiver module 1270 can provide additional navigation- and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for event detection and response, the method comprising:

receiving sensor data associated with an environment;

processing the sensor data using artificial intelligence (AI) to detect an event in the environment, wherein the AI is trained to correlate the received sensor data with different types of events;

generating, based on the detected event, egress guidance for a user in the environment;

returning instructions for presenting the egress guidance by a sensor device; and iteratively updating the egress guidance for the user based on (i) the sensor data and (ii) user feedback that is received from the sensor device.

2. The method of claim 1, wherein the AI is trained to:

determine that at least one signal in the received sensor data exceeds a respective threshold condition beyond a threshold level;

identify one or more other signals in the received sensor data that each exceeds respective threshold conditions beyond respective threshold levels at a similar time as the at least one signal; and correlate the identified one or more signals with the at least one signal to detect the event in the environment.

3. The method of claim 2, wherein the at least one signal is an increase in decibel readings in the environment where the event is detected.

4. The method of claim 2, wherein the one or more other signals comprise movements or motion proximate a location where the event is detected.

5. The method of claim 1, wherein the AI is trained to correlate the sensor data that is received from a plurality of different types of sensors with the different types of events.

6. The method of claim 1, wherein the AI is trained to correlate the sensor data that is received from different types of sensor in a network of sensor with the different types of events.

7. The method of claim 1, wherein the different types of events comprise safety events.

8. The method of claim 1, wherein the method further comprises returning the instructions for presenting the egress guidance to a mobile device of the user.

9. The method of claim 1, wherein returning the instructions for presenting the egress guidance further comprises presenting, by the sensor device, information for guiding an emergency response personnel to another user in the environment.

10. A system for egress guidance, the system comprising:

a sensor device positioned in an environment and configured to generate sensor data associated with the environment; and a computer system in network communication with the sensor device, wherein the computer system is configured to perform a process comprising:

receiving the sensor data from the sensor device;

processing the sensor data using artificial intelligence (AI) to detect an event in the environment, wherein the AI was trained to correlate the received sensor data with different types of events;

generating, based on the detected event, egress guidance for a user in the environment; and returning instructions for presenting the egress guidance by a computing device for the user.

11. The system of claim 10, wherein the process further comprises iteratively updating the egress guidance, using the AI, for the user based on (i) the sensor data and (ii) user feedback that is received from the sensor device.

12. The system of claim 10, wherein the computing device comprises a mobile device of the user.

13. The system of claim 10, wherein the computing device comprises the sensor device.

14. The system of claim 10, wherein the computer system comprises the sensor device.

15. The system of claim 10, wherein the computing device is configured to present the egress guidance with augmented reality (AR) projected on surfaces proximate the user.

16. The system of claim 10, wherein the computer system is remote from the environment.

17. The system of claim 10, wherein the user is an emergency response personnel and wherein returning the instructions for presenting the egress guidance comprises presenting, at the computing device for the user, information for guiding the emergency response personnel to another user in the environment.

18. A system for egress guidance, the system comprising:

a sensor device positioned in an environment and configured to generate sensor data associated with the environment; and a computer system in network communication with the sensor device, wherein the computer system is configured to perform a process comprising:

receiving the sensor data from the sensor device;

processing the sensor data using artificial intelligence (AI) to detect an event in the environment;

generating, based on the detected event, egress guidance for a user in the environment;

returning instructions for presenting the egress guidance by a computing device for the user; and iteratively updating the egress guidance, using the AI, for the user based on (i) the sensor data and (ii) user feedback that is received from the sensor device.

19. The system of claim 18, wherein the computing device is configured to present the egress guidance with augmented reality (AR).

20. The system of claim 18, wherein the method further comprises returning the instructions for presenting the egress guidance to a mobile device of the user.

* * * * *